United States Patent
Bhaskar et al.

(10) Patent No.: US 12,014,246 B2
(45) Date of Patent: Jun. 18, 2024

(54) NANOPHOTONIC QUANTUM MEMORY

(71) Applicant: President and Fellows of Harvard College, Cambridge, MA (US)

(72) Inventors: Mihir Keshav Bhaskar, Cambridge, MA (US); Denis D. Sukachev, Cambridge, MA (US); Christian Thieu Nguyen, Cambridge, MA (US); Bartholomeus Machielse, Cambridge, MA (US); David S. Levonian, Cambridge, MA (US); Ralf Riedinger, Cambridge, MA (US); Mikhail D. Lukin, Cambridge, MA (US); Marko Loncar, Cambridge, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 21 days.

(21) Appl. No.: 17/623,757

(22) PCT Filed: Jul. 16, 2020

(86) PCT No.: PCT/US2020/042316
§ 371 (c)(1),
(2) Date: Dec. 29, 2021

(87) PCT Pub. No.: WO2021/011765
PCT Pub. Date: Jan. 21, 2021

(65) Prior Publication Data
US 2022/0269974 A1    Aug. 25, 2022

Related U.S. Application Data

(60) Provisional application No. 62/875,340, filed on Jul. 17, 2019.

(51) Int. Cl.
G06N 10/70      (2022.01)
B82Y 20/00      (2011.01)
G02B 6/122      (2006.01)

(52) U.S. Cl.
CPC ............. *G06N 10/70* (2022.01); *B82Y 20/00* (2013.01); *G02B 6/1225* (2013.01)

(58) Field of Classification Search
None
See application file for complete search history.

(56) References Cited

U.S. PATENT DOCUMENTS 6,472,681 B1 * 10/2002 Kane ..................... G06N 10/00
                                                              257/14
6,781,520 B1   8/2004 Smith et al.
(Continued)

FOREIGN PATENT DOCUMENTS

WO   WO-2014/210486 A1   12/2014
WO   WO-2018/102093 A1   6/2018
(Continued)

OTHER PUBLICATIONS

"Code-division multiple access," definition; Wikipedia; reviewed on Apr. 29, 2016, 10 pages. (https://en.wikipedia.org/wiki/Code-division_multiple_access).
(Continued)

*Primary Examiner* — Darren E Wolf
(74) *Attorney, Agent, or Firm* — Wilmer Cutler Pickering Hale and Dorr LLP

(57) ABSTRACT

Systems and methods are disclosed for making a quantum network node. A plurality of scoring function F values are calculated for an array of at least two photonic crystal cavity unit cells, each having a lattice constant a and a hole having a length Hx and a width Hy. A value of a, a value of Hx, and a value of Hy are selected for which a scoring function value
(Continued)

is at a maximum. A waveguide region and the array of at least two photonic crystal cavity unit cells based on the selected values are formed on a substrate. At least one ion between a first photonic crystal cavity unit cell and a second photonic crystal cavity unit cell are implanted and annealed into a quantum defect. A coplanar microwave waveguide is formed on the substrate in proximity to the array of at least two photonic crystal cavity unit cells.

20 Claims, 43 Drawing Sheets

(56) References Cited

U.S. PATENT DOCUMENTS

| | | | |
|---|---|---|---|
| 7,466,127 | B2 | 12/2008 | Chandrakumar et al. |
| 8,213,751 | B1 | 7/2012 | Ho et al. |
| 8,547,090 | B2 | 10/2013 | Lukin et al. |
| 9,335,606 | B2 | 5/2016 | Hanson et al. |
| 9,784,804 | B2 | 10/2017 | Walsworth et al. |
| 10,126,377 | B2 | 11/2018 | Hahn et al. |
| 10,578,891 | B1* | 3/2020 | Schmeing ............... G06N 10/00 |
| 11,074,520 | B2 | 7/2021 | Sukachev et al. |
| 11,156,674 | B2 | 10/2021 | Hart et al. |
| 11,416,762 | B1* | 8/2022 | Naveh .................... G06N 10/70 |
| 2005/0264435 | A1 | 12/2005 | Bicking |
| 2007/0291255 | A1 | 12/2007 | Larsen et al. |
| 2008/0031296 | A1 | 2/2008 | Spillane et al. |
| 2012/0319684 | A1 | 12/2012 | Gambetta et al. |
| 2014/0061510 | A1 | 3/2014 | Twitchen et al. |
| 2014/0072008 | A1 | 3/2014 | Faraon et al. |
| 2014/0166904 | A1 | 6/2014 | Walsworth et al. |
| 2015/0001422 | A1 | 1/2015 | Englund et al. |
| 2015/0048822 | A1 | 2/2015 | Walsworth et al. |
| 2015/0192532 | A1 | 7/2015 | Clevenson et al. |
| 2015/0253355 | A1 | 9/2015 | Grinolds et al. |
| 2015/0316598 | A1 | 11/2015 | Rogge et al. |
| 2016/0054402 | A1 | 2/2016 | Meriles |
| 2016/0061914 | A1 | 3/2016 | Jelezko et al. |
| 2016/0097832 | A1 | 4/2016 | Suzuki |
| 2016/0161583 | A1 | 6/2016 | Meriles et al. |
| 2016/0252715 | A1 | 9/2016 | Nakano et al. |
| 2017/0038411 | A1 | 2/2017 | Yacobi et al. |
| 2017/0076787 | A1 | 3/2017 | Frank |
| 2017/0227795 | A1* | 8/2017 | Bishop .................... H01P 7/086 |
| 2017/0343695 | A1 | 11/2017 | Stetson et al. |
| 2018/0149717 | A1 | 5/2018 | Jelezko et al. |
| 2018/0203080 | A1 | 7/2018 | Acosta et al. |
| 2018/0351323 | A1 | 12/2018 | Evans et al. |
| 2019/0049495 | A1 | 2/2019 | Ofek et al. |
| 2019/0235031 | A1 | 8/2019 | Ibrahim et al. |
| 2020/0160204 | A1* | 5/2020 | Johnson ................. G06N 10/00 |

FOREIGN PATENT DOCUMENTS

| | | |
|---|---|---|
| WO | WO-2018/226784 A2 | 12/2018 |
| WO | WO-2019/033009 A1 | 2/2019 |
| WO | WO-2021/011765 A1 | 1/2021 |

OTHER PUBLICATIONS

Aasi et al., "Enhancing the sensitivity of the LIGO gravitational wave detector by using squeezed states of light." Nature Photonics, vol. 7, No. 8, Oct. 1, 2013, 10 pages.

Abanin et al. "A Theory of many-body localization in periodically driven systems." Annals of Physics, vol. 372, Aug. 11, 2015, 8 pages.

Abanin et al., "A rigorous theory of many-body prethermalization for periodically driven and closed quantum systems." Communications in Mathematical Physics, Jul. 11, 2017, vol. 354, No. 3. arXiv Jul. 9, 2017, 21 pages.

Abanin et al., "Exponentially slow heating in periodically driven many-body systems." Physical Review Letters, vol. 115, No. 25, Jul. 29, 2015, 5 pages.

Abe et al., "Electron spin coherence of phosphorus donors in silicon: Effect of environmental nuclei," Physical Review B, Sep. 2, 2010, vol. 82, 121201. pp. 1-4.

Abobeih et al., "One-second coherence for a single electron spin coupled to a multi-qubit nuclear-spin environment," Nature Communications, Jun. 29, 2018, vol. 9:2552, pp. 1-8.

Acosta et al., "Diamonds with a high density of nitrogen-vacancy centers for magnetometry applications," Phys. Rev. B, Sep. 9, 2009, vol. 80:115202, pp. 1-15.

Acosta et al., "High nitrogen-vacancy density diamonds for magnetometry applications," Physical Review B—Condensed Matter and Materials Physics (2009) 80, 1. arXiv: 0903.3277, Jul. 31, 2009. 24 pages.

Acosta et al., "Temperature dependence of the nitrogen-vacancy magnetic resonance in diamond," Physical Review Letters (2010) 104, 070801. arXiv: 0911.3938, Feb. 17, 2010. 5 pages.

Allred et al., "High-sensitivity atomic magnetometer unaffected by spin-exchange relaxation." Physical Review Letters, Sep. 23, 2002, vol. 89, No. 13, 4 pages.

Atikian et al., "Freestanding nanostructures via reactive ion beam angled etching," APL Photonics, published online May 9, 2017, vol. 2:51301, pp. 1-6.

Augustine et al., "SQUID detected NMR and NQR," Solid State Nuclear Magnetic Resonance, Mar. 1998, vol. 11, pp. 139-156.

Awschalom et al., "Quantum spintronics: engineering and manipulating atom-like spins in semiconductors," Science (2013), 339, No. 6124, pp. 1174-1179.

Badilita et al., "Microscale nuclear magnetic resonance: a tool for soft matter research," Soft Matter, Jun. 2012, vol. 8, pp. 10583-10597.

Balasubramanian et al., "Ultralong spin coherence time in isotopically engineered diamond," Nature Materials, May 2009, vol. 8, pp. 383-385.

Bar-Gill et al., "Solid-state electronic spin coherence time approaching one second," Nature Communications, Apr. 23, 2013, vol. 4, 1743, 6 pages.

Barry et al., "Optical magnetic detection of single-neuron action potentials using quantum defects in diamond." Proceedings of the National Academy of Sciences, Dec. 6, 2016, vol. 113, No. 49, pp. 14133-14138 and E6730. 7 pages.

Basko et al., "Metal-insulator transition in a weakly interacting many-electron system with localized single-particle states." Annals of Physics, Feb. 2, 2008, vol. 321, No. 5, 99 pages.

Bauch et al. "Ultralong Dephasing Times in Solid-State Spin Ensembles via Quantum Control," Physical Review X, Jul. 25, 2018, vol. 8, 031025, pp. 1-11.

Bauer et al., "Fundamental issues in heteroepitaxy—A Department of Energy, Council on Materials Science Panel Report," Journal of Materials Research, Apr. 1990, vol. 5, No. 4, pp. 852-894.

Beauchamp, Applications of Walsh and Related Functions: With an Introduction to Sequence Theory, (from the series on Microelectronics and Signal Processing), Academic Press, Feb. 11, 1984, entire book: pp. ix-308.

Becker et al., "All-Optical Control of the Silicon-Vacancy Spin in Diamond at Millikelvin Temperatures," Phys. Rev. Lett., Jan. 30, 2018, vol. 120:053603, pp. 1-6.

Becker et al., "Ultrafast all-optical coherent control of single silicon vacancy colour centres in diamond," Nature Communications, Nov. 14, 2016, vol. 7:13512, pp. 1-6.

Belthangady et al., "Dressed-State Resonant Coupling between Bright and Dark Spins in Diamond," Physical Review Letters, Apr. 12, 2013 vol. 110, 157601, pp. 1-5.

Bennett et al., "Quantum cryptography: Public key distribution and coin tossing," Proceedings of the IEEE: International Conference on Computers, Systems and Signal Processing, Bangalore, India, Dec. 9-12, 1984, pp. 175-179. 6 pages.

Bernien et al., "Heralded entanglement between solid-state qubits separated by three metres," Nature, May 2, 2013, vol. 497, pp. 86-90.

(56) References Cited

OTHER PUBLICATIONS

Betzig, "Nobel Lecture: Single molecules, cells, and super-resolution optics," Reviews of Modern Physics, Oct. 21, 2015, vol. 87, No. 4, pp. 1153-1168.
Bhaskar et al., "Experimental demonstration of memory-enhanced quantum communication," Nature, Mar. 23, 2020, vol. 580, pp. 60-64, arXiv:1909.01323v1, Sep. 3, 2019. 15 pages.
Bhaskar et al., "Quantum Nonlinear Optics with a Germanium-Vacancy Color Center in a Nanoscale Diamond Waveguide," Phys. Rev. Lett., Jun. 2, 2017, vol. 118:223603, pp. 1-6.
Biham et al., "Quantum cryptographic network based on quantum memories," Physical Review A, Oct. 1996, vol. 54(4), pp. 2651-2658.
Bloom et al., "An optical lattice clock with accuracy and stability at the $10^{-18}$ level." Nature, Feb. 6, 2014, vol. 506, No. 7486, pp. 71-75.
Boaron et al., "Secure Quantum Key Distribution over 421 km of Optical Fiber," Physical Review Letters, Nov. 5, 2018, vol. 121:190502, pp. 1-4.
Bohnet et al., "Quantum spin dynamics and entanglement generation with hundreds of trapped ions." Science, vol. 352, No. 6291, Jan. 7, 2016, 40 pages.
Borregaard et al. "One-way quantum repeater based on near-deterministic photon-emitter interfaces," Physical Review X, Jun. 30, 2020, vol. 10:021071, pp. 1-13.
Borregaard et al., "One-way quantum repeater based on near-deterministic photon-emitter interfaces," arXiv:1907.05101v1, Jul. 11, 2019. 19 pages.
Bradley et al., "A 10-Qubit Solid-State Spin Register with Quantum Memory up to One Minute," arXiv:1905.02094v1, May 6, 2019. 29 pages.
Bradley et al., "A Ten-Qubit Solid-State Spin Register with Quantum Memory up to One Minute," Physical Review X, Sep. 11, 2019, vol. 9:031045, pp. 1-12.
Braunstein et al., "Side-Channel-Free Quantum Key Distribution," Physical Review Letters, Mar. 30, 2012, PRL 108:130502, pp. 1-4.
Briegel et al., "Quantum Repeaters: The Role of Imperfect Local Operations in Quantum Communication," Physical Review Letters, Dec. 28, 1998, vol. 81(26), pp. 5932-2935.
Budker et al., "Proposal for a cosmic axion spin precession experiment (CASPEr)," Physical Review X, published May 19, 2014, vol. 4, No. 2, pp. 021030-1 to 021030-10.
Bugrij, "The correlation function in two-dimensional Ising model on the finite lattice. I." Theoretical and Mathematical Physics, Apr. 2001, vol. 127, No. 1, 25 pages.
Burek et a., "High quality-factor optical nanocavities in bulk single-crystal diamond," Nature Communications, Dec. 16, 2014, vol. 5:5718, pp. 1-7.
Burek et al., "Fiber-Coupled Diamond Quantum Nanophotonic Interface," Physical Review Applied, Aug. 25, 2017, vol. 8:24026, pp. 1-10.
Buterakos et al., "Deterministic Generation of All-Photonic Quantum Repeaters from Solid-State Emitters," Physical Review X, Oct. 27, 2017, vol. 7:041023, pp. 1-10.
Casanova et al., "Robust Dynamical Decoupling Sequences for Individual Nuclear Spin Adressing," Phys. Rev. A (2015) vol. 92:042304, arXiv:1506.03766v2, Oct. 10, 2015, pp. 1-7.
Childress et al., "Coherent Dynamics of Coupled Electron and Nuclear Spin Qubits in Diamond," Science, Oct. 13, 2006, vol. 314, pp. 281-285.
Childress et al., "Fault-Tolerant Quantum Communication Based on Solid-State Photon Emitters," Physical Review Letters, Feb. 23, 2006, vol. 96, 070504, 4 pages.
Childress et al., "Fault-tolerant quantum repeaters with minimal physical resources and implementations based on single-photon emitters," Phys. Rev. A (2005), vol. 72:052330, arXiv:quant-ph/0502112v1, Feb. 18, 2005, pp. 1-16.
Choi et al., "Depolarization Dynamics in a Strongly Interacting Solid-State Spin Ensemble," Physical Review Letters, Mar. 3, 2017, vol. 118, No. 9, 6 pages.
Choi et al., "Dynamical engineering of interactions in qudit ensembles." Physical Review Letters, Nov. 3, 2017, vol. 119, No. 18, 6 pages.
Choi et al., "Observation of discrete time-crystalline order in a disordered dipolar many-body system." Nature, vol. 543, No. 7644, author manuscript Sep. 8, 2017, pp. 221-225. 23 pages.
Chou et al., "Functional Quantum Nodes for Entanglement Distribution over Scalable Quantum Networks," Science (2007), vol. 316, pp. 1316-1320, arXiv pre-print arXiv:quant-ph/0702057v1, Feb. 6, 2007, pp. 1-9.
Chou et al., "Measurement-induced entanglement for excitation stored in remote atomic ensembles," Nature, Dec. 8, 2005, vol. 438, pp. 828-832.
Clark et al., "Silicon defects in diamond," Phys. Rev. B, Jun. 15, 1995, vol. 51(23), pp. 16681-16688.
Clauser et al., "Proposed Experiment to Test Local Hidden-Variable Theories," Physical Review Letters, Oct. 13, 1969, vol. 23, No. 15, pp. 880-884.
Clevenson et al., "Broadband magnetometry and temperature sensing with a light-trapping diamond waveguide," Nature Physics, May 2015, vol. 11, pp. 393-397 and Corrigendum p. 878.
Curty et al., "Finite-key analysis for measurement-device independent quantum key distribution," Nature Communications, Apr. 29, 2014, vol. 5:3732, pp. 1-7.
De Lange et al., "Controlling the quantum dynamics of a mesoscopic spin bath in diamond," Scientific Reports, Apr. 25, 2012, vol. 2, No. 382, pp. 1-5.
De Lange et al., "Universal Dynamical Decoupling of a Single Solid-State Spin from a Spin Bath," Science, Oct. 1, 2010, vol. 330, pp. 60-63.
De Riedmatten et al., "Tailoring photonic entanglement in high-dimensional Hilbert spaces," Physical Review A, May 18, 2004, vol. 69:50304, pp. 1-4.
Degen et al., "Nanoscale magnetic resonance imaging," Proceedings of the National Academy of Sciences of the United States of America, Feb. 3, 2009, vol. 106(5), pp. 1313-1317.
Degen et al., "Quantum sensing," Reviews of Modern Physics, Jul. 25, 2017, vol. 89, No. 3, pp. 035002-1 to 035002-39.
Delteil et al., "Generation of heralded entanglement between distant hole spins," Nature Physics, Mar. 2016, vol. 12, pp. 218-222.
Delteil et al., "Observation of Quantum Jumps of a Single Quantum Dot Spin Using Submicrosecond Single-Shot Optical Readout," Physical Review Letters, Mar. 19, 2014, vol. 112, 116802, 5 pages.
Deutsch et al., "Spin self-rephasing and very long coherence times in a trapped atomic ensemble." Physical Review Letters, Jul. 9, 2010, vol. 105, No. 2, 4 pages.
DeVience et al., "Nanoscale NMR spectroscopy and imaging of multiple nuclear species," Nature Nanotechnology, Jan. 5, 2015, vol. 10, pp. 129-134 (7 total pages).
Diddams et al., "An optical clock based on a single trapped 199Hg+ ion," Science, Aug. 3, 2001, vol. 293, No. 5531, pp. 825-828.
Dieks, D., "Communication by EPR devices," Physics Letters A, Nov. 22, 1982, vol. 92A(6), pp. 271-272.
Doherty et al., "The negatively charged nitrogen-vacancy centre in diamond: the electronic solution," New J. Phys., Feb. 21, 2011, vol. 13:025019, pp. 1-23.
Doherty et al., "The nitrogen-vacancy colour centre in diamond," Physics Reports, published online Mar. 4, 2013, vol. 528, pp. 1-45.
Dory et al., "Optimized Diamond Quantum Photonics," arXiv:1812.02287v1, Dec. 6, 2018. 17 pages.
Dory et al., "Inverse-designed diamond photonics," Nature Communications, published online Jul. 25, 2019, vol. 10: 3309, pp. 1-7.
Dreau et al., "Avoiding power broadening in optically detected magnetic resonance of single NV defects for enhanced DC-magnetic field sensitivity," Physical Review B, Nov. 23, 2011, vol. 84(19), 3 pages.
Duan et al., "Scalable Photonic Quantum Computation through Cavity-Assisted Interactions," Physical Review Letters, Mar. 26, 2004, vol. 92, No. 12, 127902, pp. 1-4.
Dutt et al., "Quantum Register Based on Individual Electronic and Nuclear Spin Qubits in Diamond," Science, Jun. 1, 2007, vol. 316, pp. 1312-1316.

(56) References Cited

OTHER PUBLICATIONS

Dutta et al., "Phase transitions in the quantum Ising and rotor models with a long-range interaction." Physical Review B, Oct. 18, 2001, vol. 64, No. 18, 7 pages.
Edmonds et al., "Electron paramagnetic resonance studies of silicon-related defects in diamond," Physical Review B, Jun. 2008, vol. 77, 245205, 12 pages.
Elliott et al., "The Ising model with a transverse field. I. High temperature expansion." Journal of Physics C: Solid State Physics, Oct. 1971, vol. 4, No. 15, pp. 2359-2369.
Else et al., "Floquet time crystals." Physical Review Letters, Aug. 26, 2016, vol. 117, No. 9, 5 pages.
Else et al., "Prethermal phases of matter protected by time-translation symmetry." Physical Review X, Mar. 7, 2017, vol. 7, No. 1, 21 pages.
Essler et al., "Finite temperature dynamical correlations in massive integrable quantum field theories." Journal of Statistical Mechanics: Theory and Experiment, vol. 2009, No. 09, Oct. 7, 2009, 54 pages.
Evans et al., "Coherent optical emitters in diamond nanostructures via ion implantation," Phys. Rev. Appl. (2016), vol. 5:044010, arXiv: 1512.03820v2, Dec. 15, 2015. 7 pages.
Evans et al., "Photon-mediated interactions between quantum emitters in a diamond nanocavity," Science, Nov. 9, 2018, vol. 362, pp. 662-665.
Fang et al., "High-Sensitivity Magnetometry Based on Quantum Beats in Diamond Nitrogen-Vacancy Centers," Physical Review Letters, Mar. 26, 2013, vol. 110, 130802, pp. 1-5.
Faraon et al., "Coupling of Nitrogen-Vacancy Centers to Photonic Crystal Cavities in Monocrystalline Diamond," Physical Review Letters (2012), vol. 109:033604, arXiv pre-print arXiv:1202.0806v1, Feb. 3, 2012. 5 pages.
Farfurnik et al., "Optimizing a Dynamical Decoupling Protocol for Solid-State Electronic Spin Ensembles in Diamond," Physical Review B, Aug. 24, 2015, vol. 92(6), 5 pages.
Fey et al., "Critical behavior of quantum magnets with long-range interactions in the thermodynamic limit." Physical Review B, vol. 94, No. 7, Sep. 5, 2016, 12 pages.
Fisher et al., "Critical exponents for long-range interactions." Physical Review Letters, Oct. 2, 1972, vol. 29, No. 14, pp. 917-920.
Fonseca et al. "Ising field theory in a magnetic field: analytic properties of the free energy." Journal of Statistical Physics, vol. 110, No. 3-6, Dec. 19, 2001, 66 pages.
Fratila et al., "Small-Volume Nuclear Magnetic Resonance Spectroscopy," Annual Review of Analytical Chemistry, Jul. 2011, vol. 4, 227-249 (25 total pages).
Frerot et al., "Quantum Critical Metrology," Physical Review Letters, received Aug. 1, 2017, published Jul. 11, 2018, vol. 121, 6 pages.
Friedman, "Ising model with a transverse field in two dimensions: Phase diagram and critical properties from a real-space renormalization group." Physical Review B, Feb. 1, 1978, vol. 17, No. 3, pp. 1429-1432.
Gao et al. ,"Observation of entanglement between a quantum dot spin and a single photon," Nature, Nov. 15, 2012, vol. 491, pp. 426-430.
Gao et al., "Coherent manipulation, measurement and entanglement of individual solid-state spins using optical fields," Nature Photonics, Jun. 2015, vol. 9, pp. 363-373.
Gisin et al., "Quantum cryptography," Reviews of Modern Physics, Jan. 2002, vol. 74, pp. 145-195.
Glenn et al., "Micrometer-scale magnetic imaging of geological samples using a quantum diamond microscope." Geochemistry, Geophysics, Geosystems, published online Aug. 22, 2017, vol. 18, No. 8, pp. 3254-3267.
Gold, "Optimal binary sequences for spread spectrum multi-plexing (Corresp.)," IEEE Transactions on Information Theory, Oct. 4, 1967, vol. 13, Issue 4, pp. 619-621.
Gottesman et al., "Longer-Baseline Telescopes Using Quantum Repeaters," Phys. Rev. Lett., Aug. 17, 2012, PRL 109:070503, pp. 1-5.
Grezes et al. "Multi-mode storage and retrieval of microwave fields in a spin ensemble," Physical Review A (2015) 92, 020301. arXiv: 1401.7939, Jan. 30, 2014. 20 pages.
Grinolds et al., "Subnanometre resolution in three-dimensional magnetic resonance imaging of individual dark spins," Nature Nanotechnology, Apr. 2014, vol. 9, pp. 279-284.
Grisi et al., "NMR spectroscopy of single sub-nL ova with inductive ultra-compact single-chip probes," Scientific Reports, Mar. 20, 2017, vol. 7, 8 pages.
Guitard et al., "Local nuclear magnetic resonance spectroscopy with giant magnetic resistance-based sensors," Applied Physics Letters, May 26, 2016, vol. 108, 5 pages.
Gullion et al., "New, Compensated Carr-Purcell Sequences," Journal of Magnetic Resonance (1969), Oct. 1, 1990, vol. 89, issue 3, pp. 479-484.
Hahn, "Spin echoes." Physical Review, Nov. 15, 1950, vol. 80, No. 4, 22 pages.
Hauke et al., "Measuring multipartite entanglement via dynamic susceptibilities." Nature Physics, vol. 12, No. 8, Sep. 5, 2015, 11 pages.
Hensen et al., "Loophole-free Bell inequality violation using electron spins separated by 1.3 kilometres," Nature, Oct. 29, 2015, vol. 526, pp. 682-686.
Hepp et al., "Electronic Structure of the Silicon Vacancy Color Center in Diamond," Phys. Rev. Lett., Jan. 24, 2014, PRL 112, 036405, 5 pages.
Herzog et al., "Boundary between the thermal and statistical polarization regimes in a nuclear spin ensemble," Applied Physics Letters, Aug. 1, 2014, vol. 105(4), 6 pages.
Ho et al., "Critical time crystals in dipolar systems." Physical Review Letters, vol. 119, No. 1, Jul. 7, 2017, 6 pages.
Hosten et al., "Measurement noise 100 times lower than the quantum-projection limit using entangled atoms." Nature, Jan. 28, 2016, vol. 529, No. 7587, pp. 505-508.
Huthmacher et al., "Coherence of a dynamically decoupled quantum-dot hole spin," Phys. Rev. B, Jun. 28, 2018, vol. 97, 241413(R), pp. 1-5.
International Search Report and Written Opinion mailed Aug. 24, 2017, in the International Application No. PCT/US17/35194, 14 pages.
International Search Report and Written Opinion mailed Aug. 27, 2018, in the International Application No. PCT/US18/36197. 11 pages.
International Search Report and Written Opinion mailed Jan. 16, 2018, in the International Application No. PCT/US2017/060753. 15 pages.
International Search Report and Written Opinion mailed Mar. 6, 2018, in the International Application No. PCT/US17/34256. 14 pages.
International Search Report and Written Opinion Mailed Oct. 22, 2018, in the International Application No. PCT/US18/46287. 16 pages.
International Search Report and Written Opinion mailed Oct. 28, 2020, in the International Application No. PCT/US20/42316. 13 pages.
Ishikawa et al., "Optical and Spin Coherence Properties of Nitrogen-Vacancy Centers Placed in a 100 nm Thick Isotopically Purified Diamond Layer," Nano Letters, Mar. 9, 2012, vol. 12, No. 4, pp. 2083-2087.
Jahnke et al., "Electron-phonon processes of the silicon-vacancy centre in diamond," New J. Phys., Apr. 8, 2015, vol. 17:043011, pp. 1-11.
Javadi et al., "Single-photon non-linear optics with a quantum dot in a waveguide," Nat. Commun., Oct. 23, 2015, vol. 6:8655, pp. 1-5.
Jiang et al., "Repetitive Readout of a Single Electronic Sin via Quantum Logic with Nuclear Spin Ancillae," Science, Oct. 9, 2009, vol. 326, pp. 267-272, and supporting online material. 28 pages.
Jiang et al., "Universal dynamical decoupling of multiqubit states from environment." Physical Review A, Dec. 28, 2011, vol. 84, No. 6, 4 pages.
Kalb et al., "Entanglement distillation between solid-state quantum network nodes," Science, Jun. 2, 2017, vol. 356, 928-932. 5 pages.

(56) References Cited

OTHER PUBLICATIONS

Kalb et al., "Heralded Storage of a Photonic Quantum Bit in a Single Atom," Physical Review Letters, Jun. 5, 2015, PRL 114:220501, pp. 1-5.

Kalish et al., "Graphitization of diamond by ion impact: Fundamentals and applications," Nuclear Instruments and Methods in Physics Research Section B: Beam Interactions with Materials and Atoms, Dec. 1995, vol. 106, pp. 492-499.

Khabiboulline et al., "Optical interferometry with quantum networks," Phys. Rev. Lett., Aug. 15, 2019, vol. 123:070504, pp. 1-7.

Khanaliloo et al., "High-Q/V Monolithic Diamond Microdisks Fabricated with Quasiisotropic Etching," Nano Letters, Jul. 2, 2015, vol. 15, pp. 5131-5136.

Khemani et al., "Phase structure of driven quantum systems." Physical Review Letters, Jun. 24, 2016, vol. 116, No. 25, pp. 250401-1 to 250401-6.

Kim et al., "Strong coupling between two quantum dots and a photonic crystal cavity using magnetic field tuning," Optics Express, Jan. 31, 2011, vol. 19(3), pp. 2589-2598.

Kimble, H. J., "The quantum internet," Nature, Jun. 19, 2008, vol. 453, pp. 1023-1030.

Klimov et al., "Quantum entanglement at ambient conditions in a macroscopic solid-state spin ensemble," Science Advances, Nov. 20, 2015, vol. 1, No. 10, e1501015. pp. 1-7.

Knap et al., "Probing Real-Space and Time-Resolved Correlation Functions with Many-Body Ramsey Interferometry." Physical Review Letters, Oct. 4, 2013, vol. 111, No. 14, 6 pages.

Knowles et al., "Observing bulk diamond spin coherence in high-purity nanodiamonds," Nature Materials, (2014) 13(1). arXiv: 1310.1133, Oct. 3, 2013. 16 pages.

Koehl et al., "Resonant optical spectroscopy and coherent control of Cr4+ spin ensembles in SiC and GaN," Physical Review B (2017) 95, 035207. arXiv: 1608.08255, Aug. 29, 2016. 13 pages.

Kolkowitz et al., "Gravitational wave detection with optical lattice atomic clocks." Physical Review D, Dec. 27, 2016, vol. 94, No. 12, 15 pages.

Kolkowitz et al., "Sensing Distant Nuclear Spins with a Single Electronc Spin," Phys. Rev. Lett., Sep. 28, 2012, PRL 109, 137601, 5 pages.

Komar et al., "A quantum network of clocks," Nature Physics, Aug. 2014, vol. 10, pp. 582-587.

Kong et al., "Towards Chemical Structure Resolution with Nanoscale Nuclear Magnetic Resonance Spectroscopy," Physical Review Applied, Jun. 19, 2015, vol. 4, 024004. 6 pages.

Kucsko et al., "Critical thermalization of a disordered dipolar spin system in diamond," arXiv preprint, Sep. 26, 2016, arXiv:1609.08216 v1. 41 pages.

Kucsko et al., "Critical Thermalization of a Disordered Dipolar Spin System in Diamond," Physical Review Letters, submitted Sep. 26, 2016, arXiv: 1609.08216 v2. Oct. 25, 2017, 47 pages.

Kuhlmann et al., "Transform-limited single photons from a single quantum dot," Nature Communications, Sep. 8, 2015, vol. 6:8204, pp. 1-6.

Kuo et al., "Quadratic dynamical decoupling: Universality proof and error analysis." Physical Review A, vol. 84, No. 4, Jun. 10, 2011, 18 pages.

Kuwahara et al., "Floquet-Magnus theory and generic transient dynamics in periodically driven many-body quantum systems." Annals of Physics, vol. 367, Feb. 12, 2016, 19 pages.

Lacey et al., "High-Resolution NMR Spectroscopy of Sample Volumes from 1 nL to 10 μL," Chemical Reviews, Sep. 16, 1999, vol. 99, pp. 3133-3152.

Lathi, Modern Digital and Analog Communication Systems, Third Edition, Oxford University Press, USA, Apr. 10, 1998, 554 pages.

Lazarides et al., "Fate of many-body localization under periodic driving." Physical Review Letters, Jul. 27, 2015, vol. 115, No. 3, 9 pages.

Le Sage et al., "Optical magnetic imaging of living cells," Nature, Apr. 25, 2013, vol. 496, pp. 486-489. 6 pages.

Lo et al., "Decoy State Quantum Key Distribution," Physical Review Letters, Jun. 17, 2005, PRL 94:230504, pp. 1-4.

Lo et al., "Efficient Quantum Key Distribution Scheme and a Proof of Its Unconditional Security," Journal of Cryptology (2005), published online Mar. 3, 2004, vol. 18, pp. 133-165.

Lo et al., "Measurement-Device-Independent Quantum Key Distribution," Physical Review Letters, Mar. 30, 2012, PRL 108:130503, pp. 1-5.

Lodahl et al., "Interfacing single photons and single quantum dots with photonic nanostructures," Reviews of Modern Physics, Apr.-Jun. 2015, vol. 87, pp. 347-400.

Lovchinsky et al., "Magnetic resonance spectroscopy of an atomically thin material using a single-spin qubit." Science, Jan. 19, 2017, vol. 355, No. 6324, 18 pages.

Lovchinsky et al., "Nuclear magnetic resonance detection and spectroscopy of single proteins using quantum logic," Science, Feb. 19, 2016, vol. 351, Issue 6275, pp. 836-841.

Machielse et al., "Quantum interference of electromechanically stabilized emitters in nanophotonic devices," arXiv preprint, arXiv:1901.09103, Jan. 25, 2019. 10 pages.

Machielse et al., "Quantum Interference of Electromechanically Stabilized Emitters in Nanophotonic Devices," Physical Review X, Aug. 9, 2019, vol. 9:31022, pp. 1-11.

Macieszczak et al., "Dynamical phase transitions as a resource for quantum enhanced metrology." Physical Review A, Feb. 3, 2016, vol. 93, No. 2, 10 pages.

Maertz et al., "Vector magnetic field microscopy using nitrogen vacancy centers in diamond,". Applied Physics Letters, published online: Mar. 1, 2010, vol. 96, pp. 092504-1 to 092504-3.

Maghrebi et al., "Causality and quantum criticality in long-range lattice models." Physical Review B, Mar. 17, 2016, vol. 93, No. 12, 18 pages.

Mamin et al., "Multipulse Double-Quantum Magnetometry with Near-Surface Nitrogen-Vacancy Centers," Physical Review Letters, (2014), vol. 113, 030803. arXiv: 1404.7480, Jul. 14, 2015. 33 pages.

Mamin et al., "Nanoscale Nuclear Magnetic Resonance with a Nitrogen-Vacancy Spin Sensor," Science, Feb. 1, 2013, vol. 339, pp. 557-560.

Maurer et al., "Room-temperature quantum bit memory exceeding one second." Science, Jun. 8, 2012, vol. 336, No. 6086, pp. 1283-1286.

Maze et al., "Nanoscale magnetic sensing with an individual electronic spin in diamond," Nature, Oct. 2, 2008, vol. 455, No. 7213, pp. 644-647. 5 pages.

Medford et al., "Scaling of Dynamical Decoupling for Spin Qubits," Physical Review Letters, Feb. 24, 2012, vol. 108, 086802, 5 pages.

Meesala et al., "Strain engineering of the silicon-vacancy center in diamond," Phys. Rev. B, May 29, 2018, vol. 97:205444. 15 pages.

Meiboom et al., "Modified Spin-Echo Method for Measuring Nuclear Relaxation Times," The Review of Scientic Instruments, Aug. 1958, vol. 29, No. 8, pp. 688-691.

Meriles et al., "Imaging mesoscopic nuclear spin noise with a diamond magnetometer," The Journal of Chemical Physics, Sep. 27, 2010, vol. 133(12), 10 pages.

Metsch, "Initialization and Readout of Nuclear Spins via negatively charged Silicon-Vacancy Center in Diamond," arXiv:1902.02965v1, Feb. 8, 2019, pp. 1-6.

Metsch, "Initialization and Readout of Nuclear Spins via negatively charged Silicon-Vacancy Center in Diamond," Physical Review Letters, May 17, 2019, vol. 122:190503, pp. 1-5.

Milov et al., "Electron-Electron Double Resonance in Electron Spin Echo: Model Biradical Systems and the Sensitized Photolysis of Decalin," Chemical Physics Letters, Sep. 14, 1984, vol. 110(1), pp. 67-72.

Minder et al., "Experimental quantum key distribution beyond the repeaterless secret key capacity," Nature Photonics, May 2019, vol. 13, pp. 334-338 and Methods. 7 pages.

Moison et al., "Self-organized growth of regular nanometer-scale InAs dots on GaAs," Applied Physics Letters, Jan. 10, 1994, vol. 64, pp. 196-198.

Molesky et al., "Inverse design in nanophotonics," Nature Photonics, Nov. 2018, vol. 12, pp. 659-670.

(56) References Cited

OTHER PUBLICATIONS

Monroe et al., "Large-scale modular quantum-computer architecture with atomic memory and photonic interconnects," Physical Review A, Feb. 13, 2014, vol. 89:22317, pp. 1-16.
Mori et al., "Rigorous bound on energy absorption and generic relaxation in periodically driven quantum systems." Physical Review Letters, vol. 116, No. 12, Mar. 17, 2017, 11 pages.
Mouradian et al., "Rectangular photonic crystal nanobeam cavities in bulk diamond," Applied Physics Letters, published online Jul. 10, 2017, vol. 111:021103, pp. 1-4.
Mousoulis et al., "Single Cell Spectroscopy: Noninvasive measures of small-scale structure and function," Methods, Dec. 2013, vol. 64(2), pp. 119-128.
Muller et al., "Optical signatures of silicon-vacancy spins in diamond," Nat. Comm., Feb. 18, 2014, vol. 5:3328, pp. 1-7.
Myers et al., "Probing Surface Noise with Depth-Calibrated Spins in Diamond," Phys. Rev. Lett., Jul. 11, 2014, PRL 113, 027602, 6 pages.
Nandkishore et al., "Many-body localization and thermalization in quantum statistical mechanics." Annual Review of Condensed Matter Physics, Mar. 2015, vol. 6, No. 1, pp. 15-38.
Neill et al., "Fluctuations from edge defects in superconducting resonators," Applied Physics Letters, published online Aug. 16, 2013, vol. 103:072601, pp. 1-4.
Neu et al., "Single photon emission from silicon-vacancy colour centres in chemical vapour deposition nano-diamonds on iridium," New Journal of Physics, Feb. 21, 2011, vol. 13, 025012, 21 pages.
Nguyen et al., "An integrated nanophotonic quantum register based on silicon-vacancy spins in diamond," Phys. Rev. B, Oct. 30, 2019, vol. 100:165428—arXiv:1907.13200v2, Aug. 1, 2019. 21 pages.
Nguyen et al., "An integrated nanophotonic quantum register based on silicon-vacancy spins in diamond," Phys. Rev. B, Oct. 30, 2019, vol. 100:165428, pp. 1-19.
Nguyen et al., "Quantum Network Nodes Based on Diamond Qubits with an Efficient Nanophotonic Interface," Phys. Rev. Lett., Oct. 30, 2019, vol. 123:183602—arXiv: 1907.13199v2, Aug. 1, 2019. 6 pages.
Olson et al., "High-Resolution Microcoil 1H-NMR for Mass-Limited, Nanoliter-Volume Samples," Science, Dec. 22, 1995, vol. 270, issue 5244. 6 pages.
Panayi et al., "Memory-assisted measurement-device-independent quantum key distribution," New Journal of Physics, Apr. 7, 2014, vol. 16:43005, pp. 1-24.
Pfaff et al., "Unconditional quantum teleportation between distant solid-state quantum bits," Science, Aug. 1, 2014, vol. 345, issue 6196, pp. 532-535.
Pfeuty et al. "The Ising model with a transverse field. II. Ground state properties." Journal of Physics C: Solid State Physics, Oct. 1971, vol. 4, No. 15, pp. 2370-2385.
Pham et al., "Magnetic field imaging with nitrogen-vacancy ensembles" New Journal of Physics, Apr. 28, 2011, vol. 13, pp. 045021:1-13.
Pingault et al., "All-Optical Formation of Coherent Dark States of Silicon-Vacancy Spins in Diamond," Physical Review Letters, Dec. 22, 2014, vol. 113, 263601, 5 pages.
Pingault et al., "Choherent control of the silicon-vacancy spin in diamond," Nature Communications, May 30, 2017, vol. 8:15579, pp. 1-7.
Pirandola et al., "Advances in quantum cryptography," Advances in Optics ad Photonics, Dec. 2020, vol. 12, No. 4, pp. 1012-1236.
Pirandola et al., "Fundamental limits of repeaterless quantum communications," Nature Communications, Apr. 26, 2017, vol. 8:15043, pp. 1-15.
Ponte et al., "Many-body localization in periodically driven systems." Physical Review Letters, vol. 114, No. 14, Oct. 30, 2014, 7 pages.
Popa et al., "Energy levels and decoherence properties of single electron and nuclear spins in a defect center in diamond". Physical Review B, Nov. 5, 2004, vol. 70, 201203. 4 pages.
Press et al., "Ultrafast optical spin echo in a single quantum dot," Nature Photonics, Jun. 2010, vol. 4, pp. 367-370.
Raussendorf et al., "A One-Way Quantum Computer," Physical Review Letters, May 28, 2001, vol. 86(22), pp. 5188-5191.
Reiserer et al., "A quantum gate between a flying optical photon and a single trapped atom," Nature, Apr. 10, 2014, vol. 508, pp. 237-240 and Methods. 8 pages.
Reiserer et al., "Cavity-based quantum networks with single atoms and optical photons," Reviews of Modern Physics, Oct.-Dec. 2015, vol. 87(4), pp. 1379-1418.
Riedel et al., "Deterministic Enhancement of Coherent Photon Generation from a Nitrogen-Vacancy Center in Ultrapure Diamond," Physical Review X, Sep. 7, 2017, vol. 7:031040, pp. 1-8.
Robledo et al., "High-fidelity projective read-out of a solid-state spin quantum register," Nature, Sep. 2011, vol. 477, pp. 574-578.
Rogers et al., "All-Optical Initialization, Readout, and Coherent Preparation of Single Silicon-Vacancy Spins in Diamond," Phys. Rev. Lett., Dec. 31, 2014, PRL 113:263602, pp. 1-5.
Rogers et al., "Multiple intrinsically identical single-photon emitters in the solid state", Nature Communications, Aug. 27, 2014, vol. 5:4739, pp. 1-6.
Rondin et al., "Magnetometry with nitrogen-vacancy defects in diamond," Reports on Progress in Physics, May 6, 2014, vol. 77, 056503, 26 pages.
Rong et al., "Experimental fault-tolerant universal quantum gates with solid-state spins under ambient conditions," Nature Communications (2015), vol. 6:8748, arXiv:1506.08627v2, Nov. 26, 2015, pp. 1-22.
Rosskopf, "Advanced quantum sensing using nitrogen vacancy centers in diamond," doctoral thesis submitted ETH Zurich, published 2016, 38 pages.
Rowan et al., "Electron-Spin-Echo Envelope Modulation," Phys. Rev., Jan. 4, 1965, vol. 137, No. 1A, pp. A61-A71 and figures. 13 pages.
Ruf et al., "Optically Coherent Nitrogen-Vacancy Centers in Micrometer-Thin Etched Diamond Membranes," Nano Letters, May 28, 2019, vol. 19, 3987-3992.
Ruf et al., "Optically coherent nitrogen-vacancy centers in μm-thin etched diamond membranes," arXiv:1904.00883v1, Apr. 1, 2019. 7 pages.
Ryan et al., "Robust Decoupling Techniques to Extend Quantum Coherence in Diamond," Physical Review Letters, Nov. 12, 2010, PRL 105:200402, pp. 1-4.
Sasaki et al., "Practical quantum key distribution protocol without monitoring signal disturbance," Nature, May 22, 2014, vol. 509, pp. 475-478 and Methods. 5 pages.
Savukov et al., "NMR detection with an atomic magnetometer," Physical Review Letters, Apr. 1, 2005, vol. 94(12), 4 pages.
Schreiber et al., "Observation of many-body localization of interacting fermions in a quasi-random optical lattice," Science, Jan. 22, 2015, vol. 349, No. 6250, p. 842-845. 14 pages.
Schwartz et al., "Robust optical polarization of nuclear spin baths using Hamiltonian engineering of nitrogen-vacancy center quantum dynamics," Science Advances, Aug. 31, 2018, vol. 4:eaat8978, pp. 1-7.
Serber et al., "In-Cell NMR Spectroscopy," Methods in Enzymology, Feb. 2005, vol. 394, pp. 17-41.
Shields et al., "Efficient Readout of a Single Spin State in Diamond via Spin-to-Charge Conversion," Physical Review Letters, Apr. 3, 2015, vol. 114(13), 5 pages.
Shinada et al., "Deterministic doping to silicon and diamond materials for quantum processing," 2016 IEEE, 16th International Conference on Nanotechnology, Japan, Aug. 22-25, 2016, pp. 888-890.
Shor et al., "Simple proof of security of the BB84 quantum key distribution protocol," Physical Review Letters, Jul. 10, 2000, vol. 85(2), pp. 441-444.
Sigillito et al., "Fast, low-power manipulation of spin ensembles in superconducting microresonators," Applied Physics Letters, published online Jun. 5, 2014, vol. 104, 222407, 4 pages.
Sipahigil et al., "An integrated diamond nanophotonics platform for quantum-optical networks," Science, Nov. 18, 2016, vol. 354(6314), pp. 847-850.

(56) References Cited

OTHER PUBLICATIONS

Sipahigil et al., "Indistinguishable Photons from Separated Silicon-Vacancy Centers in Diamond," Physical Review Letters, Sep. 12, 2014, PRL 113, 113602. 5 pages.
Siyushev et al., "Optical and microwave control of germanium-vacancy center spins in diamond," Physical Review B, Aug. 18, 2017, vol. 96: 081201(R), pp. 1-5.
Skotiniotis et al., "Quantum metrology for the Ising Hamiltonian with transverse magnetic field." New Journal of Physics, Jul. 31, 2015, vol. 17, No. 7, 12 pages.
Smith et al., "Many-body localization in a quantum simulator with programmable random disorder." Nature Physics, Oct. 2016, vol. 12, No. 10, pp. 907-911.
Staudacher et al., "Enhancing the spin properties of shallow implanted nitrogen vacancy centers in diamond by epitaxial overgrowth," Applied Physics Letters, published online Nov. 21, 2012, vol. 101:212401, pp. 1-4.
Staudacher et al., "Nuclear Magnetic Resonance Spectroscopy on a (5-Nanometer)3 Sample Volume," Science, Feb. 1, 2013, vol. 339, Issue 6119, pp. 561-563.
Staudacher et al., "Probing molecular dynamics at the nanoscale via an individual paramagnetic centre," Nature Communications, Oct. 12, 2015, vol. 6, No. 8527, 7 pages.
Steinert et al., "High sensitivity magnetic imaging using an array of spins in diamond," Review of Scientic Instruments, published online: Apr. 23, 2010, vol. 81, article 043705, 13 pages.
Strobel et al., "Fisher information and entanglement of non-Gaussian spin states." Science, Jul. 25, 2014, vol. 345, No. 6195, pp. 424-427. (arXiv version Jul. 14, 2015). 11 pages.
Stute et al., "Quantum-state transfer from an ion to a photon," Nature Photonics, Mar. 2013, vol. 7, pp. 219-222.
Stute et al., "Tunable ion-photon entanglement in an optical cavity," Nature, May 24, 2012, vol. 485, pp. 482-485 and Methods. 5 pages.
Sukachev et al., "Silicon-Vacancy Spin Qubit in Diamond: A Quantum Memory Exceeding 10 ms with Single-Shot State Readout," Physical Review Letters, Dec. 1, 2017, PRL 119:223602, pp. 1-6.
Sun et al. "Single-shot optical readout of a quantum bit using cavity quantum electrodynamics," Physical Review A (2016), 94(1), 012307, arXiv pre-print: arXiv:1602.04367v1. 20 pages.
Sun et al., "A quantum phase switch between a single solid-state spin and a photon," Nature Nanotechnology, Jun. 2016, vol. 11, pp. 539-544 and Methods. 7 pages.
Suter, D. and Alvarez G.A. 2016. Colloquium: protecting quantum information against environmental noise. Reviews for Modern Physics, 88(4), 041001. 23 pages.
Taminiau et al., "Universal control and error correction in multi-qubit spin registers in diamond," Nature Nanotechnology, Mar. 2014, vol. 9, pp. 171-176.
Taylor et al. "High-sensitivity diamond magnetometer with nanoscale resolution," Nature Physics, published online: Sep. 14, 2008, vol. 4, pp. 810-816.
Tiecke et al., "Nanophotonic quantum phase switch with a single atom," Nature, Apr. 10, 2014, vol. 508, pp. 241-244.
Toyli et al., "Chip-Scale Nanofabrication of Single Spins and Spin Arrays in Diamond," Nano Letters, published online Jul. 23, 2010, vol. 10, pp. 3168-3172.
Trusheim et al., "Lead-related quantum emitters in diamond," Physical Review B, Feb. 21, 2019, vol. 99:075430, pp. 1-7.
Trusheim et al., "Transform-limited photons from a tin-vacancy spin in diamond," arXiv preprint, arXiv:1811.07777v1, Nov. 19, 2018, pp. 1-6.
Vinante et al., "Magnetic resonance force microscopy of paramagnetic electron spins at millikelvin temeratures," Nature Communications, Dec. 6, 2011, vol. 2(1), pp. 1-6.
Von Keyserlingk et al. "Absolute stability and spatiotemporal long-range order in Floquet systems." Physical Review B, Aug. 8, 2016, vol. 94, No. 8, 11 pages.
Waldherr et al., "Quantum error correction in a solid-state hybrid spin register," Nature, Feb. 13, 2014, vol. 506, pp. 204-207, Methods, Figures and Tables. 14 pages.
Walsh, "A Closed Set of Normal Orthogonal Functions," American Journal of Mathematics, Jan. 1923, vol. 45, No. 1, pp. 5-24.
Walsworth et al., "Synchronized-Readout for narrowband detection of time-varying electromagnetic fields using solid state spins," Harvard Office of Technology Development, Mar. 27, 2017. 21 pages.
Wang et al. "An optogenetics- and imaging-assisted simultaneous multiple patch-clamp recording system for decoding complex neural circuits," Nature Protocols, Feb. 5, 2015, vol. 10, pp. 397-412. 30 pages.
Waugh et al., "Approach to high-resolution NMR in solids." Physical Review Letters, Jan. 29, 1968, vol. 20, No. 5, 4 pages.
Welte et al., "Cavity Carving of Atomic Bell States," Phys. Rev. Lett., May 26, 2017, PRL 118:210503, pp. 1-6.
Welte et al., "Photon-Mediated Quantum Gate between Two Neutral Atoms in an Optical Cavity," Physical Review X, Feb. 6, 2018, vol. 8:011018, pp. 1-11.
Wolf et al., "Subpicotesla Diamond Magnetometer," arXiv:1411.6553v1, Nov. 24, 2014. 11 pages.
Wolf et al., "Subpicotesla Diamond Magnetometry," Physical Review X, Oct. 5, 2015, vol. 5:041001, pp. 1-10.
Wootters et al., "A single quantum cannot be cloned," Nature, Oct. 1982, vol. 299, pp. 802-803.
Wootters, W., "Entanglement of Formation of an Arbitrary State of Two Qubits," Phys. Rev. Lett., Mar. 9, 1998, vol. 80(10), pp. 2245-2248.
Yamamoto et al., "Extending spin coherence times of diamond qubits by high-temperature annealing," Physical Review B, Aug. 23, 2013, vol. 88:075206, 8 pages.
Yao et al., "Discrete Time Crystals: Rigidity, Criticality, and Realizations," Phys. Rev. Lett., Jan. 20, 2017, vol. 118, 6 pages.
Yuan et al., "Experimental demonstration of a BDCZ quantum repeater node," Nature, Aug. 28, 2008, vol. 454, pp. 1098-1101.
Zaiser et al., "Enhancing quantum sensing sensitivity by a quantum memory," Nature Communications, vol. 7, Article No. 12279, Aug. 10, 2016, 11 pages.
Zanardi et al., "Quantum criticality as a resource for quantum estimation." Physical Review A, Oct. 9, 2008, vol. 78, No. 4, 7 pages.
Zhang et al., "Large scale quantum key distribution: challenges and solutions [Invited]," Optics Express, Sep. 3, 2018, vol. 26(18), pp. 24260-24273.
Zhang et al., "Observation of a discrete time crystal." Nature, Mar. 9, 2017, vol. 543, No. 7644, pp. 217-220. 12 pages.
Zurek et al., "Dynamics of a quantum phase transition." Physical Review Letters (2005) vol. 95, No. 10. arXiv Feb. 14, 2006, 4 pages.

\* cited by examiner

NANOPHOTONIC QUANTUM MEMORY

CROSS-REFERENCE TO RELATED APPLICATIONS

This application is a national stage application of International Application No. PCT/US2020/042316 entitled "Nanophotonic Quantum Memory" filed on Jul. 16, 2020, which claims the benefit of priority to U.S. Provisional Application No. 62/875,340, entitled "Nanophotonic Quantum Memory," filed on Jul. 17, 2019, the disclosures of which are hereby incorporated by reference in their entirety.

STATEMENT OF GOVERNMENTAL INTEREST

This invention was made with government support under Grant Nos. 1506284, 1125846, and 1541959 awarded by National Science Foundation; under Grant No. N00014-15-1-2846 awarded by Office of Naval Research; under Grant No. FA9550-16-1-0323 awarded by Air Force Office of Scientific Research; and under Grant No. W911NF-15-2-0067 awarded by Army Research Laboratory. The government has certain rights in the invention.

TECHNICAL FIELD

The invention relates to quantum memory, and more particularly to quantum network nodes and quantum repeaters.

COPYRIGHT NOTICE

This disclosure may contain material that is subject to copyright protection. The copyright owner has no objection to the facsimile reproduction by anyone of the patent document or the patent disclosure as it appears in the U.S. Patent and Trademark Office patent file or records, but otherwise reserves any and all copyright rights.

BACKGROUND

The realization of quantum networks is one of the central challenges in quantum science and engineering with applicability to long-distance communication, non-local sensing and metrology, and distributed quantum computing. Practical realizations of such networks require individual nodes with the ability to process and store quantum information in multi-qubit registers with long coherence times, and to efficiently interface these registers with optical photons. Cavity quantum electrodynamics (QED) is an approach to enhance interactions between atomic quantum memories and photons. Trapped atoms in optical cavities are one type of cavity QED platforms for quantum processing and have demonstrated gates between atoms and photons as well as interactions between multiple qubits mediated by the optical cavity.

SUMMARY

Systems and methods are disclosed for making a quantum network node. In some embodiments, the methods include calculating a plurality of scoring function F values for an array of at least two photonic crystal cavity unit cells, each photonic crystal cavity unit cell having a lattice constant a and a hole having a length $H_x$ and a width $H_y$, wherein the scoring function comprises:

$$F = \min(Q, Q_{cutoff})/(Q_{cutoff} \times V_{mode})$$

wherein Q is a cavity quality factor, $Q_{cutoff}$ is an estimated maximum realizable Q, and $V_{mode}$ is a cavity mode volume; selecting a value of a, a value of $H_x$, and a value of $H_y$ for which the scoring function value meets a scoring function value criteria; forming, on a substrate, a waveguide region and the array of at least two photonic crystal cavity unit cells based on the selected value a, the selected value $H_x$, and the selected value $H_y$; implanting at least one ion between a hole of a first photonic crystal cavity unit cell and a second photonic crystal cavity unit cell; annealing the at least one implanted ion into at least one quantum defect; and forming a coplanar microwave waveguide on the substrate in proximity to the array of at least two photonic crystal cavity unit cells.

In some embodiments, the scoring function value criteria include one or more of a maximum scoring function value of the plurality of scoring function F values, a threshold value exceeded by at least one of the plurality of scoring function F values, and a maximum scoring function value of the plurality of scoring function F values after a predetermined number of iterations calculating scoring function F values.

In some embodiments, the methods can include tapering an input end of the waveguide region; connecting the tapered input end of the waveguide region to a tapered optical fiber to optically couple the optical fiber to the array of at least two photonic crystal cavity unit cells.

In some embodiments, the methods can include coupling the tapered optical fiber to at least one probing light source and to at least one single photon detector.

In some embodiments, the substrate includes a diamond substrate. In some embodiments, the implanted ion is a silicon ion and wherein the at least one quantum defect is a silicon-vacancy color center. In some embodiments, $Q_{cutoff}$ is not greater than $5 \times 10^5$.

In some embodiments, the methods include forming a mask, after the forming the array of at least two photonic crystal cavity unit cells, on the array of at least two photonic crystal cavity unit cells; etching, with an ion beam, the substrate, at two or more angles, to form a tapered column between the hole of a first photonic crystal cavity unit cell and the second photonic crystal cavity unit cell.

In some embodiments, the methods include forming a mask on the array of at least two photonic crystal cavity unit cells; forming at least one aperture in the mask at a location between the hole of a first photonic crystal cavity unit cell and the second photonic crystal cavity unit cell; and implanting the at least one ion through the at least one aperture in the mask, wherein ions are not implanted through the mask.

In some embodiments, the methods include comprising mounting the substrate in a refrigeration unit, wherein the refrigeration unit is configured to cool the substrate to less than 100 mK such that the spin coherence time $T_2$ of the at least one quantum defect is extended.

In some embodiments, the systems can include a substrate; an array of at least two photonic crystal cavity unit cells on the substrate, wherein each photonic crystal cavity unit cell has a lattice constant a and a hole having a length $H_x$ and a width $H_y$, wherein a value of a, a value of $H_x$, and a value of $H_y$ are selected so that a scoring function F value meets a scoring function value criteria, and wherein the scoring function comprises:

$$F = \min(Q, Q_{cutoff})/(Q_{cutoff} \times V_{mode})$$

wherein Q is a cavity quality factor, $Q_{cutoff}$ is an estimated maximum realizable Q, and $V_{mode}$ is a cavity mode volume; at least one quantum defect in the substrate between a first photonic crystal cavity unit cell in the array of at least two photonic crystal cavity unit cells and a second photonic crystal cavity unit cell in the array of at least two photonic crystal cavity unit cells; and a coplanar microwave waveguide disposed on the substrate in proximity to the array of at least two photonic crystal cavity unit cell.

In some embodiments, the systems include at least one probing light source and at least one single photon detector.

In some embodiments, methods of operating the quantum network device include receiving, with the at least one single photon detector, at least two photons; and in response to the receipt of two photons, measuring the state of the quantum defect using the probing light source. In some embodiments, the methods include a Bell-state measurement.

In some embodiments, methods of encoding of quantum information using the quantum network device, include: for n time-bin qubits comprising n+1 optical pulses, applying phase control with a phase modulator to each optical pulse, wherein each time-bin qubit stores quantum information in a relative amplitude and phase between a pair of neighboring optical pulses among the n+1 optical pulses; guiding the n+1 optical pulses to the at least one quantum defect; alternating, with each pulse, coherent microwave control of the quantum defect; and interfering, with a time-delay interferometer, each pulse with a previous optical pulse, wherein the time-delay interferometer delays the previous optical pulse by the time between the pulse and the previous optical pulse.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF THE FIGURES

For a more complete understanding of various embodiments of the disclosed subject matter, reference is now made to the following descriptions taken in connection with the accompanying drawings, in which.

DESCRIPTION

Figure 1A:
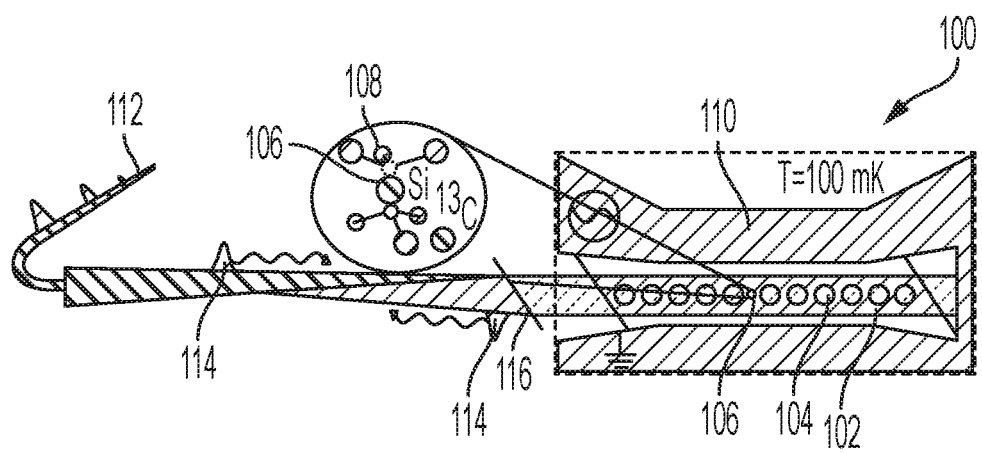
FIG. 1 shows schematics and a scanning electron micrograph of a SiV-nanophotonic quantum register, according to some embodiments of the present disclosure.

Quantum networks are interconnected networks of quantum nodes that can store and/or process information. Quantum networks can be used in a plethora of different technologies, including secure communication, enhanced metrology, and distributed quantum computing (e.g., for processing and/or storage). In such networks, it's useful for to implement network nodes which perform quantum processing on a small register of interconnected qubits with long coherence times. In some examples, distant nodes are connected by efficiently interfacing qubits with optical photons that can be coupled into an optical fiber.

One strategy for engineering an efficient, coherent optical interface is that of cavity quantum electro-dynamics (QED) based on the interaction of photons and photonic cavities. Such cavity QEDs can be designed to enhance the interactions between atomic quantum memories and photons. Nanophotonic cavity QED systems are particularly appealing, as the tight confinement of light inside optical nanostructures enables strong, high-bandwidth qubit-photon interactions. In practice, nanophotonic devices also have a number of technological advantages over macroscopic optical cavities, as they can be fabricated en masse and interfaced with on-chip electronics and photonics, making them suitable for scaling up to large-scale networks. While strong interactions between single qubits and optical photons have been demonstrated in a number of cavity QED platforms, existing implementations lack many other properties that are useful for applications as a quantum network node. For example, simultaneously achieving high-fidelity, coherent control of multiple long-lived qubits inside of a photonic structure has remained challenging. Embodiments of the present disclosure describe systems, methods of manufacturing, and methods of operation that can combine one or more of these properties in a single system and/or method.

Quantum networks can be implemented using functional nodes consisting of stationary registers with the capability of high-fidelity quantum processing and storage, which efficiently interface with photons propagating in an optical fiber. Quantum defects can be used in nodes for quantum network applications. In some embodiments, quantum defects can include silicon-vacancy color-center in diamond (SiV). The SiV is an optically active point defect in the diamond lattice. Its $D_{3d}$ inversion symmetry results in a vanishing permanent electric dipole moment of the ground and excited states, rendering the transition insensitive to electric field noise typically present in nanostructures. SiV centers in nanostructures can display strong interactions with single photons and that SiV centers at temperatures below 100 mK (achievable in dilution refrigerators) can exhibit long coherence times.

Embodiments of the present disclosure describes aspects of such nodes using quantum defects such as a diamond nanocavity with an embedded silicon-vacancy (SiV) color center and a proximal nuclear spin. For example, embodiments of the present disclosure provide systems, methods of manufacturing, and methods of operation that provide for efficient SiV-cavity coupling (with cooperativity C>30) providing a nearly deterministic interface between photons and the electron spin memory, featuring coherence times exceeding 1 ms.

Employing coherent microwave control, embodiments of the present disclosure demonstrate storage of heralded single photons (e.g., pairs of single photons generated in highly correlated states from using a single high-energy photon) in the long-lived spin memory as well as a universal control over a cavity-coupled two-qubit register consisting of a SiV and a proximal $^{13}C$ nuclear spin with nearly second-long coherence time. In some embodiments, the coherence time can be in the range of 100 μs to 1 s. In some embodiments, the coherence time can be in the range of 500 μs to 1 s. In some embodiments, the coherence time can be in the range of 1 ms to 1 s. In some embodiments, the coherence time can be in the range of 2 ms to 1 s. Such long-lived coherence times have applicability to implementations in, for example, quantum repeaters (e.g., a chain of entangled quantum nodes that can be used, for example, for long-distance communications).

Embodiments of the present disclosure also describe memory-enhanced quantum communication. In some embodiments, one can use a single solid-state spin memory integrated in a nanophotonic diamond resonator to implement asynchronous photonic Bell-state measurements. Such solid-state spin memories can be used as quantum repeaters and in large-scale quantum networks.

Embodiments of the present disclosure describe a quantum network node for applications in spin memory and memory-enhanced quantum communication. In some embodiments, the quantum network node includes an array of at least two photonic crystal cavity unit cells, each photonic crystal cavity unit cell having a lattice constant a and a hole having a length H and a width $H_y$. One can calculate a plurality of scoring function F values. In some embodiments, the scoring function includes:

$$F=\min(Q,Q_{cutoff})/(Q_{cutoff} \times V_{mode})$$

wherein Q is a cavity quality factor based on a, $H_x$ and $H_y$, $Q_{cutoff}$ is an estimated maximum realizable Q, and $V_{mode}$ is a cavity mode volume. A value of a, a value of $H_x$, and a value of $H_y$ can be chosen so that the scoring function value meets a scoring function value criteria. In some embodiments, a waveguide region and the array of at least two photonic crystal cavity unit cells can be fabricated on a substrate based on the selected value a, the selected value $H_x$, and the selected value $H_y$. In some embodiments, at least one ion can be implanted between a hole of a first photonic crystal cavity unit cell and a second photonic crystal cavity unit cell, and annealed into at least one quantum defect. In some embodiments, a coplanar microwave waveguide can be formed on the substrate in proximity to the array of at least two photonic crystal cavity unit cells.

1. Quantum Network Nodes Based on Diamond Qubits 1.1. Integrated Nanophotonic Quantum Register Based on Quantum Defects, Such as Silicon-Vacancy Spins in Diamond Nanophotonic cavity QED systems with solid-state emitters are suitable for use as quantum nodes as they can be interfaced with on-chip electronic control and photonic routing, making them suitable for integration into large-scale networks. One example property useful for a quantum node is that the node can interface with nanophotonic structures that can be implemented on a chip. For example, self-assembled quantum dots in GaAs can be efficiently interfaced with nanophotonic structures, enabling a fast, on-chip spin-photon interface. Another example property useful for a quantum node is long-lived coherence times (which enables use over longer periods of time). For example, nitrogen-vacancy color centers (NVs) in diamond can be used as multi-qubit quantum processors with coherence times approaching one minute and can be used to implement quantum error correction and teleportation. However, functional nodes that possess long coherence times and the ability to interface with nanophotonic structures on a single chip have not yet been realized. For example, quantum memory times in quantum dots are limited to a few μs by the dense bath of surrounding nuclear spins. Conversely, an efficient nanophotonic interface to NVs remains elusive, in part due to the degradation of their optical properties inside nanostructures arising from electrical noise induced by fabrication.

Embodiments of the present disclosure describe an integrated network node that possesses multiple properties useful for implementation in a scalable quantum network. This can be achieved, for example, by coupling a negatively charged silicon-vacancy color-center (SiV) to a diamond nanophotonic cavity and a nearby nuclear spin, illustrated schematically in the embodiment of FIG. 1 panel (a). In some embodiments, such nodes possess long-lived coherence times as well as the ability to efficiently couple the quantum node to photonic structures for implementations on chips that can be more easily manufactured and used outside of laboratory settings.

Figure 1B:
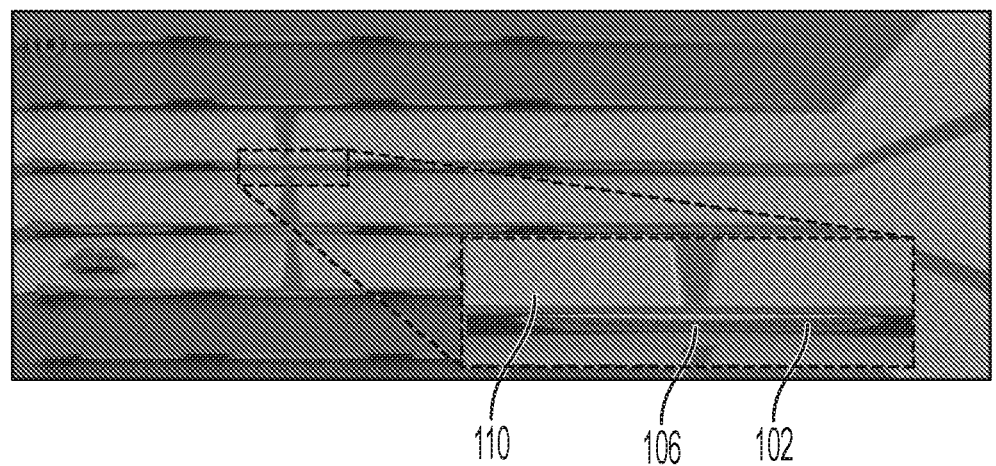

FIG. 1 panel (a) shows schematics of a SiV-nanophotonic quantum register 100, according to some embodiments of the present disclosure. A diamond nanostructure 102 with nanocavities 104, embedded SiV centers 106 and ancillary $^{13}$C nuclei 108 are coupled via a waveguide 110 and an optical fiber 116 to a fiber network 112. Optical excitations (e.g., photons) 114 (within the device but shown as Gaussian distributions on the surface thereof) can be introduced to the diamond nanostructure 102 via an optical fiber 116. Spins are controlled by the on-chip microwave coplanar waveguide (CPW) 110 at 0.1 K. FIG. 1 panel (b) shows scanning electron micrograph of several completed SiV-nanophotonic quantum registers 100, according to some embodiments of the present disclosure. The diamond nanostructure 102 is coupled with gold CPW 110 which is designed to localize microwave fields around the cavity center.

Nanophotonic quantum registers are quantum nodes that can receive information in the form of photons, store that information for long periods of time using a quantum state, and then permit readout of that state using photons. During storage, energy, such as microwaves can be used to manipulate spins in the quantum nodes to enhance the quantum memory time.

As shown in FIG. 1, the SiV 106 is an optically active (i.e., responsive to photons) point defect in the diamond lattice. Its $D_{3d}$ inversion symmetry results in a vanishing electric dipole moment of the ground and excited states, rendering optical transitions insensitive to electric field noise typically present in nanofabricated structures. The interactions between SiVs and optical photons can be enhanced by incorporating them into nanocavities, which are coupled to on-chip waveguides. Itinerant photons in a fiber network are adiabatically transferred to this waveguide, allowing for the collection of reflected photons with efficiencies exceeding 90%. After an initial optical characterization of the devices, a shorted, gold coplanar waveguide (CPW) 110 is deposited in close proximity to a small subset of cavities [FIG. 1 panel (b), inset]. This enables coherent microwave manipulation of the SiV ground state spin in a cryogenic environment (T<0.1 K), where phonon-mediated dephasing and relaxation processes are mitigated.

In some embodiments, the disclosed devices can provide at least three useful functions of a quantum network node: (i) an efficient spin-photon interface, (ii) a long-lived quantum memory, and (iii) access to multiple interacting qubits.

Figure 2:
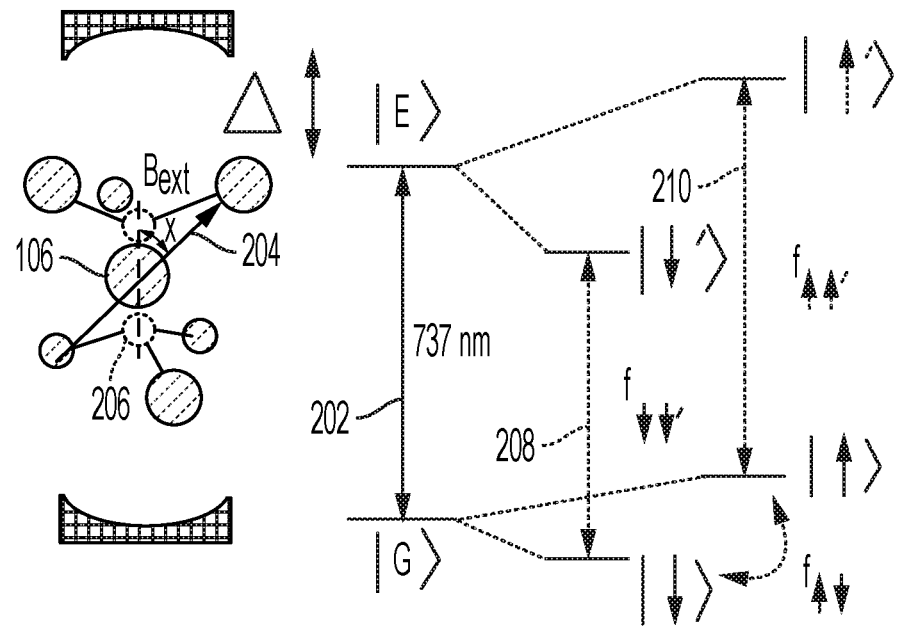
FIG. 2 shows schematics of level structure, spin-dependent reflection spectrum, and spin coherent time of SiV spin-cavity system, according to some embodiments of the present disclosure.
Figure 2:
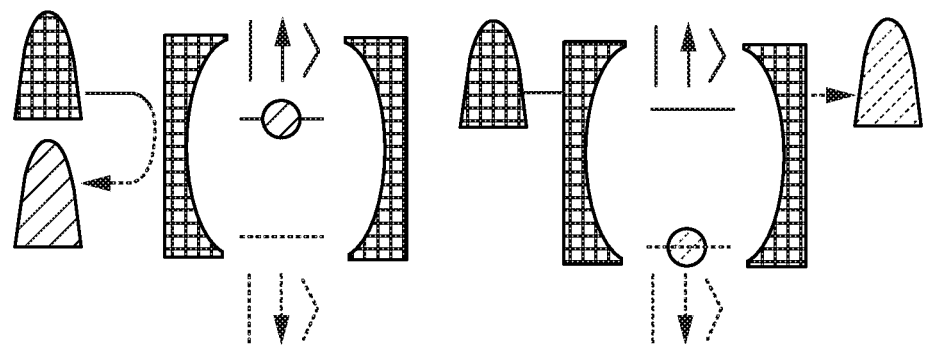
Figure 2:
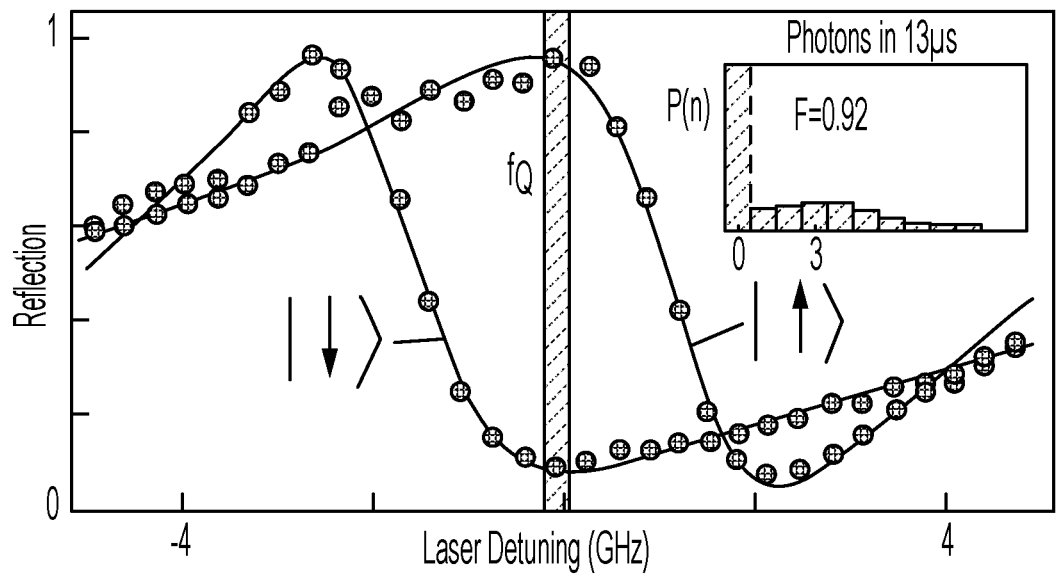
Figure 2:
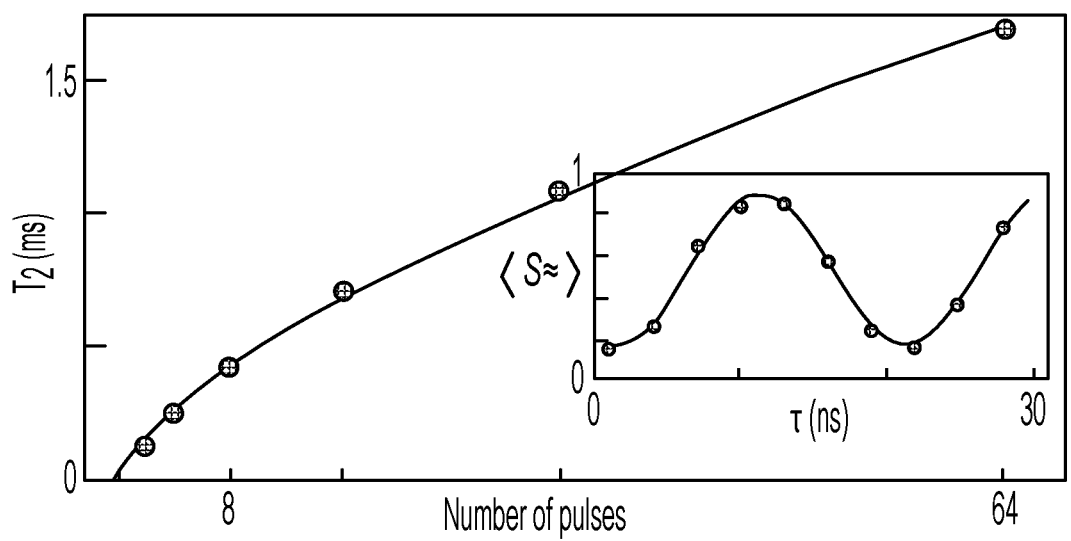

FIG. 2. panel (a) shows a schematic of energy level structure of SiV spin-cavity system, according to some embodiments of the present disclosure. The presence of SiV 106 in the nanostructure 102 can cause changes to its optical properties. The SiV optical transition 202 at 737 nm is coupled to the nanocavity 102 with detuning Δ. Spin-conserving transitions of SiV 106 are split by an external magnetic field ($B_{ext}$) 204, at an angle α with respect to the SiV symmetry axis 206 (dotted line). This produces two different pairs of states $|\uparrow\rangle$, $|\uparrow'\rangle$ 210 and $|\downarrow\rangle$, $|\downarrow'\rangle$ 208. The transitions between $|\uparrow\rangle$, $|\uparrow'\rangle$ and $|\downarrow\rangle$, $|\downarrow'\rangle$, respectively allows for interacting with different transitions with photons. Photons are reflected by the cavity when the SiV is in state $|\uparrow\rangle$. Microwave fields at frequency $f_{11}$ coherently drive the qubit states between $|\downarrow\rangle$ to $|\uparrow\rangle$. Such driving allows for selective interactions with photons and efficient readout of the spin states.

In some embodiments, high-fidelity spin-photon interaction can help with the fast readout of the spin state and further help with the nuclear spin control. FIG. 2 panel (b) shows spin-dependent reflection spectrum for $B_{ext}$=0.19T, α≈π/2 at Δ=0.25κ, according to some embodiments of the present disclosure. Probing at the point of maximum contrast ($f_Q$) results in high-fidelity spin-photon correlations and single-shot readout (inset, F=0.92). FIG. 2 panel (c) shows SiV spin coherence time $T_2$(N=64)>1.5 ms with dynamical decoupling, according to some embodiments of the present disclosure. The inset of FIG. 2 shows fast microwave Rabi driving of the SiV spin.

In some embodiments, the efficient spin-photon interface can be enabled by SiV coupling to a diamond nanophotonic cavity. The coupling can change energy spectrum of the cavity and therefore facilitate efficient readout of the spin state. As shown in FIG. 2 panel (a), the presence of an SiV 106 modulates the bare nanocavity reflection spectrum (i.e., in the absence of SiV). The strength of this modulation can be parametrized by the cavity cooperativity C=4 $g^2$/(κγ)~38 (with the single photon Rabi frequency, cavity, and atomic energy decay rate {g, κ, γ}=2π×{5.6, 33, 0.1} GHz). For C>1, a high-contrast modulation is expected for a small detuning (Δ) between the cavity and the SiV resonance near 737 nm. An external field $B_{ext}$ lifts the degeneracy of the SiV spin-½ sub-levels, creating spin-dependent reflection: photons at the frequency of maximum contrast ($f_Q$) are reflected from the cavity when the SiV is in a specific spin state ([FIG. 2 panel (a)], $|\uparrow\rangle$). Spin readout of the SiV can also be performed with $B_{ext}$ parallel to the SiV symmetry axis, where the spin-conserving transitions are highly cycling. The high collection efficiency into a tapered fiber allows for fast single-shot readout of the SiV even in a misaligned field [FIG. 2 panel (b)], which is to facilitate the nuclear spin control described below. A readout fidelity of F=0.92 in 13 μs is observed even when a few (~10) photons are scattered.

In order for a quantum node to act as a quantum memory, it is useful to store the quantum information for a long period of time. In some embodiments, the SiV spin in a nanocavity can be a suitable quantum memory. Microwave pulses at $f_{11}$=6.7 GHz can coherently manipulate the SiV spin qubit. The resulting Rabi oscillations, which can be driven in excess of 80 MHz while maintaining acceptable sample temperatures, are shown in the inset of FIG. 2 panel (c). These rotations can be used to probe the coherence properties of the spin via dynamical decoupling sequences [FIG. 2 panel (c)]. The coherence time of the SiV inside the nano-cavity is measured to be $T_2$>1.5 ms and scaled with the number of decoupling pulses as $T_2 \propto N^{2/3}$. The coherence scaling observed here differs from that observed in bulk diamond and is similar to NVs near surfaces. This suggests that SiV memory in nanostructures can be limited by an electron spin bath, for example residing near the surface of the nanostructure or resulting from implantation-induced damage.

Figure 3:
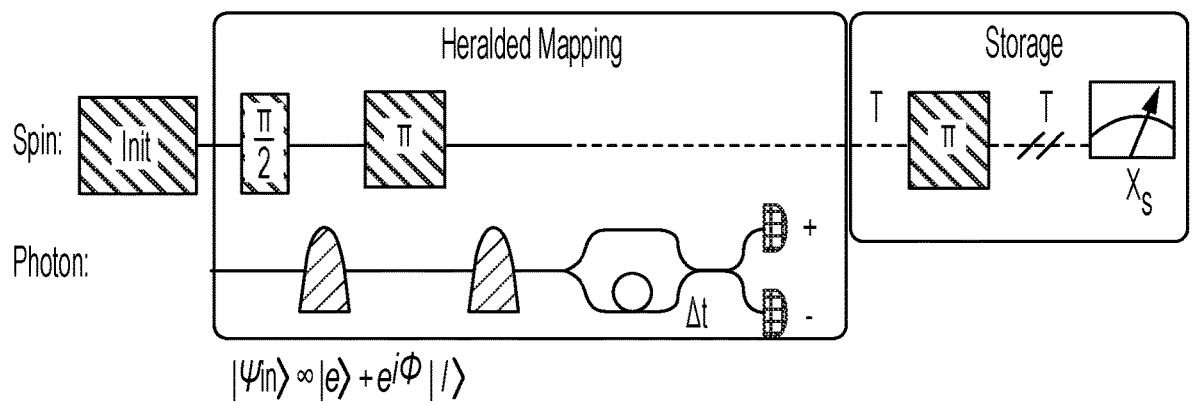
FIG. 3 shows schematics for heralded photo storage and a schematic for spin-photon storage fidelity, according to some embodiments of the present disclosure.
Figure 3:
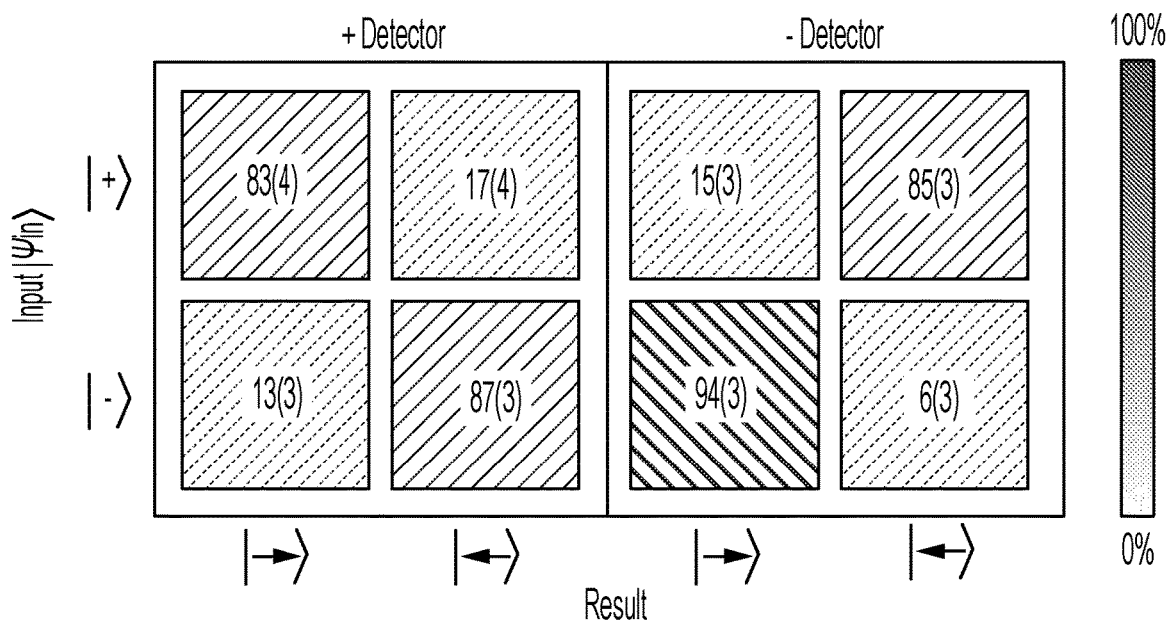

In some embodiments, the efficient spin-photon interface and control over the SiV spin state as discussed above can be combined to demonstrate heralded storage of photonic qubit states in the spin-memory, a key feature of a network node. FIG. 3 panel (a) shows a schematic for heralded photon storage, according to some embodiments of the present disclosure. After photonic qubit is reflected off the cavity, an X measurement on the photon heralds successful state transfer which is stored for 2T=20 μs. FIG. 3 panel (b) shows a schematic for spin-photon storage fidelity, according to some embodiments of the present disclosure. The state $|\pm\rangle = |\uparrow\rangle \pm |\downarrow\rangle$ can be mapped onto the SiV, with average fidelity $\mathcal{F}$ =87(6)%.

FIG. 3 panel (a) outlines an example scheme where photonic qubits are prepared using time-bin encoding and mapped onto the SiV spin. In the example of FIG. 3, panel (a), the SiV is first initialized into a superposition state $|\rightarrow\rangle \propto |\uparrow\rangle + |\downarrow\rangle$ by optical pumping followed by a microwave $$\frac{\pi}{2} - \text{pulse.}$$

A pair of weak coherent pulses separated by δt=30 ns at frequency $f_Q$ are then sent to the cavity. The single photon sub-space corresponds to an incoming qubit state $|\Psi_i\rangle \propto \beta_e |e\rangle + \beta_l |l\rangle$, where $|e\rangle$ ($|l\rangle$) denotes the presence of a photon in the early (late) time-bin. As a photon can be reflected from the device if the SiV is in state $|\uparrow\rangle$ [FIG. 2 panel (a)], particular components of the initial product state $$f(x) = a_0 + \sum_{n=1}^{\infty} \left( a_n \cos \frac{n\pi x}{L} + b_n \sin \frac{n\pi x}{L} \right)$$

can be effectively "carved out". The SiV spin can be inverted with a π-pulse between the arrival of the two time bins at the cavity, such that a photon detection event indicates that the final state has no $|e\uparrow\rangle$ or $|l\downarrow\rangle$ component. This can leave the system in the final spin-photon entangled state $|\Psi_f\rangle \propto \beta_e |e\downarrow\rangle + \beta_l |l\uparrow\rangle$. The reflected photon can enter a time-delay interferometer, where one arm passes through a delay line of length δt, allowing the two time-bins to interfere and erase which-time-bin information. As can be seen by expressing the final state in the corresponding photon basis:

$$|\psi_f\rangle \propto |+\rangle (\beta_e|\downarrow\rangle + \beta_l|\uparrow\rangle) + |-\rangle (\beta_e|\downarrow\rangle - \beta_l|\uparrow\rangle), \quad (1)$$

a detection event on either the '+' or '−' arm of the interferometer can represent a measurement in the X-basis $(|\pm\rangle \propto |e\rangle \pm |l\rangle)$, effectively teleporting the initial photonic state onto the electron (up to a known local rotation). The generation of the entangled state $|\psi\rangle_f$ for input states $|\psi\rangle_i = |\pm\rangle$ can be verified by measuring spin-photon correlations and use it to extract a teleportation fidelity of 0.92(6).

After detection of the heralding photon, the teleported photonic states (initially prepared in $\{|+\rangle$ or $|-\rangle\}$) can be stored in spin memory for 20 μs by applying an additional decoupling π-pulse on the SiV spin. The overall fidelity of teleportation and storage is F=0.87(6) after corrected for readout errors [FIG. 3 panel (b)]. The quantum storage time can be extended by additional decoupling sequences [FIG. 2 panel (c)], enabling entanglement distribution up to a $T_2$-limited range of 500 km.

In order to extend this range and to enable more generic quantum communication protocols, a two-qubit register can be demonstrated based on the cavity coupled SiV electronic spin and a nearby $^{13}$C nuclear memory. The $^{13}$C isotope of carbon is a spin-½ nucleus which has ~1% natural abundance in diamond and is known to exhibit exceptional coherence times. While direct radio-frequency manipulation of nuclear spins can be impractical due to heating concerns, control over $^{13}$C spins can be achieved by adapting electron mediated techniques developed for Nitrogen vacancy (NV) centers. The physical principle of the SiV-$^{13}$C interaction is depicted in FIG. 4 panel (a).

Figure 4:
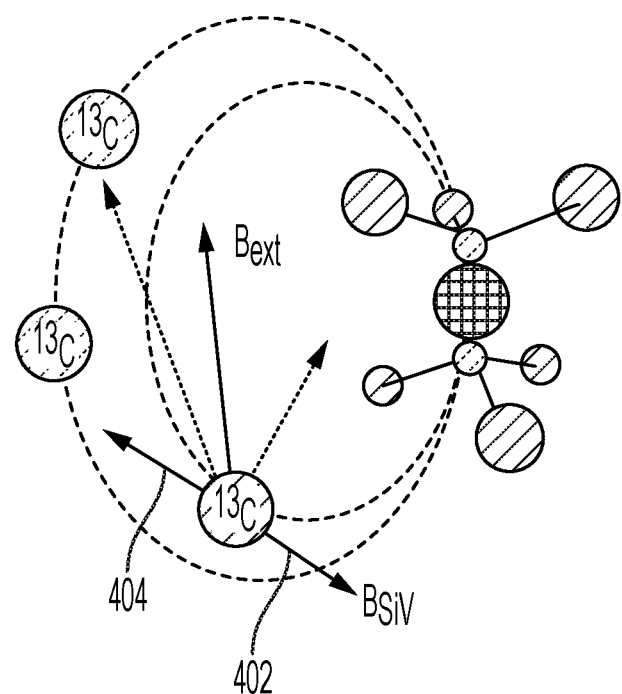
FIG. 4 shows schematics of an SiV coupled to nearby $^{13}C$ nuclear spins, Ramsey measurement, spin echo on $^{13}C$, and reconstructed amplitudes for a CNOT gate transfer matrix, according to some embodiments of the present disclosure.
Figure 4:
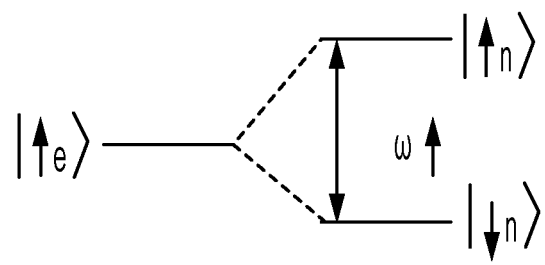
Figure 4:
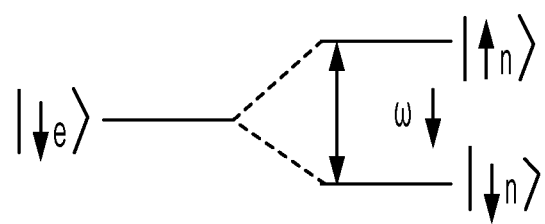
Figure 4:
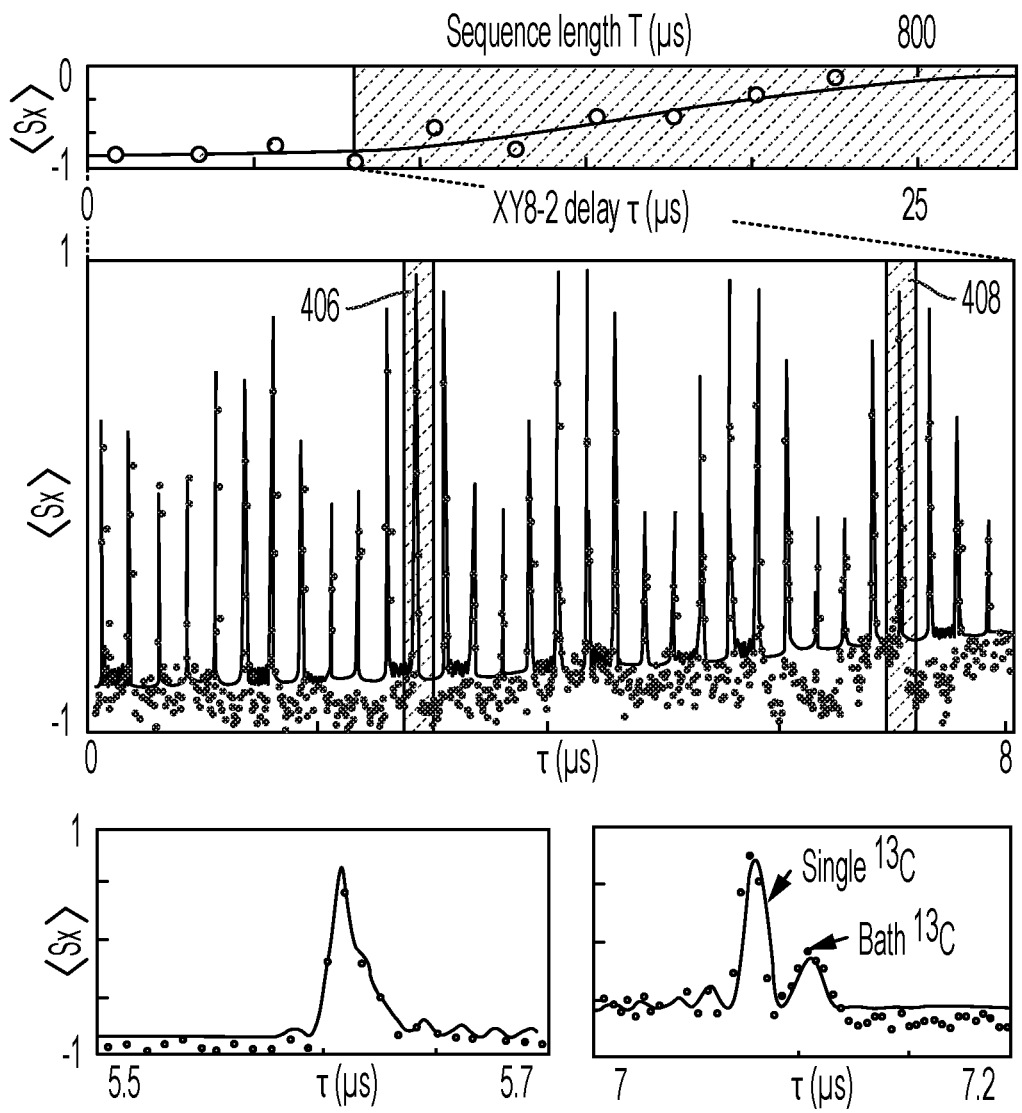
Figure 4:
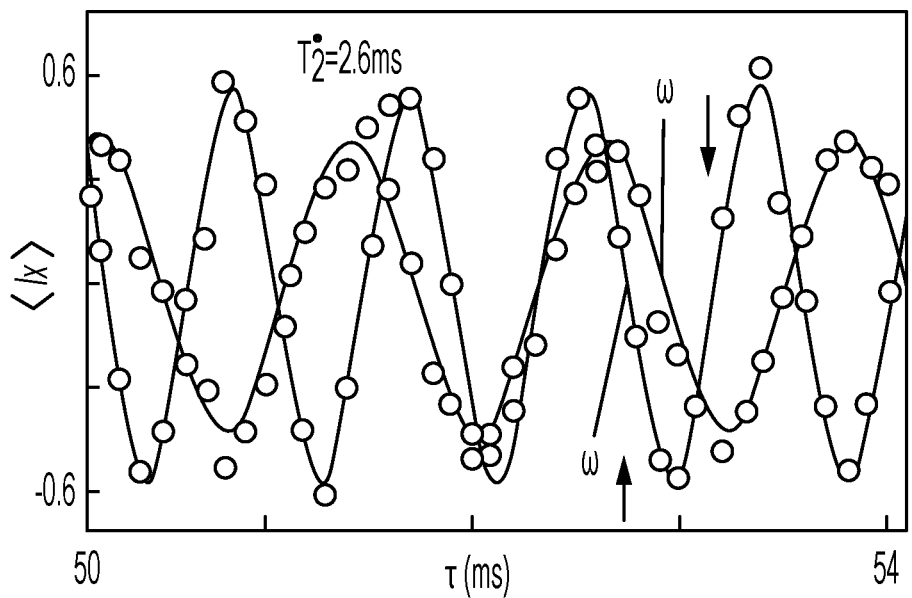
Figure 4:
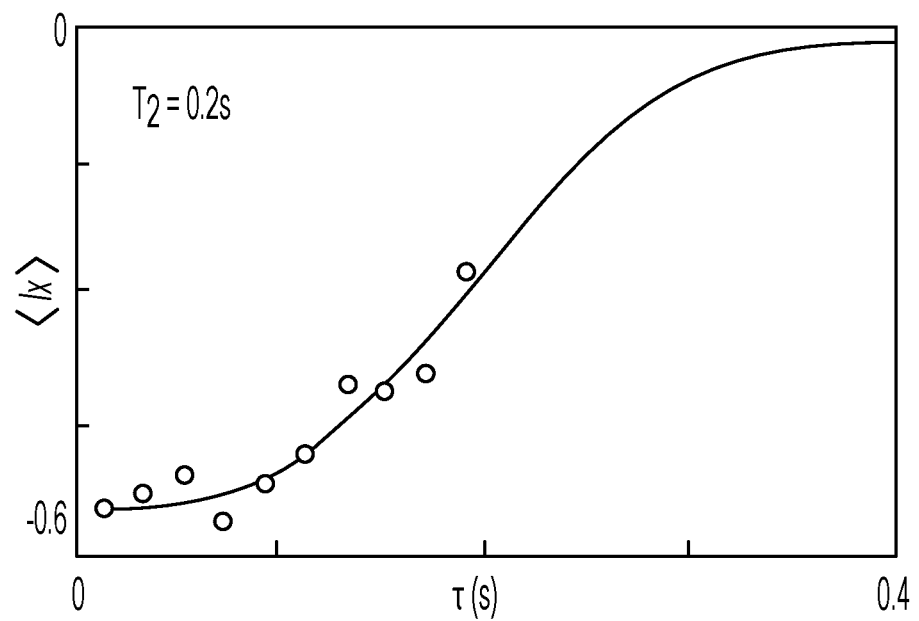
Figure 4:
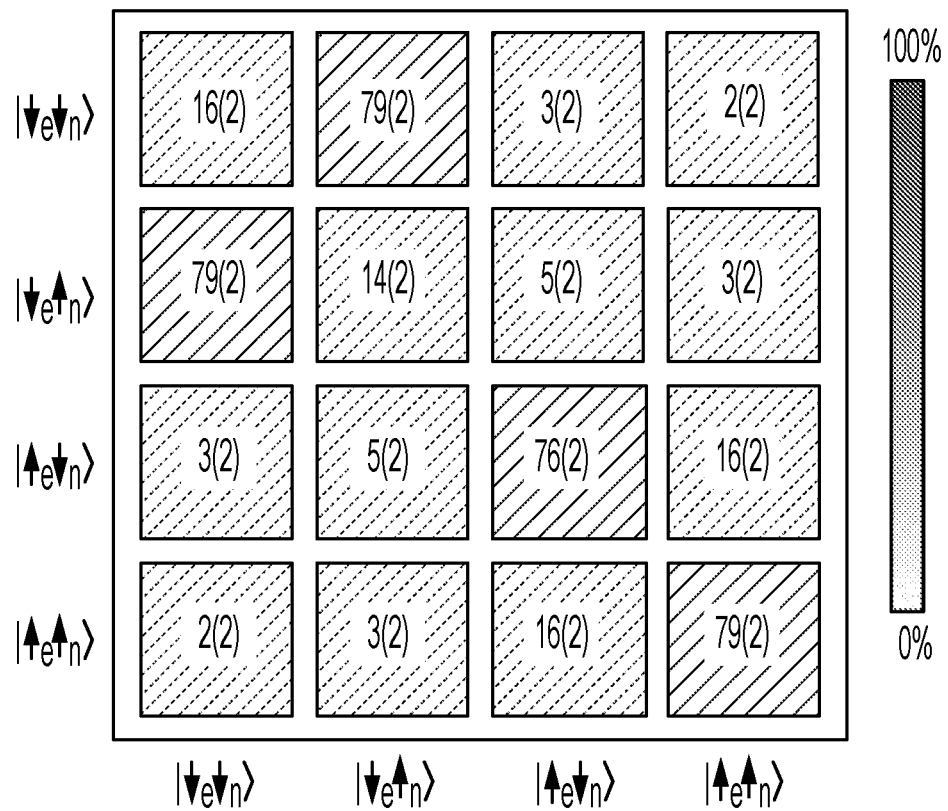

FIG. 4 panel (a) shows a schematic of an SiV coupled to nearby $^{13}$C nuclear spins, according to some embodiments of the present disclosure. Vectors 402 (404) are conditional fields when the SiV is in state $|\uparrow\rangle$ ($|\downarrow\rangle$). FIG. 4 panel (b) shows a plot of XY8-2 spin-echo, according to some embodiments of the present disclosure. (Top) envelope for spin-echo shows a $T_2$ (N=16)=603 μs. XY8-2 at early times (Center) exhibits collapses in signal due to interaction with nuclear spins. Single $^{13}$C cannot be identified at early times (406), but separate from the bath at long times (408). FIG. 4 panel (c) shows Ramsey measurement on the $^{13}$C nuclear spin, according to some embodiments of the present disclosure. The nuclear spin precesses at a different Larmor frequency depending on whether the SiV is prepared in $|\uparrow\rangle$ or $|\downarrow\rangle$. Coherent oscillations persist for $T^*_2$>2 ms. (d) Spin echo on $^{13}$C, revealing $T_2$>0.2 s. FIG. 4 panel (e) shows a schematic for reconstructed amplitudes for a CNOT gate transfer matrix, according to some embodiments of the present disclosure.

The SiV generates a spin-dependent magnetic field $B_{SiV}$ at the position of the $^{13}$C, which is located a few lattice sites away. This is described by a hyperfine interaction Hamiltonian:

$$\hat{H}_{HF} = \hbar A_\parallel \frac{\hat{S}_z}{2} \frac{\hat{I}_z}{2} + \hbar A_\perp \frac{\hat{S}_z}{2} \frac{\hat{I}_x}{2} \quad (2)$$

where $\hat{S}_{z,x}$ ($\hat{I}_{z,x}$) are the Pauli operators for the electron (nuclear) spin, and $A_{\parallel,\perp}$ are the coupling parameters related to the parallel and perpendicular components of $B_{SiV}$ with respect to the bias field $B_{ext}$. Hyperfine interactions manifest themselves in spin-echo measurements as periodic resonances, shown in FIG. 4 panel (b) for an XY8-2 decoupling sequence π/2-(τ-π-τ)$^{16}$-π/2, where τ is the free evolution time. The coherence envelope for this sequence is $T_2$(N=16)=603 μs [FIG. 4 panel (b), upper panel].

For weakly coupled $^{13}$C ($A_\perp \ll \omega_l$, and $A_{81} \ll \omega_l$, as used in this letter), the positions of the resonances $$\tau_k \approx \frac{2k+1}{2\omega_l} \left( 1 - \frac{1}{2} \left( \frac{A_\perp}{2\omega_l} \right)^2 \right), \quad (3)$$

here $\omega_L$ is the larmor frequency of a bare $^{13}$C, are insensitive to specific $^{13}$C hyperfine parameters at first order, rendering them indistinguishable at early times ($\tau_k$<<4 μs, [FIG. 4 panel (b), 406]). Individual $^{13}$C can be isolated at longer times and are used to engineer gates between a single $^{13}$C and the SiV [FIG. 4 panel (b), 408]. The fundamental two-qubit gate associated with such interaction is a conditional±π/2 rotation of the $^{13}$C-spin around the X axis $$\left(R_x^{\pm \pi/2}\right),$$

which is a maximally entangling gate. Together with unconditional rotations of the nuclear spin (which are also generated via dynamical decoupling sequences), and MW rotations on the SiV, these sequences form a universal set of gates for the register.

The $^{13}$C can be characterized via Ramsey spectroscopy [FIG. 4 panel (c)]. The nuclear spin can be initialized and read out via the optically addressable SiV spin by transferring population between the SiV and $^{13}$C. Depending on the SiV state before the Ramsey sequence, oscillations of the nuclear spin can be observed at its eigenfrequencies $\omega_{\uparrow,\downarrow}^2 = (\omega_L \pm A_\parallel/2)^2 + (A_\perp/2)^2$, allowing one to determine the hyperfine parameters $\{\omega_L, A_{81}, A_\perp\} = 2\pi\{2.0, 0.70, -0.35\}$ MHz. This coherence persists for $T_2^* > 2$ ms, and can be further extended to $T_2 > 0.2$ s by applying a single dynamical decoupling π-pulse on the nucleus, demonstrating the exceptional memory of the $^{13}$C nuclear spin [FIG. 4 panel (d)].

In some embodiments, the two-qubit register can be benchmarked by demonstrating an SiV-controlled X-gate (CNOT) on the $^{13}$C-spin by combining a $$R_x^{\pm \pi/2}$$

with an unconditional nuclear π/2 rotation. This gate results in a spin flip of the $^{13}$C if the SiV spin is in the state |↓⟩ [FIG. 4 panel (e)]. One can use this gate to prepare a Bell state by initializing the register in |↓↓⟩, and applying a π/2-rotation gate on the SiV spin followed by a CNOT gate. Correlation measurements can yield a concurrence of C=0.22(9) corresponding to a Bell state fidelity of F=0.59(4) after correcting for readout errors.

Embodiments of the present disclosure can provide for a nanophotonic quantum network node combining multiple ingredients in a single physical system. Both spin-photon and spin-spin experiments can be performed in the same device under identical conditions (cavity detuning and bias field), thereby providing simultaneous demonstration of all example properties of a network node.

In some embodiments, the main limitation on the fidelities can be related to the specific $^{13}$C in the proximity of the SiV, which can require an unfavorable alignment of the external magnetic field in order to isolate a single $^{13}$C. For example, the fidelity of two-qubit gates can be limited by residual coupling to bath nuclei, SiV decoherence during the gate operations, and under/over-rotations of the nuclear spin arising from the granularity of spin-echo sequences. To reduce these errors, fine-tuned adaptive pulse sequences can be used to enhance sensitivity to specific nearby $^{13}$C, and tailor the rotation angle and axis of rotation. Alternatively, replacing gold with superconducting microwave coplanar waveguides will significantly reduce ohmic heating, and allow direct radio-frequency control of nuclear spins. These improvements could also enable the realization of a deterministic two-qubit register based on $^{29}$SiV, which contains both electronic and nuclear spins in a single defect.

The fidelity of the heralded photon storage can be limited primarily by single shot readout and imperfect critical coupling of the cavity. The improvements of the nuclear spin control mentioned above can allow for working in an external magnetic field aligned to the SiV axis, which can improve readout fidelity from F~0.90 (reported here) to 0.99. The impedance mismatch of the cavity used in this example can also give rise to residual reflections which are not entangled with the SiV. Over-coupled cavities can enable the use of a SiV spin-dependent phase flip for reflected photons, improving both the fidelity and success probability of spin-photon interactions.

In some embodiments, in conjunction with controlling emitter inhomogeneity via electromechanical tuning, these techniques can allow for chip-scale fabrication of quantum network nodes, facilitating the realization of scalable quantum repeater architectures. The ability to store quantum information in highly coherent $^{13}$C nuclei, as well as the opportunity to extend these results to other group-IV colorcenters, may open up the possibility of operating such nodes at temperatures>1 K. Finally, the efficient quantum network node demonstrated by embodiments of the present disclosure could enable generation of multi-dimensional cluster states of many photons, which could facilitate realization of novel, ultra-fast one-way quantum communication architectures.

1.2. Nanophotonic Device Fabrication 1.2.1. Device Design

Figure 5:
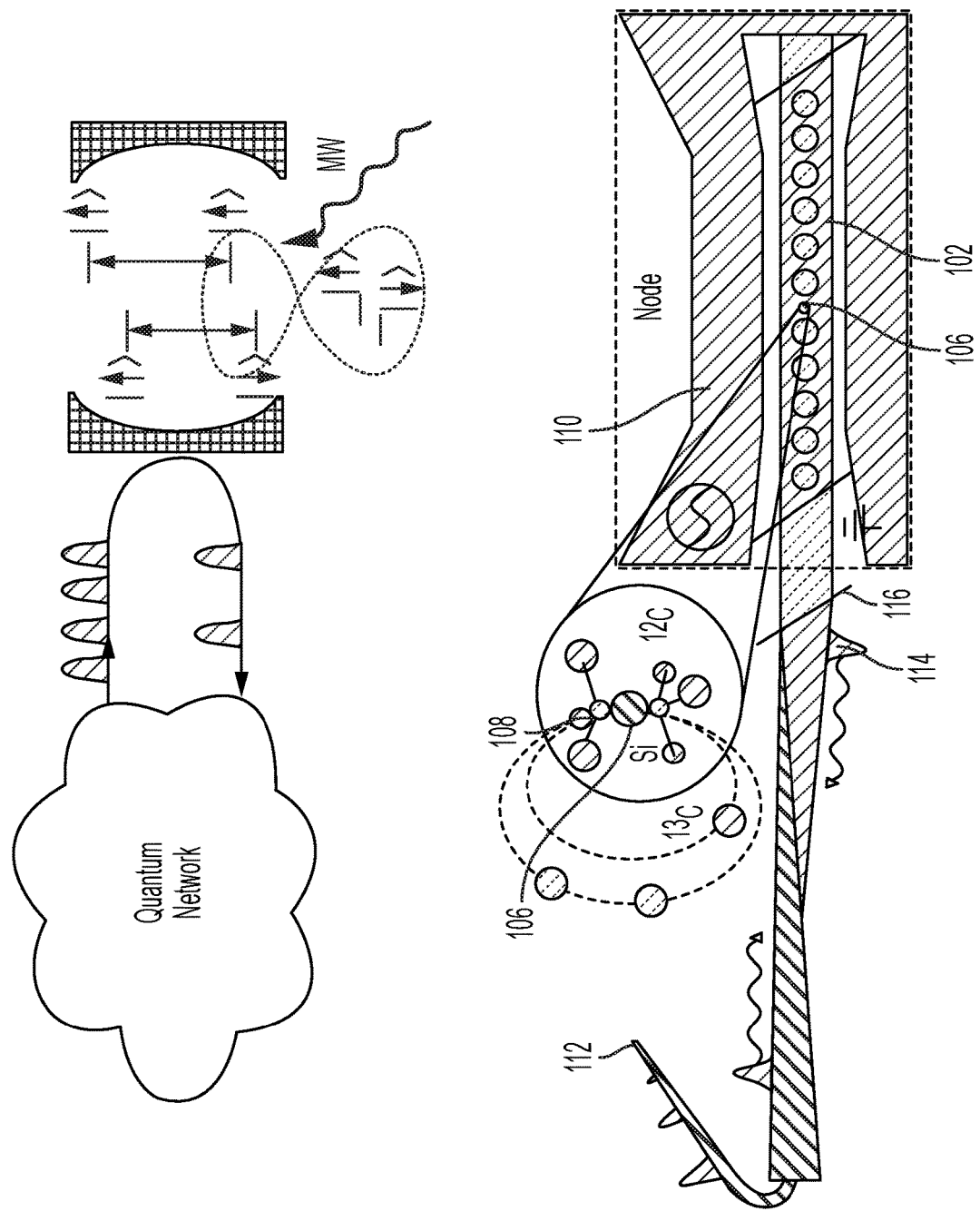
FIG. 5 shows schematics of a quantum network and a quantum network node based on the SiV, according to some embodiments of the present disclosure.

FIG. 5 panel (a) shows a schematic of a quantum network, according to some embodiments of the present disclosure. Nodes consisting of several qubits can be coupled together via an optical interface. FIG. 5 panel (b) shows a schematic of a quantum network node based on the SiV, according to some embodiments of the present disclosure. SiV centers and ancilla $^{13}$C can be incorporated into a nanophotonic device and addressed with a coupled fiber and microwave coplanar waveguide. A diamond nanostructure 102 with embedded SiV centers 106 and ancillary $^{13}$C nuclei 108 are coupled via a waveguide 110 to a fiber network 112. Optical excitations (e.g., photons) 114 can be introduced to the diamond nanostructure 102 via an optical fiber 116. Spins are controlled by the on-chip microwave coplanar waveguide (CPW) 110 at 0.1 K.

The example devices in the present disclosure can integrate nanophotonic cavities, implanted quantum defects such as SiV centers, and microwave coplanar waveguides onto a single diamond chip.

Typically, high-quality photonic crystal resonators are fabricated from 2-D membranes, which tightly confine light due to total internal reflection off of material boundaries. Difficulties in growing high-purity, single-crystal diamond films on non-diamond substrates are one of the key challenges to fabricating such resonators in diamond. As a result, nanophotonic diamond structures can be etched out of bulk diamond, which can involve nontraditional etching techniques. For example, two methods have emerged for creating freestanding diamond nanostructures: isotropic undercutting and angled ion-beam etching (IBE). In some embodiments, the latter technique can be used, resulting in freestanding, triangular-cross-section waveguides.

Preliminary design of the nanophotonic structures can be optimized to maximize atom-photon interaction while maintaining high waveguide coupling. To take advantage of the scalable nature of nanofabrication, these optimized devices can be patterned in sets of roughly 100 with slightly modified fabrication parameters. The overall scale of all photonic crystal cavity parameters can be varied between different devices on the same diamond chip to compensate for fabrication errors (which lead to unexpected variations in the resonator frequency and quality-factor). Due to these errors, roughly one in six cavities can be suitable for SiV applications. In some embodiments, hundreds of devices are made in a single fabrication run, ensuring that every run yields many usable devices.

The diamond waveguide region (as opposed to the photonic crystal cavity region) can have two distinguishing features. First, thin support structures are placed periodically along the waveguide and are used to suspend the structures above the substrate. These supports are portions of the waveguide which are adiabatically tapered to be ~30% wider than the rest of the waveguide, and take longer to etch away during the angled etch process. By terminating the etch after normal waveguide regions are fully etched through, these wide sections become ~10 nm thick supports which tether the waveguide structures to the substrate while minimizing scattered loss from guided modes. Second, one end of the waveguide structure is adiabatically tapered into free space. These tapers are formed by a linear taper of the waveguide down to less than 50 nm wide over a 10 μm length. This tapered region can be coupled to a similarly tapered optical fiber, allowing structures to efficiently interface with a fiber network. This tapered end of the waveguide can be the most fragile portion of the structure and can break after repeated fiber coupling attempts. This can be what limits the total measurement lifetime of a device.

The number of devices (and thus the relative yield of the fabrication process) can be limited by the maximum packing density on the diamond chip. This can be primarily limited by the need to accommodate 10 μm wide microwave coplanar waveguides (CPWs) between devices, which are patterned directly onto the diamond surface to efficiently control SiV spins using microwaves. Simulations of prospective design geometries can ensure that the CPW is impedance matched with the 50Ω feed lines, which minimizes scattered power from the waveguides. Tapers in the CPW near the center of the cavity regions concentrate current and increase the amplitude of the microwave field near the SiVs, and CPWs are terminated with a short in provide a magnetic field maximum along the device.

1.2.2. Device Fabrication

Figure 6:
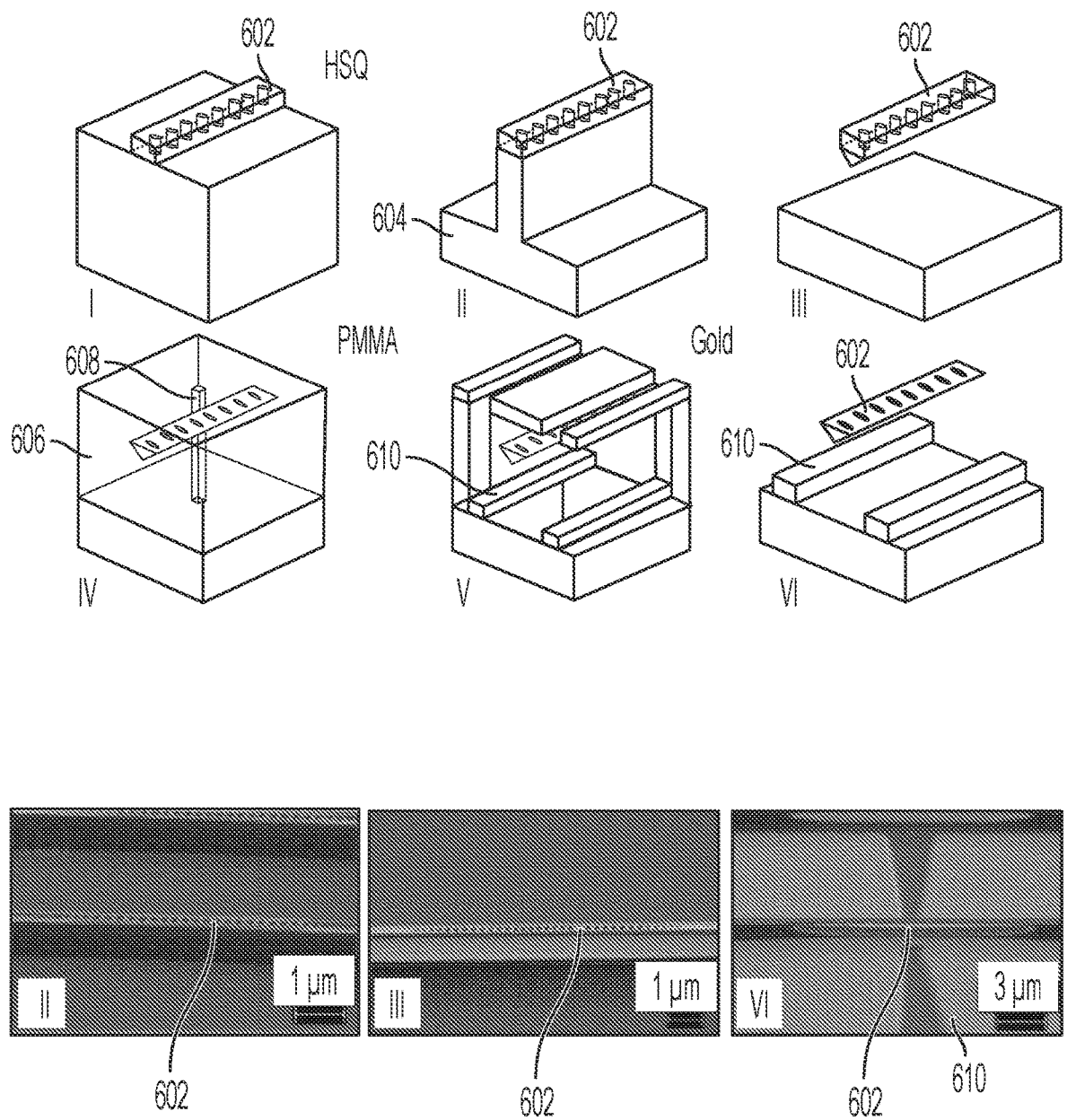
FIG. 6 shows schematics of a nanofabrication process used to produce devices and scanning electron micrographs corresponding to steps in the fabrication procedure, according to some embodiments of the present disclosure.

FIG. 6 panel (a) shows a schematic of the nanofabrication process used to produce devices, according to some embodiments of the present disclosure. In step I, titanium-HSQ mask 602 is patterned using EBL. In step II, pattern is transferred onto diamond 604 using top down $O_2$ RIE. In step III, angled IBE is used to separate structures from substrate. In step IV, devices are covered in PMMA 606 and implantation apertures 608 are formed using EBL. Device are then cleaned, implanted, and annealed. In step V, PMMA is used in a lift-off procedure to pattern gold microwave strip lines 610. In step VI, final devices are cleaned and prepared for use. FIG. 6 panel (b) shows scanning electron micrographs corresponding to steps II, III, and VI in the fabrication procedure, according to some embodiments of the present disclosure.

In some embodiments, during the fabrication processes of the diamond structures, the angled etch is conducted not with a Faraday cage loaded inside a reactive ion etching chamber, but instead with an IBE. The Faraday cage technique offered the benefit of simplicity and accessibility in that it uses the reactive ion etching chamber in question was large enough to accommodate the cage structure—but suffered from large fluctuations in etch rate across the surface of the sample, as well as between different fabrication runs, due to imperfections in the Faraday cage mesh. These irregularities could be partially compensated for by repeatedly repositioning and rotating the cage with respect to sample during the etch, but this process proved to be laborious and imprecise. Instead, IBE offers collimated beams of ions several cm in diameter, leading to almost uniform etch rates across the several mm diamond chip. This technique allowed for consistent fabrication of cavities with $Q>10^4$, $V<0.6[\lambda/(n=2.4)]^3$, and resonances within ~10 nm of SiV optical frequencies.

Once the diamond cavities are fabricated [FIG. 6 panel (a) steps I-III], SiV centers can be incorporated. In some embodiments, to ensure the best possible atom-photon interaction rate, SiVs can be positioned at the cavity mode maximum. In some embodiments, this can involve implantation accuracy of better than 50 nm in all 3 dimensions due to the small mode volume ($\sim 0.5[\lambda/(n=2.4)]^3$) of the cavities used. In the past, implantation of silicon ions (which form SiV centers following a high-temperature anneal) was done using focused ion-beam implantation, but, in some embodiments, this technique can require specialized tools and lacked accuracy for maximally efficient mode coupling. Instead, the present disclosure describes methods that adapt the standard masked implantation technique and use commercial foundries for ion implantation.

In some embodiments, for the implantation process, one can repeatedly spin and bake MMA EL11 and PMMA C4 (Microchem®) to cover the nanophotonic cavities completely with polymer resist. A conductive surface layer of Espacer (Showa Denko®) can then be spin-coated. An E-beam lithography (EBL) tool can then align with large markers underneath the polymer layer, allowing it to expose an area surrounding smaller, high-resolution alignment markers on the diamond. The exposed regions are developed in a 1:3 mixture of MIBK:IPA. Espacer is again spin-coated, and a second EBL write can be done, aligned to the high-resolution markers. Based on these alignment markers, holes of less than 65 nm diameter (limited by the resolution of PMMA resist) are patterned onto the center of the photonic crystal cavity which, after subsequent development, act as narrow apertures to the diamond surface [FIG. 6 panel (a) step IV)]. The rest of the diamond surface is still covered in sufficiently thick PMMA to prevent ions from reaching masked portions of the device. Diamonds are then sent to a commercial foundry (Innovion®) where they are implanted with silicon ions at the appropriate energy and dose [FIG. 6 panel (b)]. Annealing in a UHV vacuum furnace (Kurt-Lesker®) at ~1400 K can convert these implanted ions into SiV centers.

CPWs can be fabricated using a liftoff process similar to that used to create masked implantation windows. The most notable difference is an additional oxygen plasma descum after development to remove PMMA residue from the surface. Following development, a 10 nm titanium film can serve as an adhesion layer for a 250 nm thick gold CPW [FIG. 6 panel (a) step V]. Liftoff is performed in heated Remover PG (Microchem®) [FIG. 6 panel (a) step VI]. The metal thicknesses used here are chosen to improve adhesion of the gold, as well as prevent absorption of cavity photons by the metallic CPW. It is observed that the cavity quality factor significantly degrades with gold films with a thickness greater than 300 nm. Due to ohmic heating, which can degrade the coherence properties of SiV spins, the length of the CPW is constrained to address a maximum of roughly 6 devices.

Additional improvements in diamond device performance can be implemented by improvements of the fabrication technology. For example, device quality factors can be limited by deviations in device cross section caused by imperfect selectivity of the HSQ hard mask to oxygen etching. Replacing this mask with a sufficiently smooth metal mask could result in improved etch selectivity and device performance. Isotropic undercut etching could also lead to improved control over device cross sections and facilitate more sophisticated device geometries at the cost of reduced control over isotropically etched surface roughness. Various techniques exist for the formation of smaller implantation apertures, but these techniques are difficult to use in conjunction with implantation into completed nanophotonic devices. Finally, the use of superconducting strip lines could reduce heating, which can enable the CPW to address all devices on the diamond chip and allow for faster driving of SiV spin and nuclear transitions.

1.3. Example Setup

Figure 7:
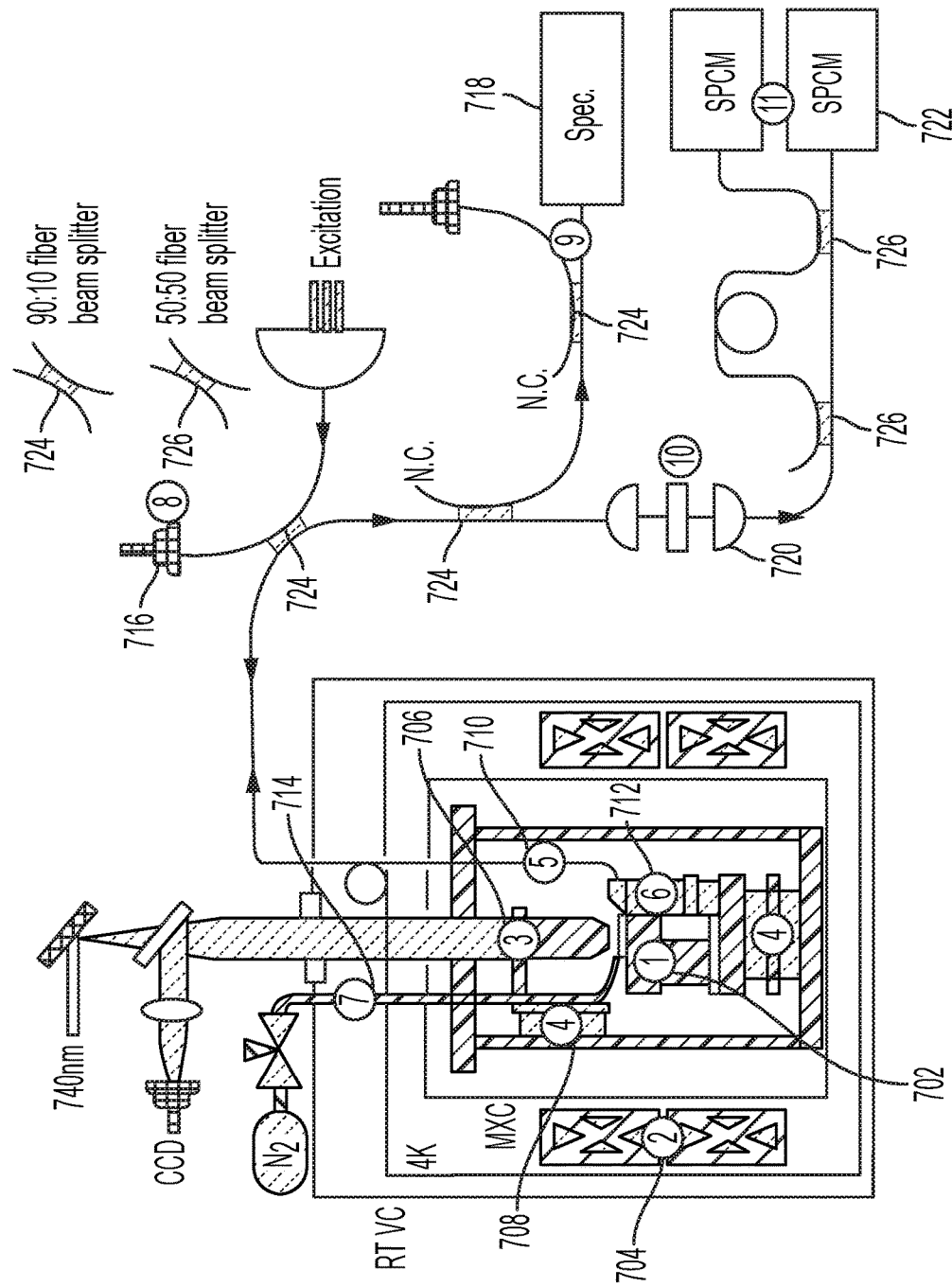
FIG. 7 shows schematics of the example set-up and fiber network used to probe devices, according to some embodiments of the present disclosure.

FIG. 7 panel (a) shows an example setup schematic, according to some embodiments of the present disclosure. Devices 702 are mounted in the bore of a SC magnet 704 inside of a dilution refrigerator and imaged with wide-field imaging 706 and piezo steppers 708. Devices are addressed with a tapered optical fiber 710 positioned using a second set of piezo steppers 712. Cavities are tuned using nitrogen 714. FIG. 7 panel (b) shows a schematic of a fiber network used to probe devices, according to some embodiments of the present disclosure. Excitation light is monitored 716 and sent to the device. Collected light is monitored 718 and filtered 720 then sent to one or several SPCMs 722. N.C. indicates no connection. 90:10 fiber beam splitter and 50:50 fiber beam splitter are labeled as 724 and 726, respectively.

In some embodiments, processes described herein can be performed in a photonic-probe setup inside of a dilution refrigerator (DR, Blue-Fors® BF-LD250) [FIG. 7 panel (a)]. The diamond substrate is mounted to a gold-plated copper sample holder via indium soldering below the mixing chamber in the bore of a (6,1,1) T superconducting vector magnet (American Magnetics Inc.) anchored to the 4 K stage. A thermal link between the device and the mixing chamber plate is provided by gold-plated copper bars, as well as oxygen-free copper braids (Copper Braid® Products), which can ensure maximal thermal conductivity between the mixing chamber plate and the sample, which reaches a base temperature of roughly 60 mK. Single nanophotonic device can be addressed via a tapered optical fiber, which can be coupled in-situ with collection efficiencies exceeding 90%. The tapered fiber is mounted to a 3-axis piezo stepper (ANPx101, ANPz101), and imaged in free-space by an 8f wide-field scanning confocal microscope which focuses onto a cryo-compatible objective (Attocube® LT-APO-VI-SIR). This setup allows for coupling to several cavities during a single cooldown.

In some embodiments, once coupled, the cavity resonance can be red-shifted via nitrogen gas condensation. A copper tube is weakly thermalized with the 4 K plate of the DR and can be heated above 80 K in order to flow $N_2$ gas onto the devices. This gas condenses onto the photonic crystal, modifying its refractive index and red-shifting the cavity resonance. When the copper tube is not heated, it thermalizes to 4K, reducing the blackbody load on the sample and preventing undesired gas from leaking into the vacuum chamber.

In some embodiments, after red-tuning all devices in this way, each cavity can be individually blue-tuned by illuminating the device with a ~100 µW broadband laser via the tapered fiber, locally heating the device and evaporating nitrogen. This laser-tuning can be performed very slowly to set the cavity resonance with a few GHz. The cavity tuning range exceeds 10 nm without significantly degrading the cavity quality factor, and is remarkably stable inside the DR, with no observable drift over several months of measurements.

In previous work, SiVs were probed in transmission via the free-space confocal microscope focused onto a notch opposing the tapered fiber. Mechanical vibrations arising from the DR pulse tube (~1 µm pointing error at the sample position) result in significant fluctuations in power and polarization of the coupled light. The present disclosure demonstrates a fully integrated solution by utilizing the same tapered fiber to both probe the device and collect reflected photons. This approach can stabilize the excitation path and improve the efficiency of the atom-photon interface, allowing for deterministic interactions with single itinerant photons. High-contrast reflection measurements are enabled by the high-cooperativity, critically coupled atom-cavity system. Resonant light is sent via the fiber network [FIG. 7 panel (b)] and reflected off of the target device. A small fraction (~10%) of this signal can be picked off and used to monitor the wide-band reflection spectrum on a spectrometer (Horiba® iHR-550) as well as calibrate the coupling efficiency to the nanocavity. The remaining reflection can then be routed either directly to a single-photon counting module (SPCM, Excelitas® SPCM-NIR), or into a time-delay interferometer for use in spin-photon applications. Due to this high-efficiency fiber-coupled network, overall collection efficiencies of ~40% can be observed, limited by the quantum efficiency of the APDs.

1.4. Example Strain Regimes for SiV Spin-Photon Applications

Similar to other solid-state emitters, the SiV can be sensitive to local inhomogeneity in the host crystal. In the case of the SiV, which has $D_{3d}$ symmetry, the dominant perturbation is crystal strain. This section describes the effects of strain on the SiV spin and optical properties, and how they can enable efficient microwave and optical control of SiV centers inside nanostructures.

1.4.1. SiV Hamiltonian in the Presence of Strain and Spin-Orbit Coupling

The SiV electronic structure is comprised of spin-orbit eigenstates split by spin-orbit interactions. Optical transitions connect the ground state manifold (LB, UB) and excited state manifold (LB$^I$, UB$^I$) [FIG. 4(a)]. In a DR, phonon absorption LB→UB (and LB'→UB') is suppressed, resulting in thermal polarization into LB.

Without wishing to be bound by theory, one can consider the ground state SiV Hamiltonian with spin-orbit and strain interactions, in the combined orbital and spin basis $\{|e_y\uparrow\rangle, |e_y\downarrow\rangle, |e_x\uparrow\rangle, |e_x\downarrow\rangle\}$ $$\mathcal{H}_{SiV} = \mathcal{H}_{SO} + \mathcal{H}_{strain} \qquad (4)$$

$$= \begin{pmatrix} \alpha - \beta & 0 & \gamma - i\lambda & 0 \\ 0 & \alpha - \beta & 0 & \gamma + i\lambda \\ \gamma + i\lambda & 0 & \alpha + \beta & 0 \\ 0 & \gamma - i\lambda & 0 & \alpha + \beta \end{pmatrix} \qquad (5)$$

where α corresponds to axial stain, β and γ correspond to transverse strain, and λ is the strength of spin-orbit interaction. Diagonalizing this reveals the orbital character of the lower branch:

$$LB \propto \begin{cases} |e_x\uparrow\rangle - \dfrac{1+\sqrt{1+(\gamma/\beta)^2+(\lambda/\beta)^2}}{\dfrac{\gamma}{\beta}-\dfrac{i\lambda}{\beta}}|e_y\uparrow\rangle \\ |e_x\downarrow\rangle - \dfrac{1-\sqrt{1+(\gamma/\beta)^2+(\lambda/\beta)^2}}{\dfrac{\gamma}{\beta}-i\lambda/\beta}|e_y\downarrow\rangle \end{cases} \quad (6)$$

One can identify these electronic levels in the context of the SiV as a spin-photon interface.

Figure 8:
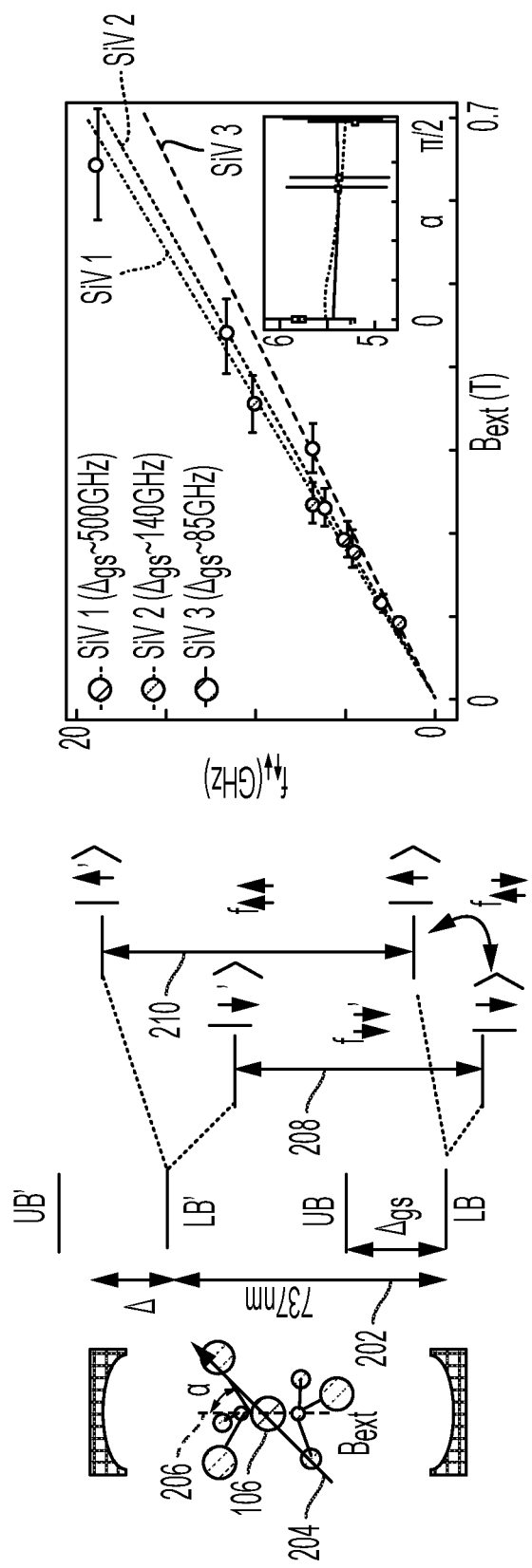
FIG. 8 shows schematics of SiV level diagram, qubit frequency for different strained emitters, optical splitting, histogram of MW transition frequency for two different emitters, histogram of optical transition frequency for two different emitters, and simultaneous measurement of $f_{fI}$ and $f_{II}$, according to some embodiments of the present disclosure.
Figure 8:
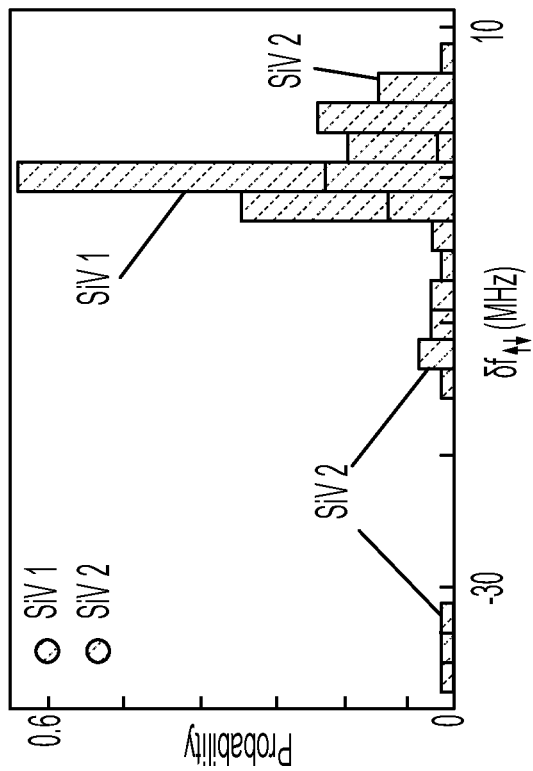
Figure 8:
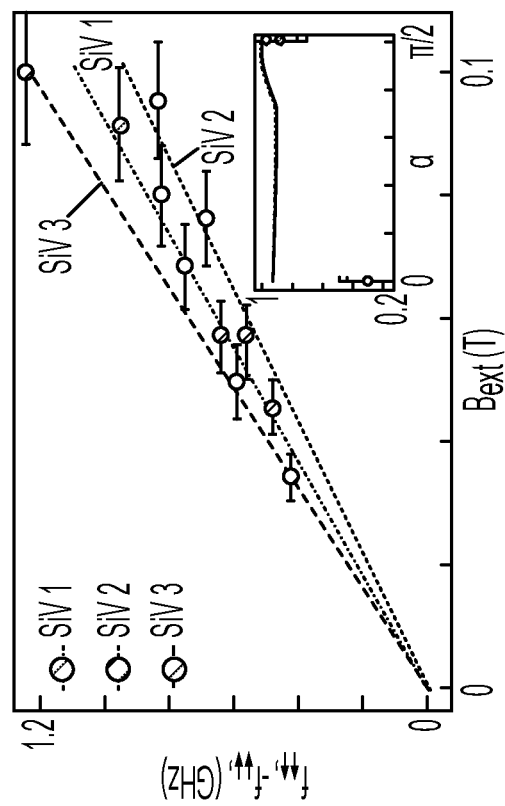
Figure 8:
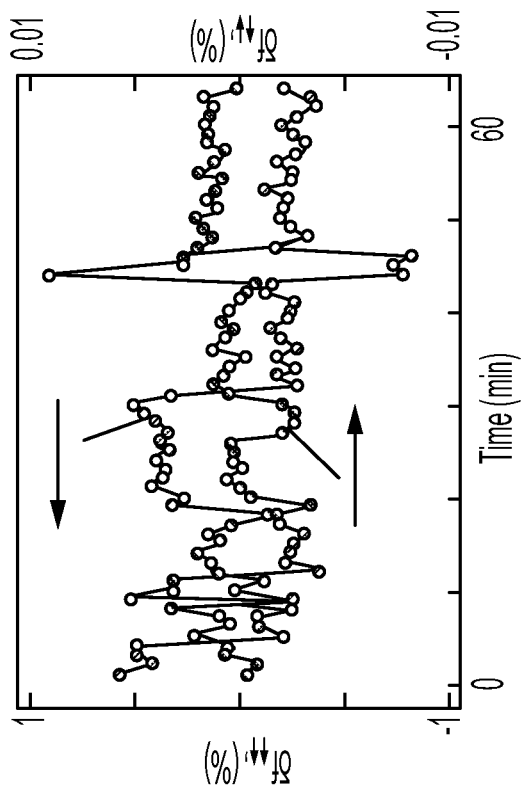
Figure 8:
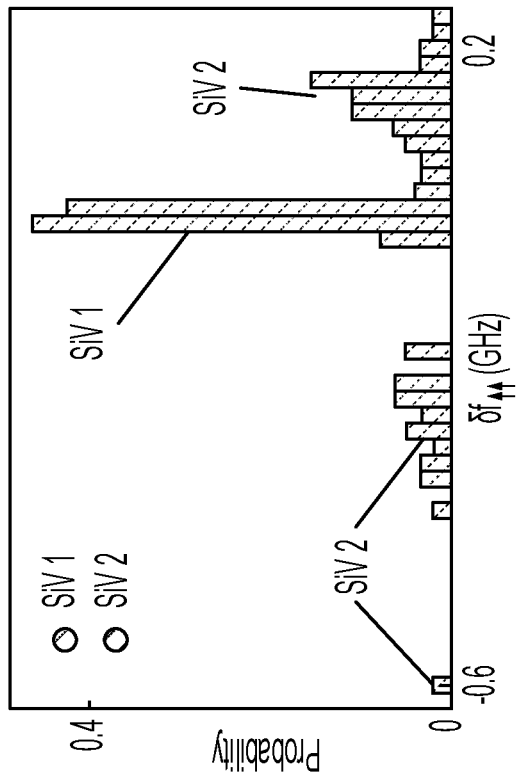

FIG. 8 panel (a) shows a schematic SiV level diagram, according some embodiments of the present disclosure. Optical transitions $f_{11'}$, $f_{11'}\sim$737 nm can be coupled to a nanophotonic cavity with mean detuning Δ. Microwaves at frequency $f_{11}$ drive rotations in the lower branch (LB). FIG. 8 panel (b) shows a plot of qubit frequency $f_{11}$ differently strained emitters, according to some embodiments of the present disclosure. Modeled splitting for ground state g-factors $g_{gs1}$=1.99, $g_{gs2}$=1.89, $g_{gs3}$=1.65 (solid lines) based on independent measurements of $\Delta_{gs}$. FIG. 8 panel (b) inset shows a plot of angle dependence of $f_{11'}$ at fixed field $B_{ext}$=0.19 T. Solid lines are predictions using the same model parameters. FIG. 8 panel (c) shows a plot of optical splitting for $f_{11'}-f_{11'}$, according to some embodiments of the present disclosure. Fits extract excite state g-factors $g_{es1}$=1.97, $g_{es2}$=1.83, $g_{es3=1.62}$ (solid lines). FIG. 8 panel (c) inset shows a plot of angle dependence of $f_{11'}-f_{11'}$ at fixed field $B_{ext}$=0.1 T. FIG. 8 panel (d) shows a histogram of MW transition frequency for two different emitters, according to some embodiments of the present disclosure. FIG. 8 panel (e) shows a histogram of optical transition frequency for two different emitters, according to some embodiments of the present disclosure. FIG. 8 panel (f) shows simultaneous measurement of $f_{11}$ and $f_{11'}$ revealing correlations between optical and microwave spectral diffusion for emitter 2, according to some embodiments of the present disclosure.

1.4.2. Effects of Strain on the SiV Qubit States

Without wishing to be bound by theory, in the limit of zero crystal strain, the orbital factors simplify to the canonical form $$LB = \begin{cases} |e_+\downarrow\rangle \\ |e_-\uparrow\rangle \end{cases} \quad (7)$$

In this example regime, the spin-qubit has orthogonal electronic orbital and spin components. As result, in some non-limiting embodiments, one would need to simultaneously drive an orbital and spin flip to manipulate the qubit, which is forbidden for direct microwave driving alone. Thus, in the low strain regime, two-photon optical transitions between the qubit states in a misaligned external field, can be used to realize a SiV spin qubit.

Without wishing to be bound by theory, in the high strain limit ($\sqrt{\beta^2+\gamma^2}\gg\lambda$), these orbitals become $$LB = \begin{cases} (\cos(\theta/2)|e_x\rangle - \sin(\theta/2)|e_y\rangle) \otimes |\downarrow\rangle \\ (\cos(\theta/2)|e_x\rangle - \sin(\theta/2)|e_y\rangle) \otimes |\uparrow\rangle \end{cases} \quad (8)$$

where tan $$(\theta) = \frac{\beta}{\gamma}.$$

In this regime, the ground state orbital components are identical, and the qubit states can be described by the electronic spin degree of freedom. As such, the magnetic dipole transition between the qubit states is now allowed and can be efficiently driven with microwaves.

In addition to determining the efficiency of qubit transitions, the spin-orbit nature of the SiV qubit states also determines its susceptibility to external fields. In an externally applied magnetic field, LB splits due to magnetic moments associated with both spin- and orbital-angular momenta. This splitting is parameterized by an effective g-tensor which, for a fixed angle between the external field and the SiV symmetry axis, can be simplified to an effective g-factor: $\mu g B_{ext}/h = f_{11}$. In the limit of large strain, the orbital component of the two LB wavefunctions converge, and g trends towards that of a free electron (g=2). As a result, the qubit states behave akin to a free electron in the high strain regime, and there is no dependence of g on external field angle or small perturbations in crystal strain.

While it is difficult to probe β or γ directly, they relate to the energy difference between UB and LB via $\Delta_{gs}= 2\sqrt{\beta_{gs}^2+\gamma_{gs}^2+\lambda_{gs}^2}$ [FIG. 8 panel (a)]. From this, one can extract $\sqrt{\beta^2+\gamma^2}$, given the know value of $\lambda_{gs}$=46 GHz. Numerically diagonalizing the SiV Hamiltonian using the extracted values for β and γ closely matches the measured ground state splitting, both as a function of applied field magnitude and angle [FIG. 8 panel (b)].

1.4.3. Effects of Strain on the SiV Spin-Photon Interface

In some embodiments, strain also plays a crucial role in determining the optical interface to the SiV spin qubit. The treatment shown above can be repeated for the excited states, with the caveat that the parameters β, γ, and λ are different in the excited state manifold as compared to the ground state manifold. These differences can give rise to a different g-factor in the excited state ($g_{es}$). If the strain is much larger than both $\lambda_{gs}$=46 GHz and $\lambda_{es}$=255 GHz, then $g_{gs}\approx g_{es}\approx 2$. In this case, the two spin-cycling transition frequencies $f_{11'}$ and $f_{11'}$ are identical, and the spin-selective optical transitions can be the dipole-forbidden spin-flipping transitions $f_{11'}$ and $f_{11'}$.

Under more moderate strain, the difference $\delta g=|g_{es}-g_{gs}|$ splits the degenerate optical transitions $f_{11'}$ and $f_{11'}$, making them spin-selective as well. Due to differences in the anisotropic g-tensor in the ground and excited states, δg depends on the orientation of the magnetic field as well and is minimized in the case of a <111>-aligned field [FIG. 8 panel (c), inset]. In such an external field aligned with the SiV symmetry axis, optical transitions become highly spin-conserving, allowing many photons to scatter without altering the SiV spin state. This high cyclicity enables high-fidelity single-shot readout of the spin state, even without high collection efficiencies. This makes working with the spin-cycling transitions highly desirable, at the expense of a reduced ability to resolve spin-selective transitions for a given field magnitude. The need to resolve individual transitions suggests a nonlimiting, example strain regime where $\sqrt{\beta_{gs}^2+\gamma_{gs}^2}\gg\lambda_{gs}^2$, where MW driving is efficient, while $\sqrt{\beta_{es}^2+\gamma_{es}^2}\lesssim\lambda_{es}$, where one can independently address $f_{11'}$ and $f_{11'}$ [FIG. 8 panel (c)].

1.4.4. Effects of Strain on SiV Stability

Despite the SiV's symmetry-protected optical transitions, spectral diffusion of the SiV has been observed in many example use cases (but still much smaller compared to emitters without inversion symmetry, for example, nitrogen-vacancy centers). While the exact nature of this diffusion has not been studied in depth, it is often attributed to the second-order Stark effect or strain fluctuations, both of which affect the energies of SiV orbital wavefunctions. In some embodiments, one can also observe significant fluctuations of the spin qubit frequency.

In some embodiments, for an appropriately low static strain value, fluctuating strain can give rise to fluctuations in the g-tensor of the ground state, causing spectral diffusion of the qubit frequency $f_{11}$ [FIG. 8 panel (d)]. Since $g_{gs}$ asymptotically approaches 2 as the static strain increases, the qubit susceptibility to this fluctuating strain is reduced in the case of highly strained SiV centers, resulting in a more stable qubit.

Figure 16:
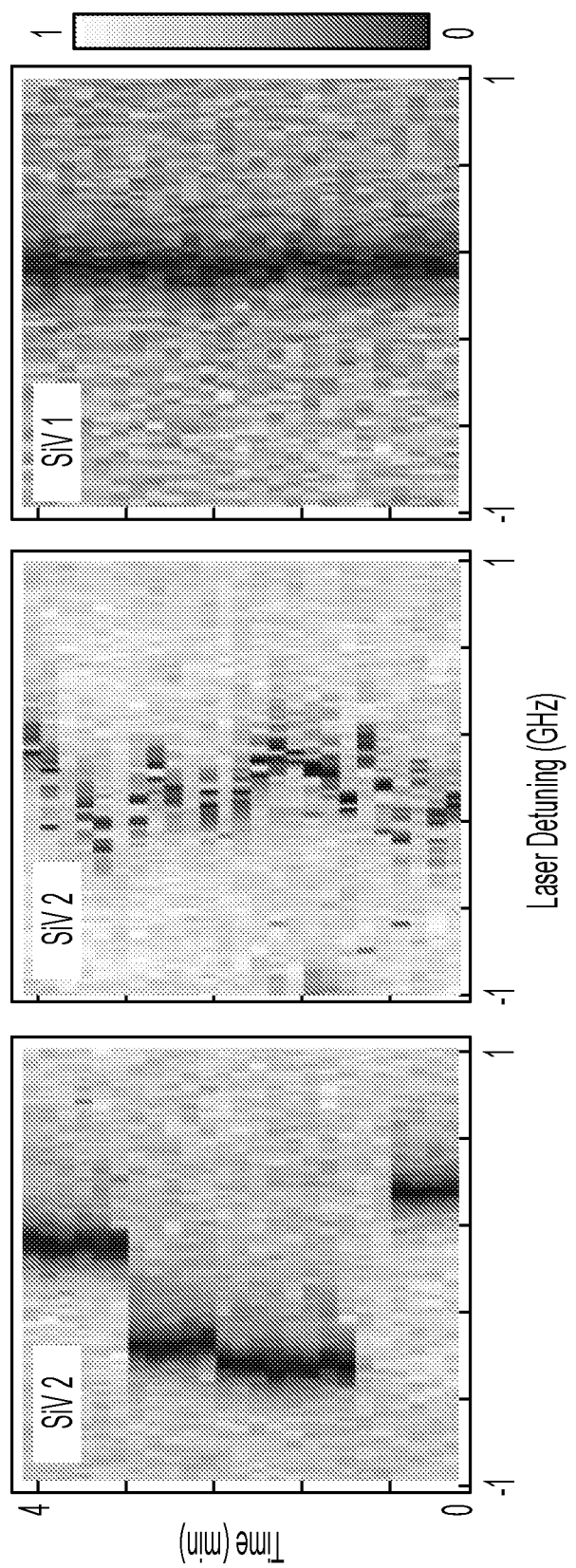
FIG. 16 shows plots of spectral diffusion of SiV 2 and SiV 1 in nanostructures, according to some embodiments of the present disclosure.

In some embodiments, while spectral diffusion of the optical transition should not saturate in the same way as diffusion of the microwave transition, qualitatively different spectral diffusion properties are observed for different emitters [FIG. 8 panel (e) and FIG. 16]. SiV 1 ($\Delta_{gs}$=500 GHz) displays slow drift of the optical line which is stable to <100 MHz over many minutes. In some embodiments, one does not observe significant fluctuations (>500 kHz) of the microwave transition for this SiV. On the other hand, SiV 2 ($\Delta_{gs}$=140 GHz) drifts over a wider range, and also exhibits abrupt jumps between several discrete frequencies.

In some embodiments, one can simultaneously record the optical transition and qubit frequency for SiV 2 and observe correlations between the two frequencies [FIG. 8 panel (f)], indicating that they could arise from the same environmental perturbation. In some embodiments, one can calculate the qubit and optical transition frequencies using the strain Hamiltonian (Eqn. 5) and find that both correlations and absolute amplitudes of spectral diffusion can simultaneously be explained by strain fluctuations on the order of 1% (~$10^{-7}$ strain).

In some embodiments, one can rely on static strain, which can result from damage induced by ion implantation and nanofabrication and select for spectrally stable SiVs with appropriate strain profiles. This is characterized by first measuring $\Delta_{gs}$ in zero magnetic field at 4 K by exciting the optical transition LB→LB$^I$ and measuring emission from the LB$^I$→UB on a spectrometer. One can use this to screen for SiVs with $\Delta_{gs}$>100 GHz which can provide efficient MW driving of the spin qubit. One can further apply a static external magnetic field and measure spectral stability properties as well as $f_{11I}$-$f_{11I}$ to provide a good spin-photon interface. In some embodiments, 10 candidate emitters are measured, and 4 are found to satisfy all of the example criteria for spin-photon applications.

1.5. Regimes of Cavity-QED for SiV Spin-Photon Interfaces

Efficient spin-photon interactions can be enabled by incorporating SiV centers into nanophotonic cavities. This section describes SiV-cavity measurements in several regimes of cavity QED, and comment on example uses for spin-photon applications.

1.5.1. Spectroscopy of cavity coupled SiVs

Figure 9:
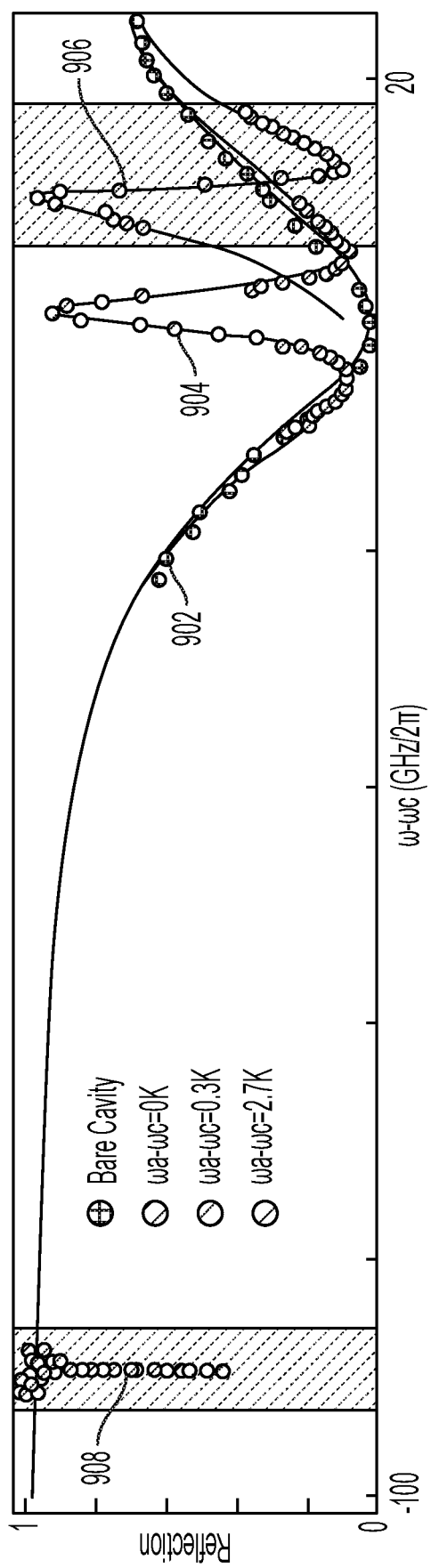
FIG. 9 shows a SiV-cavity reflection spectrum at several detunings, spin-dependent reflection for large SiV-cavity detuning, spin-dependent reflection near resonance, and a probe at the frequency of maximum contrast, according to some embodiments of the present disclosure.
Figure 9:
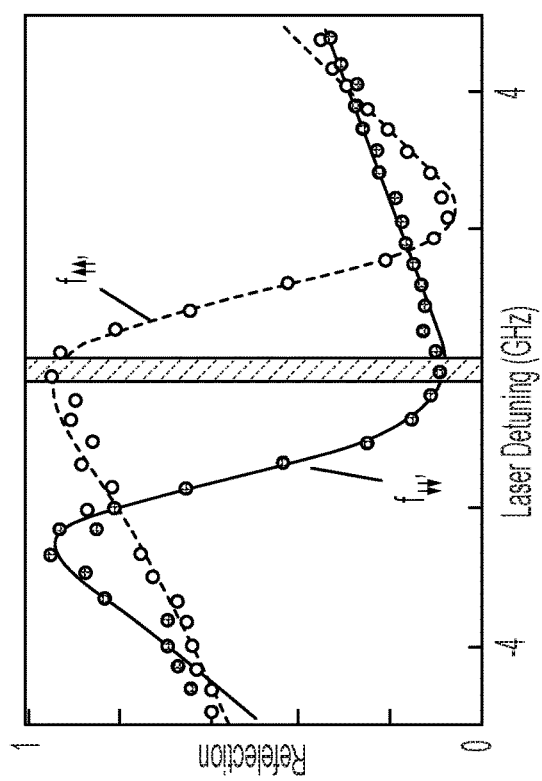
Figure 9:
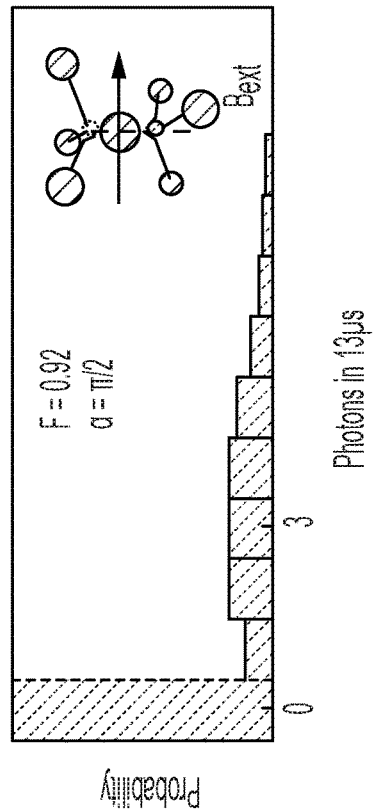
Figure 9:
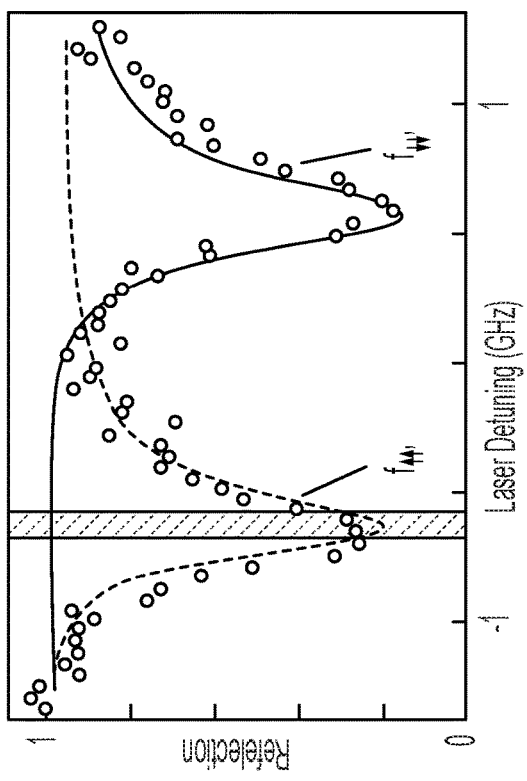
Figure 9:
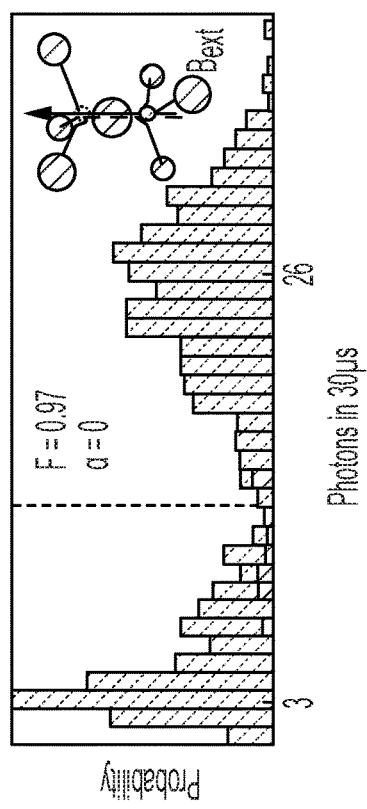

FIG. 9 panel (a) shows a SiV-cavity reflection spectrum at several detunings, according to some embodiments of the present disclosure. The bare cavity spectrum (902) is modulated by the presence of the SiV. When the atom cavity detuning is small (904, 906), high-contrast, broad features are the result of Purcell enhanced SiV transitions. Far from the cavity resonance (908), interaction results in narrow SiV-assisted transmission channels. FIG. 9 panel (b) shows a plot of spin-dependent reflection for large SiV-cavity detuning $\Delta\approx-3\kappa$, $B_{ext}$=0.35 T, according to some embodiments of the present disclosure. In this regime, SiV spin states can be individually addressed. FIG. 9 panel (c) is a plot showing that probing either transmission dip results in high-fidelity single-shot readout in an aligned field (F=0.97, threshold on detecting 13 photons), according to some embodiments of the present disclosure. FIG. 9 panel (d) shows a plot of spin-dependent reflection near resonance $\Delta\approx0.5\kappa$, $B_{ext}$=0.19 T, according to some embodiments of the present disclosure. Dispersive line shapes allow for distinguishable reflection spectra from both SiV spin states. FIG. 9 panel (e) is a plot showing that a probe at the frequency of maximum contrast ($f_Q$) can determine the spin state in a single shot in a misaligned field (F=0.92, threshold on detecting>1 photon), according to some embodiments of the present disclosure.

In some embodiments, one can measure the spectrum of the atom-cavity system at different atom-cavity detunings in order to characterize the device and extract key cavity QED parameters [FIG. 9 panel (a)]. Without wishing to be bound by theory, the reflection spectrum of a two-level system coupled to a cavity can be modeled by solving the frequency response of the standard Jaynes-Cummings Hamiltonian using input-output formalism for a cavity near critical coupling:

$$\mathcal{R}(\omega) = \left|1 - \left(\frac{2\kappa_I}{i(\omega-\omega_c)+\kappa_{tot}+g^2/(i(\omega-\omega_a)+\gamma)}\right)\right|^2 \quad (9)$$

where $\kappa_I$ is the decay rate from the incoupling mirror, $\kappa_{tot}$ is the cavity linewidth, $\omega_c$($\omega_a$) is the cavity (atom) resonance frequency, g is the single-photon Rabi frequency, and $\gamma$ is the bare atomic linewidth. Without wishing to be bound by theory, interactions between the SiV optical transition and the nanophotonic cavity result in two main effects. First, the SiV center can modulate the reflection spectrum of the bare cavity, as seen in the curves of FIG. 9 panel (a). Second, the coupling to the cavity can broaden the linewidth of the SiV based on the Purcell effect:

$$\Gamma \approx \gamma + 4g^2/\kappa \frac{1}{1+4(\omega_c-\omega_a)^2/\kappa^2} \quad (10)$$

When the cavity is far detuned from the atomic transition |$\omega_c$-$\omega_a$|$\Delta$>$\kappa$ [FIG. 9 panel (a), 908], Purcell enhancement is negligible and the cavity and atomic linewidths $\kappa$, $\gamma$=2$\pi\times$ {33, 0.1} GHz are estimated. When the cavity is on resonance with the atom ($\Delta$=0), one can fit Eqn. (9) using previously estimated values of $\kappa$ and $\gamma$ to extract g=2$\pi$ 5.6 GHz. Together, these measurements can determine the atom-cavity cooperativity C=4 $g^2/\kappa\gamma$=38. In some embodiments, interactions between the SiV and single photons becomes deterministic when C>1.

In some embodiments, one can make use of spectrally resolved spin conserving optical transitions ($f_{11I}$, $f_{11I}$) to build a spin-photon interface using the SiV. In some embodiments, one can make this criterion more explicit: $f_{11I}$ and $f_{11I}$ can be resolved when |$f_{11I}$-$f_{11I}$|≥$\Gamma$.

1.5.2. Cavity QED in the Detuned Regime

In the detuned regime ($\Delta > \kappa$), $\Gamma \approx \gamma$, and narrow atom-like transitions are easily resolved under most magnetic field configurations, including when the field is aligned with the SiV symmetry axis [FIG. 9 panel (b)]. In this case, optical transitions are highly spin-conserving, and many photons can be collected allowing for high-fidelity single-shot readout of the SiV spin state (F=0.97) [FIG. 9 panel (c)]. Rapid, high-fidelity, nondestructive single-shot readout can enable projective-readout based initialization: after a single measurement of the SiV spin state, the probability of a measurement-induced spin flip is low, effectively initializing the spin into a known state.

While this regime is useful for characterizing the system, the maximum fidelity of spin-photon entanglement based on reflection amplitude can be limited. As seen in FIG. 9 panel (b), the contrast in the reflection signal between an SiV in $|\uparrow\rangle$ vs. $|\downarrow\rangle$ is 80%, implying that in 20% of cases, a photon is reflected from the cavity independent of the spin state of the SiV, resulting in errors. It is noted that the residual 20% of reflection can be compensated by embedding the cavity inside an interferometer at the expense of additional technical stabilization challenges, discussed below.

1.5.3. Cavity QED Near Resonance

Tuning the cavity onto the atomic resonance ($\Delta \approx 0$) dramatically improves the reflection contrast [FIG. 9 panel (a) 904]. Here, nearly full contrast of the reflection spectrum is observed due to the presence of the SiV. Unfortunately, this is associated with a broadened atomic linewidth ($\Gamma = \gamma(1+C)$ ~4 GHz). While it is, in principle, still possible to split the atomic lines by going to higher magnetic fields, there are several technical considerations which make this impractical. Large magnetic fields ($|B_{ext}| > 0.5$ T) correspond to large qubit frequencies ($f_{\uparrow\downarrow}$), which can induce spontaneous qubit decay due to phonon emission ($|\uparrow\rangle |\downarrow\rangle$), as well as increased local heating of the device from microwave dissipation, both of which reduce the SiV spin coherence time rendering it ineffective as a quantum memory.

At intermediate detunings ($0 < \Delta < \kappa$), the SiV resonance is located on the cavity slope and results in high-contrast, spin-dependent Fano line shapes which exhibit sharp features smaller than $\Gamma$ [FIG. 9 panel (a) 906]. By working at a $B_{ext}$ for example where the peak of one spin transition is overlapped by the valley of the other, the best features of the resonant and far-detuned regimes are recovered [FIG. 9 panel (e)]. Probing the system at the point of maximum contrast ($f_Q \approx (|f_{\uparrow\uparrow'} - f_{\downarrow\downarrow'}|)/2$, contrast>90%) enables single-shot readout of the SiV spin state for an arbitrary field orientation, even when transitions are not cycling [FIG. 9 panel (f)].

This demonstrates an optical regime of cavity QED where high-contrast readout can be achieved while spin-dependent transitions is maintained. In this regime, one can still expect residual reflections of about 10%, which end up limiting spin-photon entanglement fidelity. This infidelity arises because the cavity is not perfectly critically coupled ($\kappa_r = \kappa_{tot}/2$), and can in principle be solved by engineering devices that are more critically coupled. Alternatively, this problem can be addressed for any cavity by interfering the signal with a coherent reference to cancel unwanted reflections. In this case, in some embodiments, one would have to embed the cavity in one arm of a stabilized interferometer. This is quite challenging, as it involves stabilizing ~10 m long interferometer arms, part of which lie inside the DR (and experience strong vibrations from the pulse-tube cryocooler).

A fundamental issue with critically coupled cavities is that not all of the incident light is reflected from the device. If the spin is not initialized in the highly reflecting state, photons are transmitted and not recaptured into the fiber network. Switching to over-coupled (single-sided) cavities, where all photons are reflected with a spin-dependent phase, could improve both the fidelity and efficiency of spin-photon entanglement. Once again, however, measurement of this phase can sometimes require embedding the cavity inside of a stabilized interferometer. As such, the un-compensated reflection amplitude-based scheme employed here is the most technically simple approach to engineering spin-photon interactions.

1.6. Microwave Spin Control

While the optical interface described in previous sections enables high-fidelity initialization and readout of the SiV spin qubit, direct microwave driving can be the most straightforward path towards coherent single-qubit rotations. Typically, microwave manipulation of electron spins involves application of significant microwave power. This presents a challenge, as some SiV spins need to be kept at local temperatures below 500 mK in order to avoid heating-related dephasing. In some embodiments, one can implement coherent microwave control of SiV centers inside nanostructures at temperatures below 500 mK.

1.6.1. Generating Microwave Single-Qubit Gates

Figure 10:
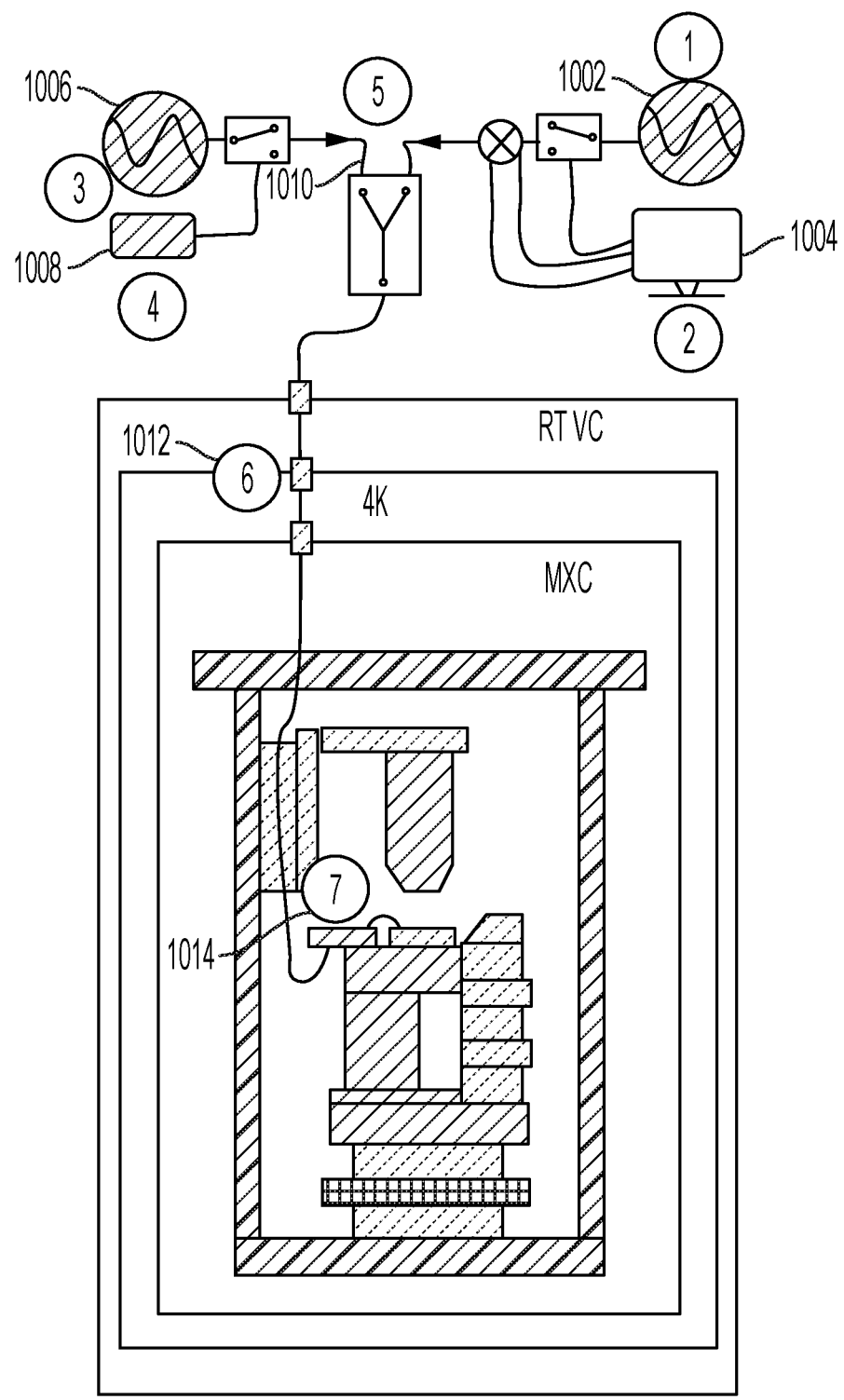
FIG. 10 shows example schematics for microwave control, microwave-induced heating of devices, modeled temperature at the SiV, effect of microwave heating on SiV coherence time, and Hahn-echo for even lower Rabi frequencies, according to some embodiments of the present disclosure.
Figure 10:
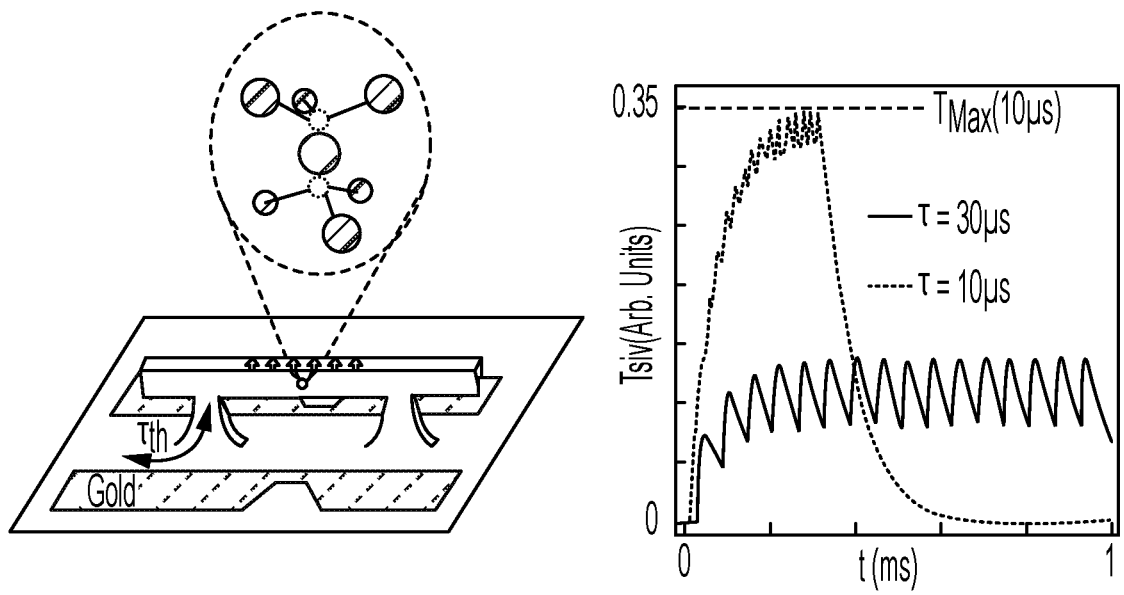
Figure 10:
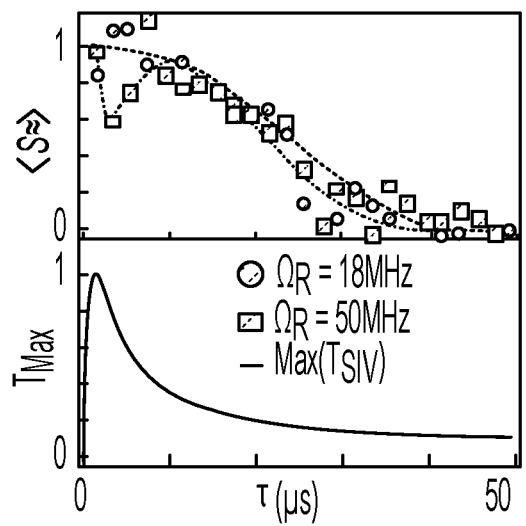
Figure 10:
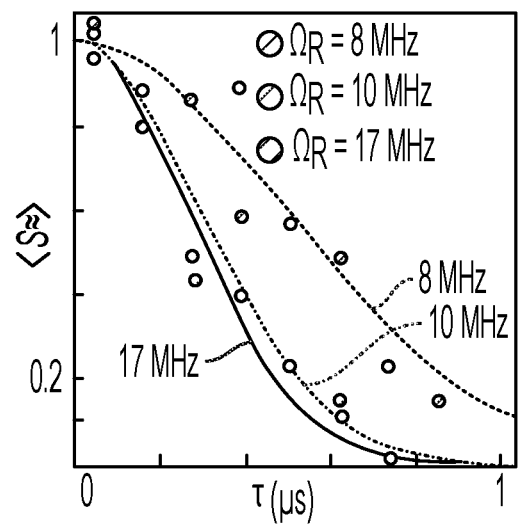

FIG. 10 panel (a) is a schematic of a setup for microwave control, according to some embodiments of the present disclosure. The amplitude and phase of a CW microwave source 1002 are modulated via a microwave switch and IQ mixer controlled externally by an AWG 1004. A CW radio frequency source 1006 is controlled using a digital delay generator 1008. Both signals are amplified by 30 dB amplifiers 1010 before entering the DR. 0 dB cryo-attenuators 1012 thermalize coax cables at each DR stage, ultimately mounted to a PCB 1014 on the sample stage and delivered to the devices. FIG. 10 panel (b) shows a schematic depicting microwave-induced heating of devices, according to some embodiments of the present disclosure. FIG. 10 panel (c) is a plot showing modeled temperature at the SiV from a dynamical decoupling sequence, according to some embodiments of the present disclosure. At long $\tau$, device cools down between each decoupling pulse, resulting in low temperatures. At short $\tau$, devices are insufficiently cooled, resulting in a higher max temperature ($T_{max}$). FIG. 10 panel (d) is a plot showing effects of microwave heating on SiV coherence time, according to some embodiments of the present disclosure. The top panel shows that at high Rabi frequencies, SiV coherence is temporarily reduced for small $\tau$. The bottom panel shows the local temperature ($T_{max}$) at the SiV calculated by taking the maximum value of the plots in panel (c). FIG. 10 panel (e) is a plot of Hahn-echo for even lower Rabi frequencies, showing coherence times that scale with microwave power, according to some embodiments of the present disclosure.

The SiV spin can be coherently controlled using amplitude and phase-controlled microwave pulses generated by a Hittite® signal generator (HMC-T2220). A target pulse sequence can be loaded onto an arbitrary waveform generator (Tektronix® AWG 7122B), which uses a digital channel to control a fast, high-extinction MW-switch (Custom Microwave Components, CMCSO947A-C2), and the analog channels adjust the amplitude and phase via an IQ-mixer (Marki®, MMIQ-0416LSM). The resulting pulse train is subsequently amplified (Minicircuits®, ZVE-3 W-183+) to roughly 3 W of power and sent via a coaxial cable into the dilution refrigerator. At each cryogenic flange, a 0 dB attenuator is used to thermalize the inner and outer conductors of the coaxial line while minimizing microwave dissipation. The signal is then launched into a coplanar waveguide on a custom-built circuit board (Rogers4003C, Bay Area Circuits®) so it can be wire-bonded directly to the diamond chip [FIG. 10 panel (c)]. The qubit frequency ($f_{11}$) can be measured by its optically detected magnetic resonance spectrum (ODMR). In some embodiments, ODMR can be observed from 2 GHz to 20 GHz (corresponding to fields from 0.1 T to 0.7 T), implying that microwave control of SiV centers in this configuration is possible at a wide variety of external field magnitudes. This allows the freedom of tuning the field to optimize other constraints, such as for resolving spin transitions and identifying ancillary nuclear spins.

Once the qubit frequency has been determined for a given field, single-qubit gates are tuned up by measuring Rabi oscillations. The frequency of these oscillations scales with the applied microwave power $\Omega_R \sim \sqrt{P}$ and determines the single-qubit gate times. One can perform $\pi$-pulses $R_\phi^\pi$ in under 12 ns, corresponding to a Rabi frequency exceeding 80 MHz. This coherent control is used to implement pulse-error correcting dynamical decoupling sequences, either CPMG-N sequences of the form $R_x^{\pi/2}-(\tau-R_y^\pi-\tau)^N-R_x^{\pi/2}=$ x-(Y)$^N$-x or XY8-N sequences of the form x-(XY XYY XYX)$^N$-x. Sweeping the inter-pulse delay r measures the coherence time $T_2$ of the SiV.

1.6.2. Effects of Microwave Heating on Coherence

In some embodiments, thermally induced $T_1$ relaxation can dramatically reduce SiV coherence times. Without wishing to be bound by theory, to explain this phenomenon, one can model the nanobeam as a 1D beam weakly coupled at two anchor points to a uniform thermal bath [FIG. 10 panel (b)]. Initially, the beam is at the steady-state base temperature of the DR. A MW pulse instantaneously heats the bath, and the beam re-thermalizes on a timescale $\tau_{th}$ set by the thermal conduction of diamond and the beam geometry. Once the pulse ends, this heat is extracted from the beam on a similar timescale. Without wishing to be bound by theory, by solving the time-dependent 1-D heat equation, one can find that the change in temperature at the SiV caused by a single pulse (starting at time $t_0$) scales as $\propto(e^{-(t-t_0)/\tau_{th}} - e^{-9(t-t_0)/\tau_{th}})$. One can take the sum over N such pulses to model the effects of heating from a dynamical-decoupling sequence of size N.

In some embodiments, at early times ($\tau < \tau_{th}$), the SiV does not see the effects of heating by the MW line, and coherence is high. Similarly, at long times ($\tau \gg \tau_{th}$) a small amount of heat is able to enter the nanostructure and slightly raise the local temperature, but this heat can be dissipated before the next pulse arrives [FIG. 10 panel (c), 30 µs]. At intermediate timescales however, a situation can arise where the nanobeam has not fully dissipated the heat from one MW pulse before the second one arrives [FIG. 10 panel (c), 10 µs]. One can plot the maximum temperature as seen by the SiV as a function of pulse spacing [FIG. 10 panel (d), lower panel], and observe a spike in local temperature for a specific inter-pulse spacing $\tau$, which depends on $\tau_{th}$. Dynamical-decoupling sequences using high Rabi frequency pulses reveal a collapse in coherence at a similar time [FIG. 10 panel (d), upper panel]. This collapse disappears at lower Rabi frequencies, suggesting that it is associated with heating-related dephasing. One can fit this collapse to a model where the coherence time $T_2$ depends on temperature and extract the rate of heating $\tau_{th}=70$ µs.

Typically, faster $\pi$-pulses improve measured spin coherence by minimizing finite-pulse effects and detuning errors. Unfortunately, as seen above, faster pulses can involve higher MW powers which cause heating-related decoherence in the system. One can measure Hahn-echo at lower MW powers [FIG. 10 panel (e)] and find MW heating limits $T_2$ even at $\Omega_R \sim 10$ MHz. For applications where long coherence is important, such as electron-nuclear gates, one can operate at a Rabi frequency, for example at $\Omega R=2\pi$ 10 MHz where nuclear gates are as fast as possible while maintaining coherence for the entire gate duration. For applications such as spin-photon entangling gates where fast gates are used, one can operate at higher Rabi frequencies $\Omega R=2\pi \times 80$ MHz at the cost of reduced coherence times.

In some embodiments, heating related effects could be mitigated by using superconducting microwave waveguides. This approach can also enable the fabrication of a single, long superconducting waveguide that could simultaneously address all devices on a single chip. However, it is still an open question whether or not superconducting waveguides with appropriate critical temperature, current, and field properties can be fabricated around diamond nanostructures.

1.7. Example noise bath of SIVs in nanostructures

Figure 11:
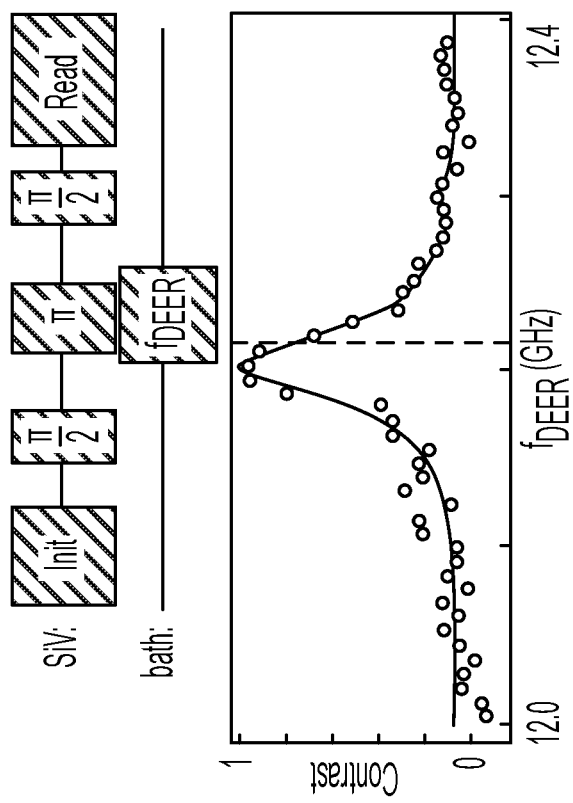
FIG. 11 shows schematics of T2 scaling for two different SiVs, DEER ESR on SiV 2, DEER Echo on SiV 2, and dynamical decoupling on SiV 1, according to some embodiments of the present disclosure.
Figure 11:
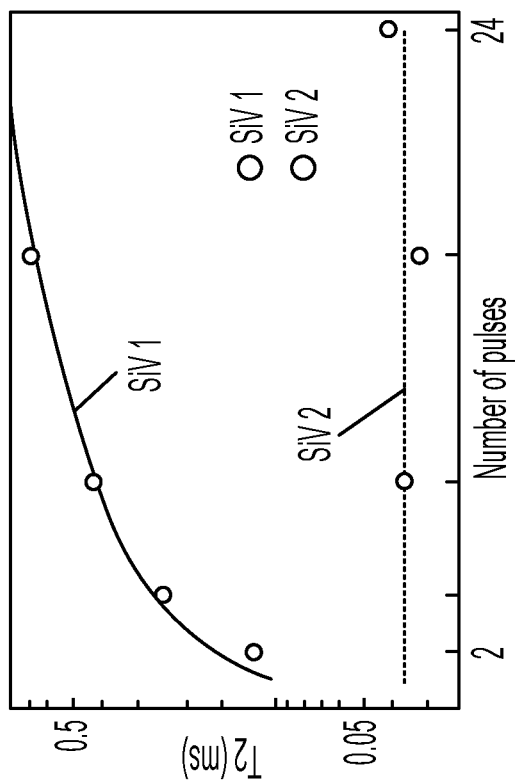
Figure 11:
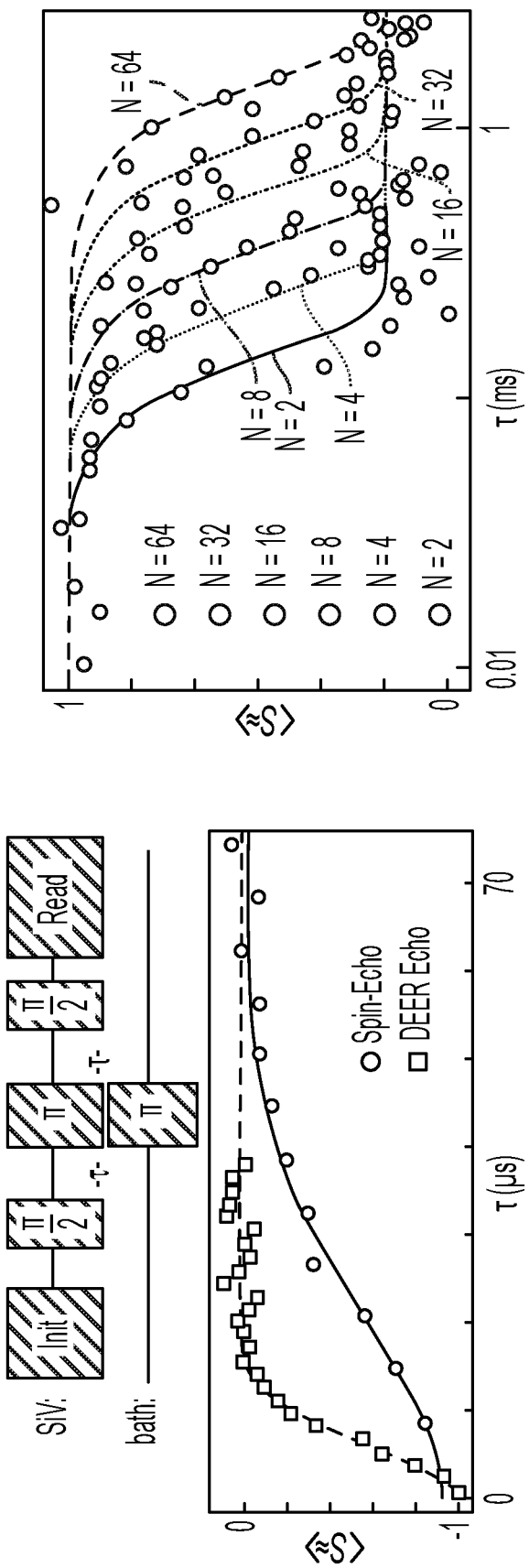

FIG. 11 panel (a) is a plot showing $T_2$ scaling for two different SiVs, according to some embodiments of the present disclosure. SiV 2 exhibits no scaling with number of pulses ($T_{2,SiV2}=30$ µs). FIG. 11 panel (b) is plot of DEER ESR on SiV 2, according to some embodiments of the present disclosure. Vertical dashed line is the expected frequency of a g=2 spin based on the ability to determine the applied external field (typically to within 10%). FIG. 11 panel (c) is a plot of DEER Echo on SiV 2. $T_{2,DEER}=10$ µs, according to some embodiments of the present disclosure. FIG. 11 panel (d) is a plot of dynamical decoupling on SiV 1, according to some embodiments of the present disclosure. Data points are $T_2$ measurements used in SiV 1, and solid lines are a noise model consisting of two Lorentzian noise baths.

At low temperatures, the coherence time of SiV centers can drastically depend on the surrounding spin bath, which can differ from emitter to emitter. As an example, it is noted that the $T_2$ of two different SiV centers in different nanostructures scales differently with the number of applied decoupling pulses [FIG. 11 panel (a)]. In some embodiments, the coherence time of SiV 2 does not scale with the number of applied pulses, while the coherence time of SiV 1 does scale as $T_2(N) \sim N^{2/3}$. Notably, both scaling can be different as compared to what was previously measured in bulk diamond: $T_2(N) \sim N^1$. In some embodiments, one can probe the spin bath of these two SiVs in nanostructures to identify example explanations for the above observations.

1.7.1. Double Electron-Electron Resonance Spectroscopy of SiVs in Nanostructures In order to identify the poor coherence of SiV 2, one can perform double electron-electron resonance (DEER) spectroscopy to probe the spin bath surrounding this SiV. In some embodiments, one can perform a Hahn-echo sequence on the SiV, and sweep the frequency of a second microwave pulse (taking the RF path in FIG. 10 panel (a)), contemporaneous with the echoing SiV $\pi$-pulse [FIG. 11 panel (b), upper panel]. If this second pulse is resonant with a spin bath coupled to the SiV, the bath can flip simultaneously with the SiV, leading to increased sensitivity to noise from the bath [FIG. 11 panel (b), lower panel]. In some embodiments, one can observe a significant reduction of coherence at a frequency consistent with that of a free-electron spin bath ($g_{bath}=2$) (resonance expected at 12(1) GHz).

In some embodiments, one can repeat a standard Hahn-echo sequence where a $\pi$-pulse resonant with this bath is applied simultaneously with the SiV echo pulse (DEER echo). The coherence time measured in DEER echo is significantly shorter than for standard spin-echo, indicating that coupling to this spin bath is a significant source of decoherence for this SiV. Without wish to be bound by theory, one possible explanation for the particularly severe bath surrounding this SiV is a thin layer of alumina ($Al_2O_3$) deposited via atomic layer deposition on this device in order to tune cavities closer to the SiV transition frequency. The amorphous oxide layer—or its interface with the diamond crystal—can be host to a large number of charge traps, all located within ~50 nm of this SiV. In some embodiments, one cannot measure this device without alumina layer due to difficulties to gas-tune the nanophotonic cavity close enough to the SiV resonance.

These observations are further corroborated by DEER measurements in SiV 1, where the alumina layer was not used ($N_2$ was used to tune this cavity). In some embodiments, one can observe longer coherence times which scale $T_2(N) N^{2/3}$, as well as no significant signatures from $g_{bath}=2$ spins using DEER spectroscopy. Without wish to be bound by theory, one can fit this scaling to a model consisting of two weakly-coupled spin baths [FIG. 11 panel (d)], and extract bath parameters $b_1=5$ kHz, $\tau_1=1$ μs, $b_2=180$ kHz, $\tau_2=1$ ms, where b corresponds to the strength of the noise bath, and τ corresponds to the correlation time of the noise.

In some embodiments, one can find that the $b_2$ term (for example due to bulk impurities) is the dominant contribution towards decoherence in the system. Removing this term from the model results in coherence times up to a factor of 1000 times larger than measured values. Higher-temperature or in situ annealing can mitigate this source of decoherence in some embodiments by eliminating paramagnetic defects such as vacancy clusters. Additionally, by accompanying Si implantation with electron irradiation, SiV centers could be created more efficiently, and with reduced lattice damage. Finally, working with isotopically purified diamond samples with very few $^{13}C$, a spin-½ isotope of carbon, could also result in a reduced spin bath.

1.8. Spin-Photon Entanglement

The previous sections characterize the SiV as an efficient spin-photon interface and a quantum memory with long-lived coherence. In some embodiments, one can combine these two properties to demonstrate entanglement between a spin qubit and a photonic qubit. The mechanism for generating entanglement between photons and the SiV can be seen in FIG. 9 panels (b) and (d). Depending on the spin state of the SiV, photons at the probe frequency are either reflected from the cavity and detected or are transmitted and lost.

Figure 12:
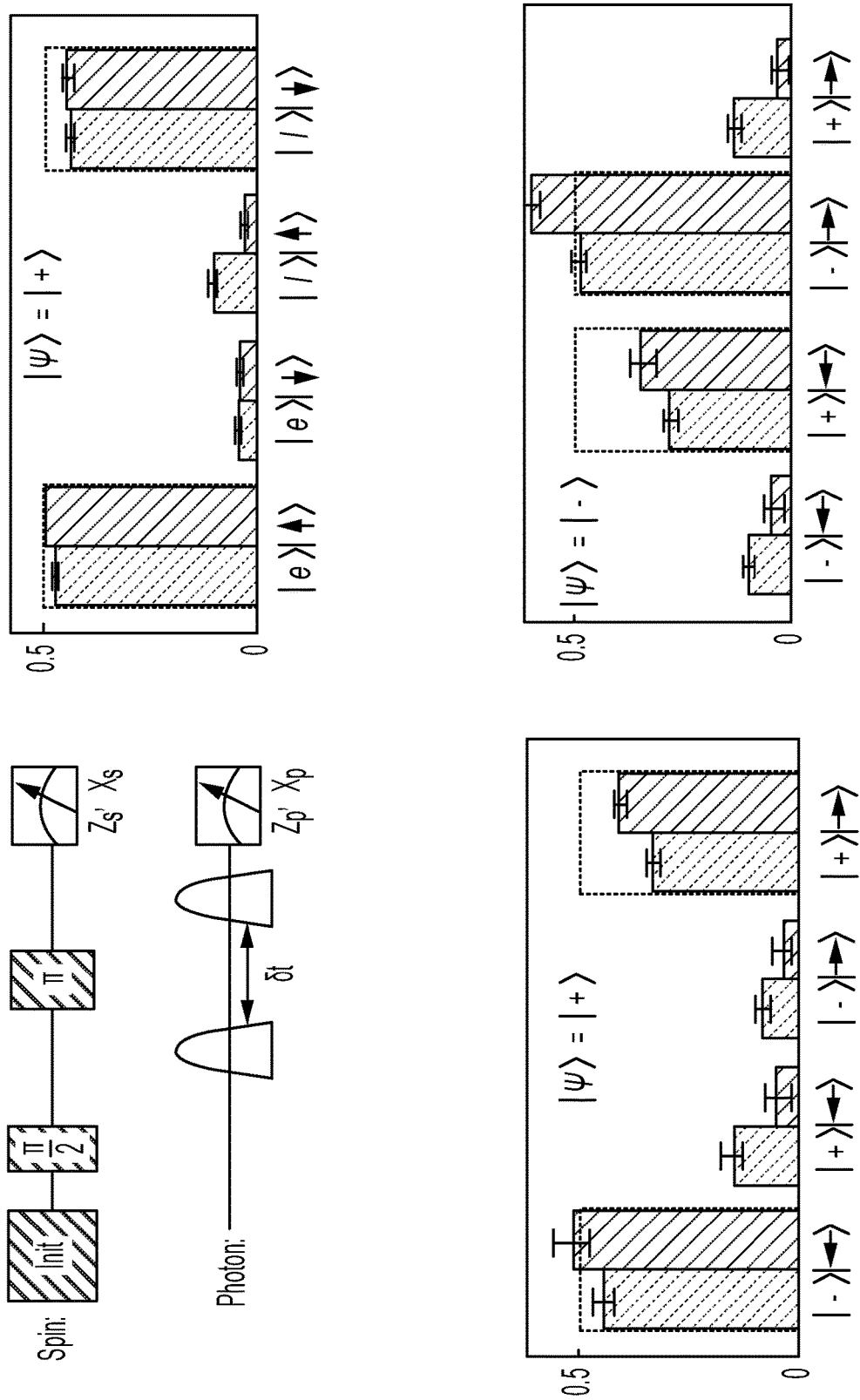
FIG. 12 shows schematics of example sequences for generating and verifying spin-photon entanglement, spin-photon correlations measured in the Z-Z basis, spin-photon correlations measured in the X-X basis, and preparation of second spin-photon Bell state, according to some embodiments of the present disclosure.

FIG. 12 panel (a) is a schematic showing an example sequence for generating and verifying spin-photon entanglement, according to some embodiments of the present disclosure. In some embodiments, a time-bin encoded qubit can be utilized. A time-bin encoded qubit can refer to a particular type of photonic qubit in which information is stored in the arrival time of the photon. A time-bin encoded qubit is reflected by the cavity, and both the SiV and the photonic qubits are measured in the Z and X bases. FIG. 12 panel (b) is a plot of spin-photon correlations measured in the Z-Z basis, according to some embodiments of the present disclosure. Light (dark) bars are before (after) correcting for known readout error associated with single-shot readout of the SiV. FIG. 12 panel (c) is a plot of spin-photon correlations measured in the X-X basis, according to some embodiments of the present disclosure. Bell-state preparation fidelity of F≥0.89(3) and a concurrence C≥0.72(7). FIG. 12 panel (d) is a plot showing preparation of second spin-photon Bell state, according to some embodiments of the present disclosure. Changing the phase of the incoming photonic qubit prepares a Bell-state with inverted statistics in the X basis.

1.8.1. Generating Time-Bin Qubits

In some embodiments, time-bin encoding can be chosen for photonic qubits. One straightforward possibility is to use the Fock state of the photon. However, it can be challenging to perform rotations on a Fock state, and photon loss results in an error in the computational basis. Another possibility is to use the polarization degree of freedom. While the SiV spin-photon interface is not polarization selective (both spin states couple to photons of the same polarization), one could consider polarization based spin-photon entangling schemes already demonstrated in nanophotonic systems. However, this can involve embedding the nanostructure inside of a stabilized interferometer, which has a number of challenges. In addition, it can involve careful fabrication of over-coupled, single-sided cavities (unlike the critically coupled diamond nanocavities). As such, time-bin encoding can be a natural choice given the critically coupled SiV-cavity interface described here.

These qubits are generated by passing a weak coherent laser though a cascaded AOM, amplitude-EOM, and phase-EOM. The time-bins are shaped by an AWG-generated pulse on the amplitude-EOM and chosen to be much narrower than the delay 6t between time bins. One can choose to prepare arbitrary initial photonic states by using the phase-EOM to imprint an optional phase shift to the second bin of the photonic qubit. In some embodiments, one can use a laser with Poissonian photon number statistics and set the average photon number $<n_{ph}>=0.008<<1$ using the AOM to avoid events where two photons are incident on the cavity.

Using this encoding, measurements in a rotated basis (X-basis) can become straightforward. One can send the time-bin qubit into an actively stabilized, unbalanced, fiber-based, Mach-Zender interferometer, where one arm passes through a delay line of time δt. With 25% probability, |e> enters the long arm of the interferometer and |l> enters the short arm, and the two time bins interfere at the output. Depending on the relative phase between the two bins, this will be detected on one of the two arms of the interferometer output [FIG. 7 panel (b)], corresponding to a measurement in the X basis of |±>.

1.8.2. Spin-Photon Bell States

One can prepare and verify the generation of maximally entangled Bell states between the SiV and a photonic qubit using the example sequence depicted in FIG. 12 panel (a). First, the SiV is initialized into a superposition state |→⟩ =1/√2(|↑⟩ +|↓⟩ ). Then photons at frequency $f_Q$ are sent to the cavity, corresponding to an incoming photon state |+⟩ =1/√2(|e⟩ +|l⟩ ), conditioned on the eventual detection of one photon during the example run. Before any interactions, this state can be written as an equal superposition: $\Psi_0$=|→⟩ ⊗|+⟩ =½(|e↑⟩+|e↓⟩+|l↑⟩ +|l↓⟩ ). The first time bin is reflected from the cavity if the SiV is in state |↑>, effectively carving out |e↓> in reflection. A π-pulse on the SiV transforms the resulting state to $\Psi_1$=1/√3(|e↓⟩ +|l↓⟩ +|l↑⟩ ). Finally, reflection of the late time-bin off of the cavity carves out the state |l↓)>, leaving a final entangled state $\Psi_2$=1/√2(|e↓⟩ +|l↑⟩ ). To characterize the resulting state, one can perform tomography on both qubits in the Z and X bases [FIG. 12 panel (a)].

In order to enable high-bandwidth operation and reduce the requirements for laser and interferometric stabilization in generating and measuring time-bin qubits, it can be generally beneficial to set δt as small as possible. The minimum δt is determined by two factors. First, it's useful for each pulse to be broad enough in the time-domain (narrow enough in the frequency domain) so that it does not distort upon reflection off of the device. From FIG. 9 panel (d), the reflection spectrum is roughly constant over a ~100 MHz range, implying that ~ nanosecond pulses are sufficient. The second consideration is that a microwave π-pulse can be placed between the two pulses. In some embodiments, one can drive fast (12 ns) π-pulses. As such, one can set δt=30 ns and use 5 ns optical pulses to satisfy these criteria.

1.8.3. Spin-Photon Entanglement Measurements

In some embodiments, for Z-basis measurements, photons reflected from the cavity are sent directly to a SPCM and the time-of-arrival of the time-bin qubit is recorded. Afterwards, the SiV is read out in the Z-basis. Single-shot readout is calibrated via a separate measurement where the two spin-states are prepared via optical pumping and readout, and the fidelity of correctly determining the |↑⟩(|↓⟩) state is $F_\uparrow=0.85$ ($F_\downarrow=0.84$), limited by the large 0 component of the geometric distribution which governs photon statistics for spin-flip systems. In other words, since one can work in a misaligned field in this example, the probability of a spin flip is high, making it somewhat likely to measure 0 photons regardless of initial spin state. Even before accounting for this known error, one can observe clear correlations between the photonic and spin qubits [FIG. 12 panel (b), light-shading]. Error bars for these correlation histograms (and the following fidelity calculations) are estimated by statistical bootstrapping, where the scattered photon histograms (post-selected on the detection of |e⟩ or |l⟩) are randomly sampled in many trials, and the variance of that ensemble is extracted.

In some embodiments, measurements in the X-basis are performed similarly. The photon is measured through an interferometer as described above, where now the detector path information is recorded for the overlapping time-bin. After a $R_y^{\pi/2}$ pulse on the SiV, the scattered photon histograms again reveal significant correlations between the '+' and '−' detectors and the SiV spin state [FIG. 12 panel (c)]. By adding a π-phase between the early and late time bins, one can prepare an orthogonal Bell state. Measured correlations of this state are flipped in the X-basis [FIG. 12 panel (d)].

In some embodiments, measurements of this Bell state in the Z- and X-bases are used to estimate a lower bound on the fidelity: $F=\langle\Psi^+|\rho|\Psi^+\rangle \geq 0.70(3)$ (F≥0.89(3) after correcting for readout errors). The resulting entangled state can be quantified by its concurrence C≥0.42(6) (C≥0.79(7) after correcting for readout errors). This high-fidelity entangled state between a photonic qubit and a quantum memory is a fundamental resource for quantum communication and quantum computing schemes, and can be used, for example, to demonstrate heralded storage of a photonic qubit into memory.

1.9. Control of SiV-$^{13}$C Register

While demonstrations of a quantum node with a single qubit is useful for some protocol, nodes with several interacting qubits enable a wider range of applications, including quantum repeaters. In some embodiments, one can introduce additional qubits based on $^{13}$C naturally occurring in diamond.

1.9.1. Coupling Between the SiV and Several $^{13}$C

Figure 13:
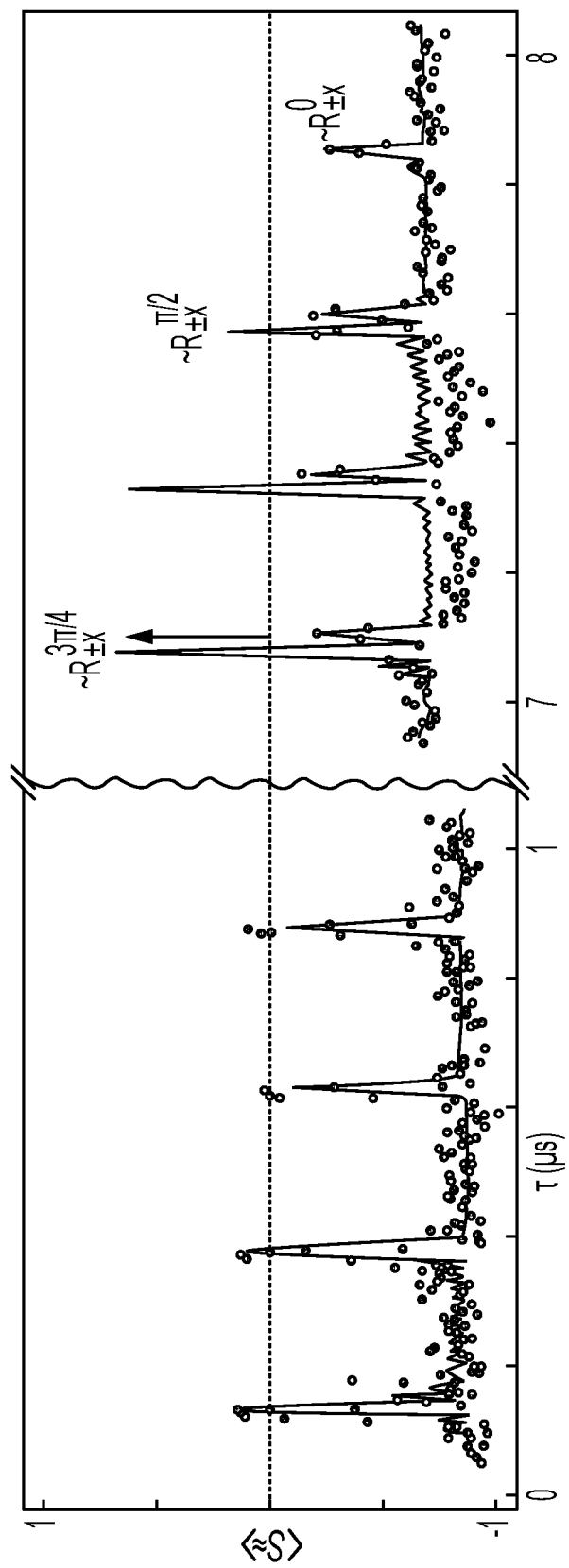
FIG. 13 shows schematics of XY8-2 spin echo, trajectory of $^{13}C$ on the Bloch sphere during a maximally entangling gate, maximally entangling gates, tuning up an initialization gate, nuclear Ramsey measurement, electron-nuclear correlations measured in the ZZ-basis, and electron-nuclear correlations measured in the XX-basis, according to some embodiments of the present disclosure.
Figure 13:
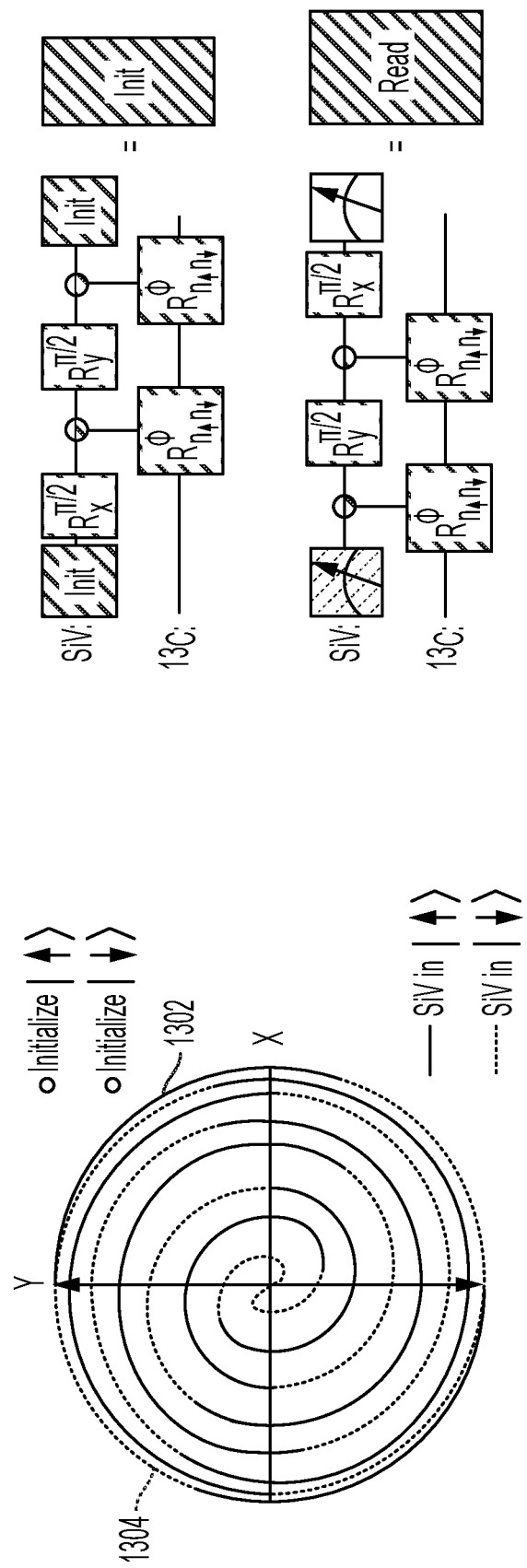
Figure 13:
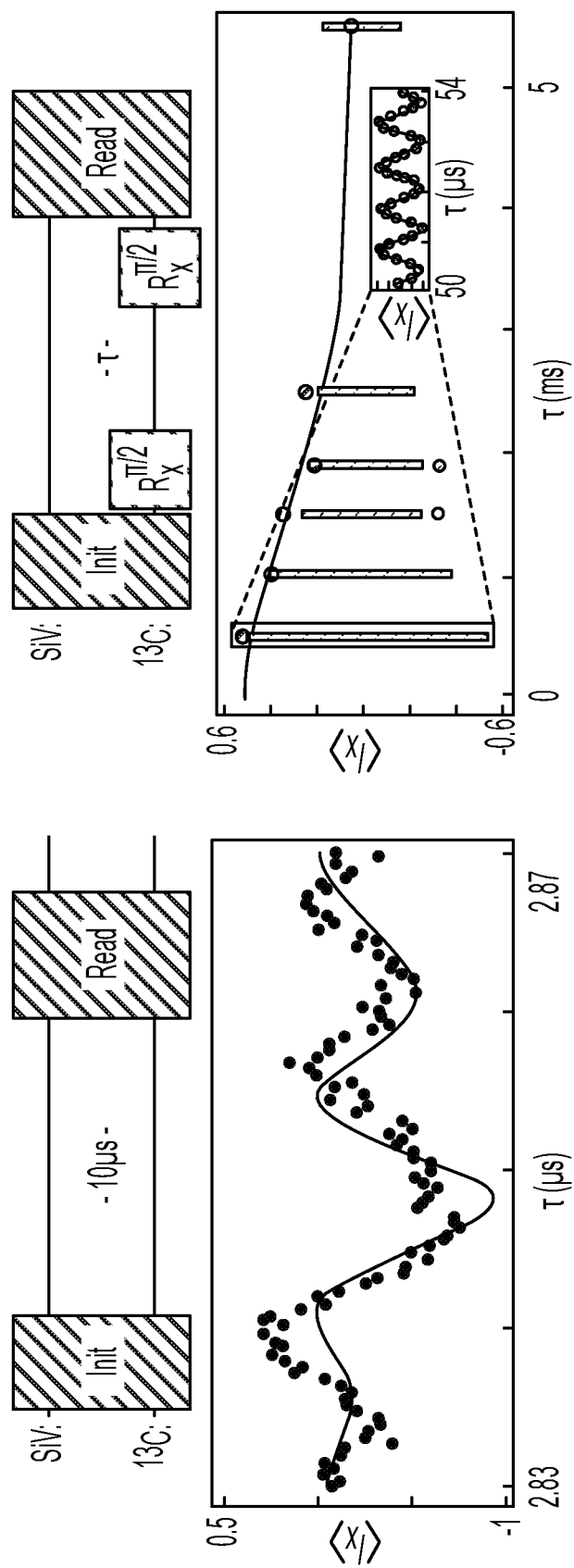
Figure 13:
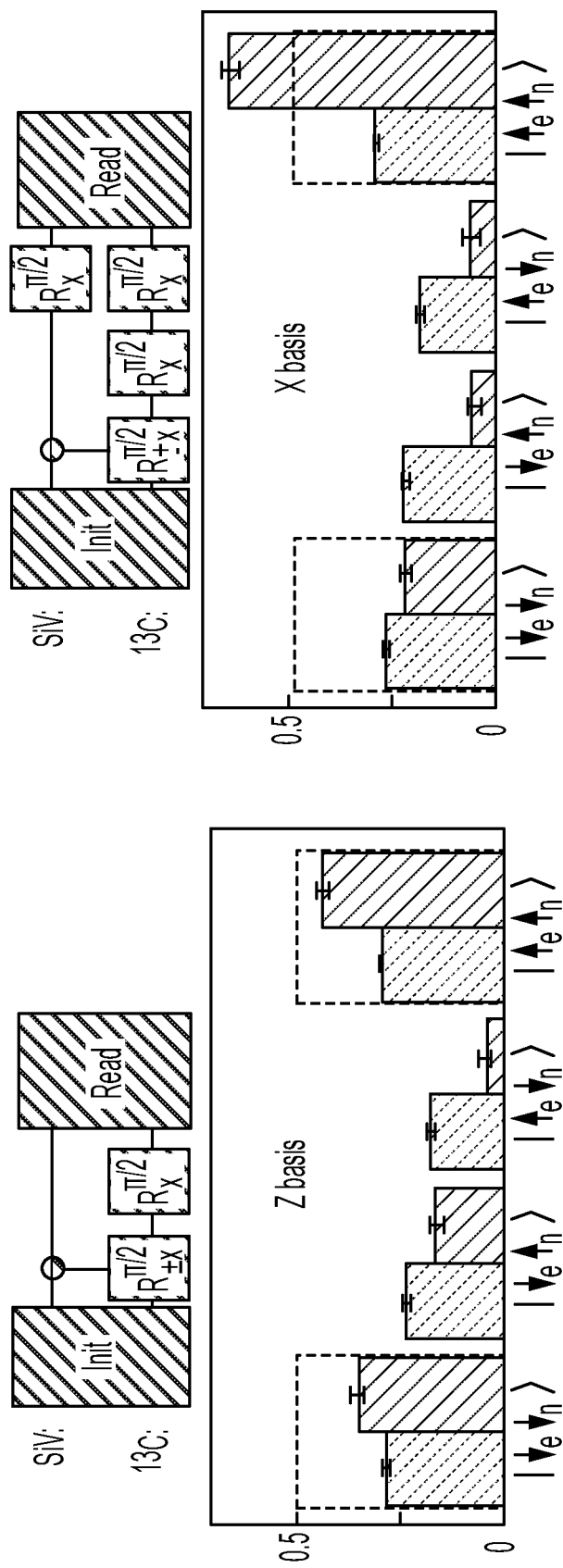

FIG. 13 panel (a) is a plot of XY8-2 spin echo sequence reveals coupling to nuclear spins, according to some embodiments of the present disclosure. The left panel shows collapses $\langle S_x \rangle = 0$ at short times indicate coupling to many nuclei. The right panel shows collapses $\langle S_x \rangle \neq 0$ at long times indicate conditional gates on a single nuclear spin. FIG. 13 panel (b) is a schematic showing trajectory of $^{13}$C on the Bloch sphere during a maximally entangling gate, according to some embodiments of the present disclosure. Lines 1302 (1304) correspond to the SiV initially prepared in state |↑⟩(|↓⟩); transitions from solid to dashed lines represent flips of the SiV electronic spin during the gate. FIG. 13 panel (c) is a schematic showing maximally entangling gates of the form $$R^{\phi}_{\underline{n\uparrow,n\downarrow}}$$

are used to initialize and readout the two-qubit register, according to some embodiments of the present disclosure. FIG. 13 panel (d) is a schematic showing tuning up an initialization gate, according to some embodiments of the present disclosure. Inter-pulse spacing τ for Init and Read gates are swept to maximize polarization. Solid line is the modeled pulse sequence using the hyperfine parameters extracted from panel (a). FIG. 13 panel (e) is a schematic showing nuclear Ramsey measurement, according to some embodiments of the present disclosure. Driving the $^{13}$C using composite gates on the SiV reveals $T_{2*}=2.2$ ms. Orange points in the inset are coherent oscillations of the Ramsey signal due to hyperfine coupling to the SiV. FIG. 13 panel (f) is a schematic showing electron-nuclear correlations measured in the ZZ-basis, according to some embodiments of the present disclosure. Light (dark) bars are before (after) correcting for known errors associated with reading out the SiV and $^{13}$C. FIG. 13 panel (g) is a schematic showing electron-nuclear correlations measured in the XX-basis. It is estimated a Bell state preparation fidelity of F≥0.59(4) and a concurrence C≥0.22(9).

In some embodiments, one can observe collapses in the echo signal corresponding to entanglement with nearby nuclear spins [FIG. 13 panel (a)]. As the diamond used in some exemplary embodiments has 1% $^{13}$C, one can typically observe several such nuclei, with all of their resonances overlapping due to their second-order sensitivity to hyperfine coupling parameters. Consequently, during a spin echo sequence the SiV entangles with many nuclei, quickly losing coherence and resulting in a collapse to $\langle S_z \rangle = 0$ [FIG. 13 panel (a), left side]. If single $^{13}$C can be addressed however, this entanglement results in coherent population transfer and echo collapses which can, in some cases, completely flip the SiV spin state ($\langle S_z \rangle = \pm 1$). This entanglement forms the basis for quantum gates [FIG. 13 panel (a), right side]. These gates can be tuned by changing the alignment of $B_{ext}$ with respect to the hyperfine coupling tensor, or by using different timings. In some embodiments, as a result of the complicated nuclear bath for this device, a majority of field orientations and amplitudes show collapses to $\langle S_z \rangle = 0$. The highest fidelity nuclear gates demonstrated here are based on echo resonances with the largest contrast which, crucially, were not commensurate with an aligned field. Thus, in this device, single $^{13}$C could be isolated at the cost of lower SSR fidelity.

1.9.2. Initializing the Nuclear Spin

Once a single nuclear spin is identified, resonances in spin-echo form the building block for quantum gates. For example, a complete flip of the SiV is the result of the nuclear spin rotating by n conditionally around the axes±X ($R_{\pm x, SiV-C}^\pi$), depending on the state of the SiV. One can vary the rotation angle of this pulse by choosing different spacings τ between pulses [FIG. 13 panel (a)], or by using different numbers of n-pulses. In some embodiments, one can find a maximally entangling gate ($R_{\pm x, SiV-C}^{\pi/2}$) by applying N=8 π-pulses separated by 2τ=2×2.859 μs. This can be visualized on the Bloch sphere in FIG. 13 panel (b), where the state of the SiV (1302 or 1304) induces different rotations of the $^{13}$C.

In some embodiments, a similarly constructed entangling gate $$R^{\phi}_{n\uparrow,n\downarrow},$$

can be used to coherently map population from the SiV onto the nuclear spin or map population from the nuclear spin onto the SiV [FIG. 13 panel (c)]. The fidelity of these gates is estimated by polarizing the SiV, mapping the population onto the $^{13}$C, and waiting for T>>$T_{2*}$ (allowing coherence to decay) before mapping the population back and reading out [FIG. 13 panel (d)]. In some embodiments, it is found that one can recover 80% of the population in this way, giving us an estimated initialization and readout fidelity of F=0.9.

Based on the contrast of resonances in spin-echo (also 0.9), this can be limited by entanglement with other nearby $^{13}$C for this emitter, as well as other choices for τ and N. In some embodiments, coupling to other $^{13}$C results in population leaking out of the two-qubit register, and can be improved by increasing sensitivity to single $^{13}$C, or by looking for a different emitter with a different $^{13}$C distribution. The misaligned external field further results in slight misalignment of the nuclear rotation axis and angle of rotation and can be improved by employing adapted control sequences to correct for these errors.

1.9.3. Microwave Control of Nuclear Spins

As demonstrated above, control of the $^{13}$C via composite pulse sequences on the SiV is also possible. A maximally entangling gate has already been demonstrated and used to initialize the $^{13}$C, so in order to build a universal set of gates, in some embodiments all one requires are unconditional single-qubit rotations. This can be done where unconditional nuclear rotations occur in spin-echo sequences when the inter-pulse spacing τ is halfway between two collapses. For the following gates, one can use an unconditional π/2-pulse composed of 8 π-pulses separated by τ=0.731 μs.

Figure 14:
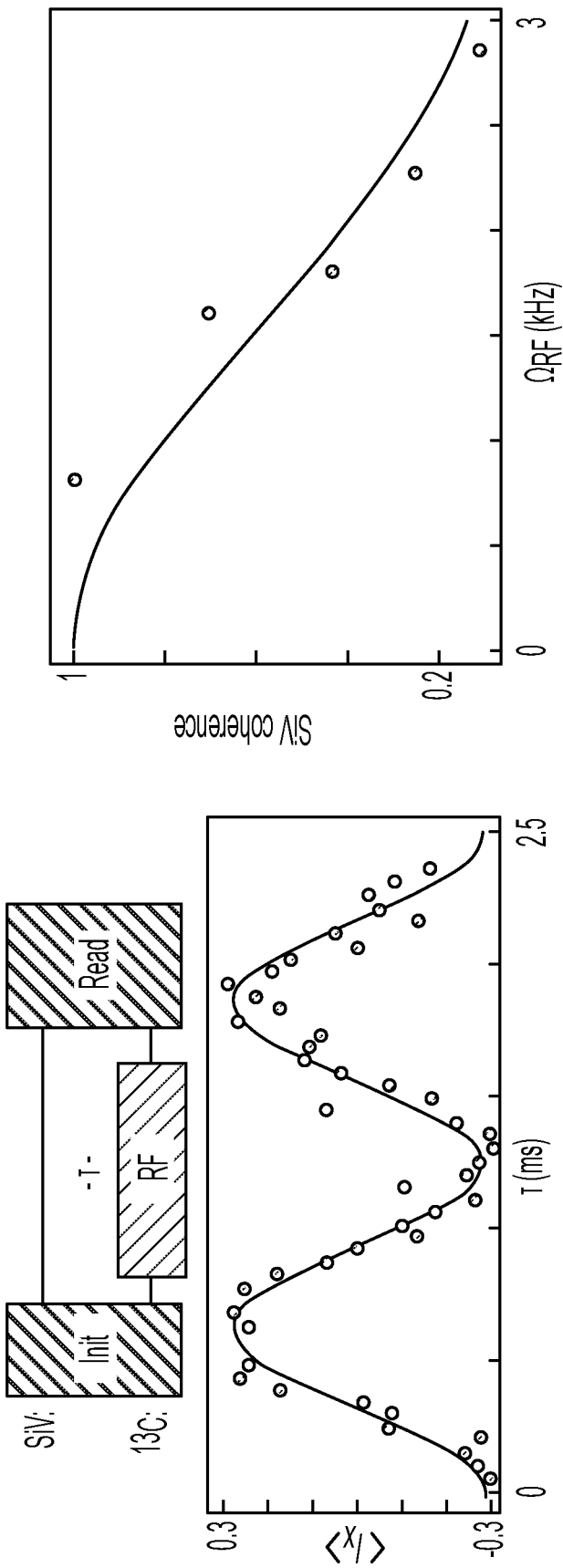
FIG. 14 shows a schematic of RF Rabi oscillations, and SiV coherence in the presence of an RF drive, according to some embodiments of the present disclosure.

FIG. 14 panel (a) is a schematic showing RF Rabi oscillations, according to some embodiments of the present disclosure. In some embodiments, applying an RF tone can directly drive nuclear rotations of a coupled $^{13}$C. FIG. 14 panel (b) is a plot showing SiV coherence in the presence of an RF drive, according to some embodiments of the present disclosure. As the strength of the RF drive is increased, local heating from the CPW reduces the SiV $T_2$.

In some embodiments, one can use this gate to probe the coherence time $T_2^*$ of the $^{13}$C. After mapping population onto the nuclear spin, the SiV is re-initiated, and then used to perform unconditional π/2-rotations on the $^{13}$C [FIG. 13 panel (d)]. Oscillations in the signal demonstrate Larmor precession of the nucleus at a frequency determined by a combination of the external field as well as $^{13}$C-specific hyperfine interactions, which are seen as the data points in FIG. 13 panel (d). The envelope is calculated by fitting the oscillations and extracting their amplitude. The decay of this envelope $T_2^*$=2.2 ms shows that the $^{13}$C has an exceptional quantum memory, even in the absence of any dynamical decoupling.

In some embodiments, one can characterize the fidelity of the conditional and unconditional nuclear gates by generating and reading out Bell states between the SiV and $^{13}$C. First, one can initialize the 2-qubit register into one of the 4 eigen-states: $\{|e\uparrow N\rangle, |e\uparrow N\rangle, |e\downarrow N\rangle, |e\downarrow N\rangle\}$, then perform a π/2-pulse on the electron to prepare a superposition state. Afterward, a CNOT gate, comprised of an unconditional π/2 pulse followed by a maximally entangling gate, prepares one of the Bell states $|\Psi_{\pm}\rangle$, $|\Phi_{\pm}\rangle$ depending on the initial state [FIG. 13 panels (e) and (f)]. in some embodiments, one can get an error corrected fidelity of F≥0.59(4) and C≥0.22(9), primarily limited by the inability to initialize the $^{13}$C.

1.9.4. Radio-Frequency Driving of Nuclear Spins

The previous section demonstrated a CNOT gate between SiV and $^{13}$C using composite MW pulses. This approach can have several drawbacks. First, the gate fidelity is limited by difficulties to finely tune the rotation angle of the maximally entangled gate which cannot be done in a continuous fashion [FIG. 13 panel (a)]. Second, in some embodiments, this gate requires a specific number of MW pulses and delays between them, making the gate duration (~50 μs in this work) comparable to the SiV coherence time. Finally, this scheme relies on a second order splitting of individual $^{13}$C resonances to resolve individual ones; residual coupling to additional $^{13}$C limits the fidelity for a pulse sequence of given total length.

In some embodiments, direct RF control can provide be a simple way to make a fast and high-fidelity CNOT gate since it doesn't always require a single RF π-pulse on a nuclear spin transition. Furthermore, since the nuclear spin transition frequencies depend on the hyperfine coupling to leading order, these pulses could have higher $^{13}$C selectivity and in some embodiments shorter gate duration.

In some embodiments, one can use the RF port inside the DR to apply RF pulses resonant with nuclear spin transitions. FIG. 13 panel (a) shows RF Rabi oscillations of the nuclear spin. Since the $^{13}$C gyromagnetic ratio is about 3 orders of magnitude smaller compared to the SiV spin, RF driving is much less efficient than MW one and can use much more power. To identify characteristics of local heating of the SiV one can measured the SiV spin coherence contrast in spin-echo sequence right after applying off-resonant RF pulse of 100 μs at different power (calibrated via RF rabi oscillations) [FIG. 13 panel (b)]. Unfortunately, Even modest Rabi frequencies ($\Omega_{RF}$~1 kHz) result in 20% loss in SiV coherence. Replacing the gold CPW used in this work by superconducting ones may solve heating issue and make RF driving practically useful.

The SiV center in diamond has rapidly become a leading candidate to serve as the building block of a quantum network. Embodiments of the present disclosure describes the underlying technical procedures and example parameter regimes for utilizing the SiV-nanocavity system as a quantum network node. For example, the present disclosure describes the effect of static and dynamic strain on the properties of the SiV spin qubit and its optical interface, with direct application to quantum networking applications. The present disclosure demonstrates techniques for coherently controlling and interfacing SiV spin qubits inside of nanophotonic structures at millikelvin temperatures to optical photons. The present disclosure identifies and coherently controls auxiliary nuclear spins, forming a nanophotonic two-qubit register.

Embodiments of the present disclosure illustrates the path towards the realization of a first-generation quantum repeater based on SiV centers inside diamond nanodevices. In some embodiments, a key ingredient enabling large-scale applications involving several solid-state SiV-nanocavity nodes can be the incorporation of strain tuning onto each device. Precise tuning of both the static and dynamic strain can overcome the limitations of inhomogeneous broadening and spectral diffusion and enable scalable fabrication of quantum repeater nodes.

1.10. Nanophotonic Cavity Design

In some embodiments, one can simulate and optimize the nanophotonic structures to maximize atom-photon interactions while maintaining high waveguide coupling, which can provide good collection efficiency for the devices. For example, this may involve optimizing the device quality-factor to mode volume ratio, the relative rates of scattering into waveguide modes, and the size and shape of the optical mode. Each of these quantities are considered in a three-step simulation process (FDTD, Lumerical®). In some embodiments, one can first perform a coarse parameter sweep over all possible unit cells which define the photonic crystal geometry and identify families of bandgap-generating structures. These structures are the starting point for a gradient ascent optimization procedure, which results in generating high quality-factor, low mode volume resonators. Finally, the generated designs are modified to provide efficient resonator-waveguide coupling.

Figure 15:
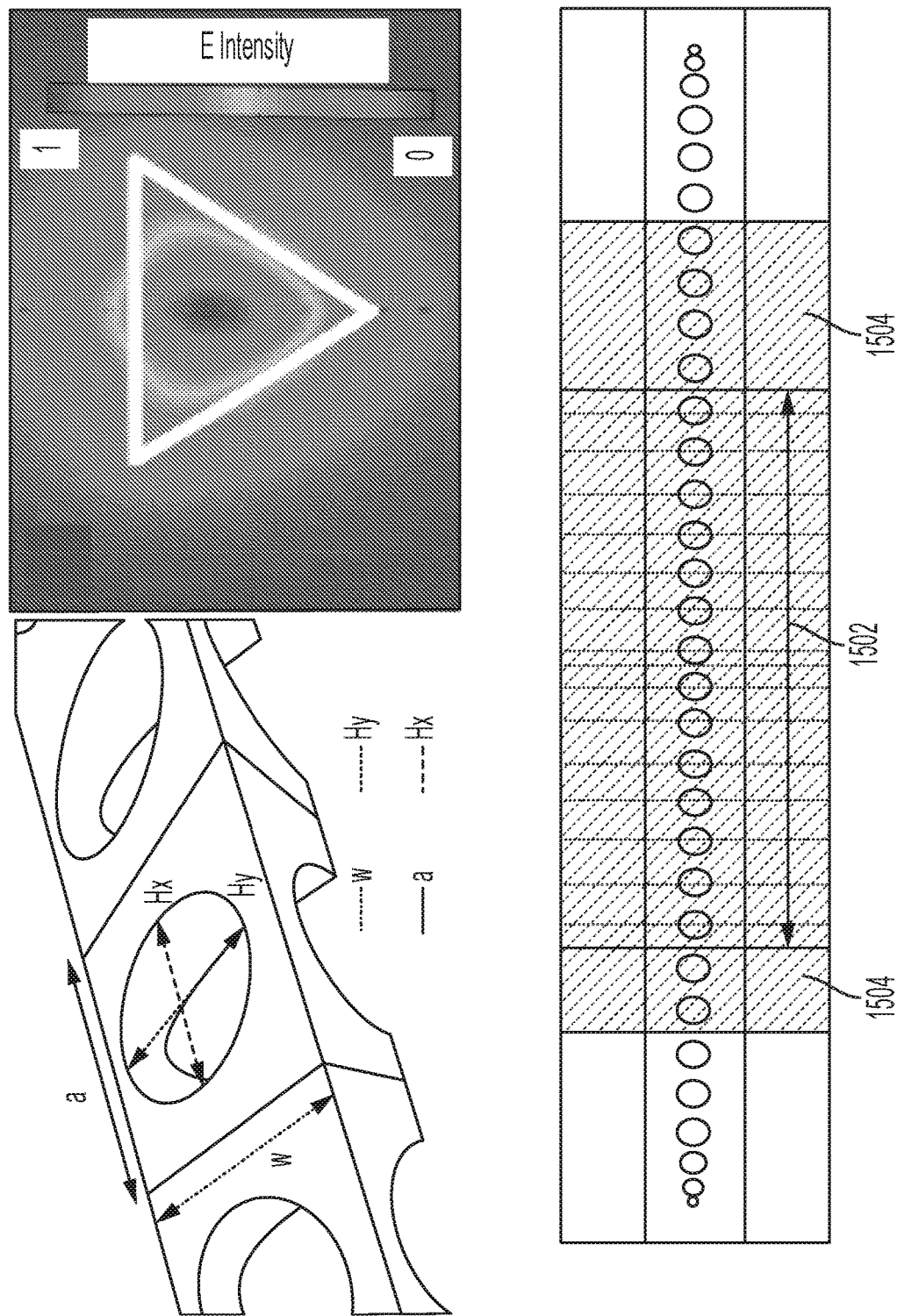
FIG. 15 shows schematics of unit cell of a photonic crystal cavity, electric field intensity profile of the TE mode inside the cavity, a photonic crystal design, and a plot of a, $H_x$, and $H_y$ for the cavity, according to some embodiments of the present disclosure.
Figure 15:
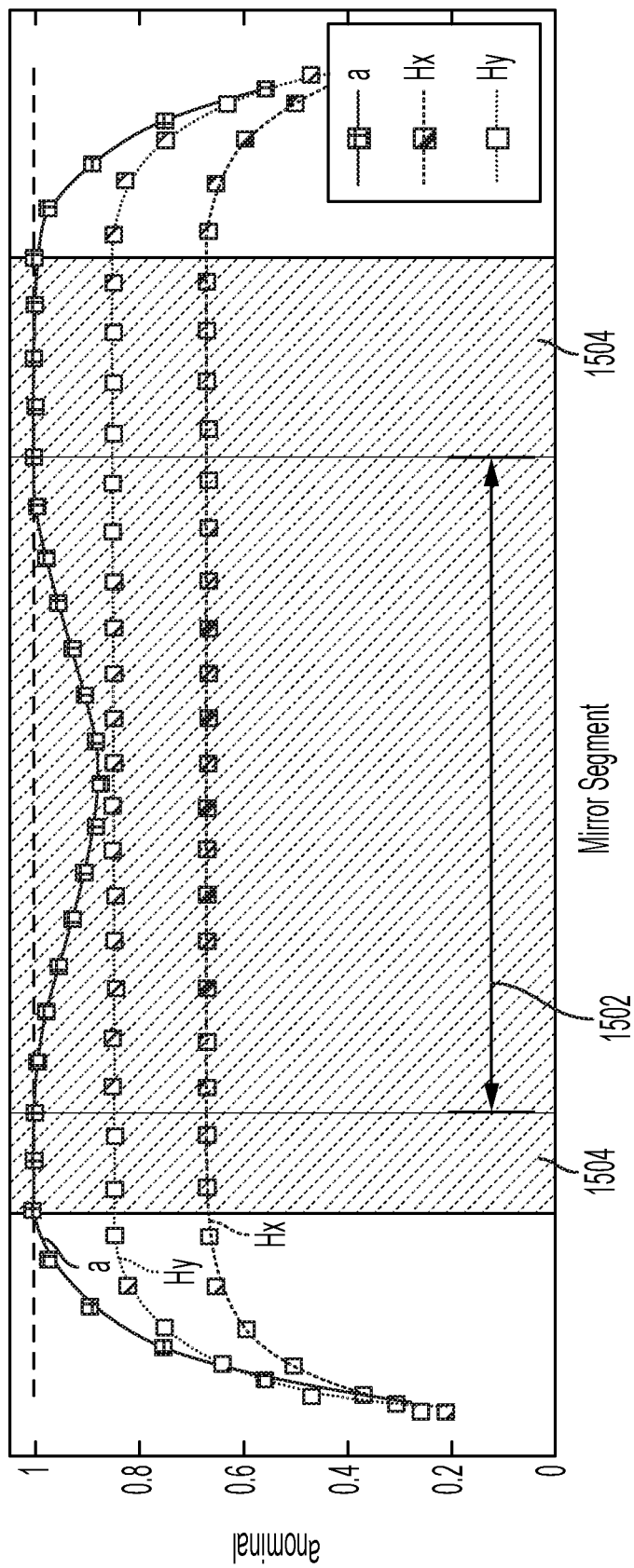

FIG. 15 panel (a) is a schematic showing a unit cell of a photonic crystal cavity (bounded by black lines), according to some embodiments of the present disclosure. $H_z$ and $H_y$ define the size and aspect ratio of the hole, a determines the lattice constant, and w sets the waveguide width. FIG. 15 panel (b) is a plot showing electric field intensity profile of the TE mode inside the cavity, indicating strong confinement of the optical mode inside the waveguide, according to some embodiments of the present disclosure. FIG. 15 panel (c) is a schematic of photonic crystal design, according to some embodiments of the present disclosure. Shaded region 1504 is the bandgap generating structure, shaded region 1502 represents the cavity structure. FIG. 15 panel (d) is a plot of a, $H_x$, and $H_y$ for the cavity shown in panel (c), showing cubic taper which defines the cavity region, according to some embodiments of the present disclosure. All sizes are shown in fractions of $a_{nominal}$, the unperturbed lattice constant.

Optimization can begin by exploring the full parameter space of TE-like bandgap generating structures within the waveguide geometry. For hole-based cavities [FIG. 15 panel (a)], this sweep covers a 5-dimensional parameter space: The lattice constant of the unit cell (a), the hole size and aspect ratio (e.g., length/width $H_x$ and $H_y$), the device etch angle (θ) and the waveguide width (w). Due to the size of this parameter space, one can start by performing a low-resolution sweep over all parameters, with each potential design simulated by a single unit cell with the following boundary conditions: 4 perfectly matched layer (PML) boundary conditions in the transverse directions and 2 Bloch boundary conditions in the waveguide directions. The band structure of candidate geometries is determined by sweeping the effective k-vector of the Bloch boundary condition and identifying allowed modes. Using this technique, families of similar structures with large bandgaps near the SiV transition frequency are chosen for further simulation. In some embodiments, each candidate photonic crystal is also inspected for the position of its optical mode maximum, to ensure that it has first-order modes concentrated in the center of the diamond, where SiVs will be incorporated [FIG. 15 panel (b)].

The second step is to simulate the full photonic crystal cavity design, focused in the regions of parameter space identified in step one. This is done by selecting a fixed θ, as well as a total number of unit cells that define the structure, then modifying the bandgap of the photonic crystal with a defect region to form a cavity mode. Without wish to be bound by theory, one can define this defect using a cubic tapering of one (or several) possible parameters:

$$A(x)=1-d_{max}|2x^3-3x^2+1| \tag{11}$$

Where A is the relative scale of the target parameter(s) at a distance χ from the cavity center, and $d_{max}$ is the defect depth parameter. Photonic Crystal cavities with multi-parameter defects are difficult to reliably fabricate, therefore, devices used in this work have cavity defect geometries defined by variations in the lattice constant. Without wish to be bound by theory, the cavity generated by this defect is scored by simulating the optical spectrum and mode profile and computing the scoring function F:

$$F=\min(Q,Q_{cutoff})/(Q_{cutoff} \times V_{mode}) \tag{12}$$

Where Q is the cavity quality-factor depending on the dimensions of the cavity (i.e., a dimensionless product of the cavity frequency times the "ringdown" time). In some embodiments, the Q can be calculated in simulations using the ringdown time of the cavity, i.e. by inserting light into the cavity, and measuring how long it takes for the light to leave the cavity. In experiments, it can be measured using the linewidth of the cavity spectrum (see e.g. FIG. 9 panel (a), "bare cavity" curve). This value can be proportional to the inverse of the ringdown time. In some embodiments, $Q_{cutoff}=5 \times 10^5$ is an estimated maximum realizable Q based on fabrication constraints, and $V_{mode}$ is the cavity mode volume. Based on this criteria, one can employ a gradient ascent process over all cavity design parameters (except θ and the total number of unit cells) until F is maximized, or a maximum number of iterations has occurred. Due to the complexity and size of the parameter space, a single iteration of this gradient ascent may not always find the structure. Instead, several candidates from each family of designs found in step one are explored, with the best moving on to the final step of the simulation process. These surviving candidates can again be checked, for example to ensure confinement of the optical mode in the center of the cavity structure and to ensure that the structures fall within the tolerances of the fabrication process.

The final step in the simulation process is to modify the optimized designs to maximize resonator-waveguide coupling. This can be done by removing unit cells from the input port of the device, which decreases the overall quality-factor of the devices in exchange for better waveguide damping of the optical field. Devices are once again simulated and analyzed for the fraction of light leaving the resonator through the waveguide compared to the fraction scattering into free space. The number of unit cells on the input port is then optimized for this ratio, with simulations indicating that more than 95% of light is collected into the waveguide. In practice, fabrication defects increase the free space scattering rate, placing resonators close to the critically coupled regime. Finally, the waveguide coupling fraction is increased by appending a quadratic taper to both ends of the devices such that the optical mode is transferred adiabatically from the photonic crystal region into the diamond waveguide. This process produces the final cavity structure used for fabrication [FIG. 15 panel (c)].

1.11. Strain-Induced Frequency Fluctuations

In some embodiments, one can calculate changes the SiV spin-qubit frequency and optical transition frequency arising from strain fluctuations. Without wish to be bound by theory one can start with the Hamiltonian for SiV in an external magnetic field Bz aligned along the SiV symmetry axis:

$$H = -\lambda \underbrace{\begin{pmatrix} 0 & 0 & i & 0 \\ 0 & 0 & 0 & -i \\ -i & 0 & 0 & 0 \\ 0 & i & 0 & 0 \end{pmatrix}}_{\text{spin-orbit}} + \underbrace{\begin{pmatrix} \alpha-\beta & 0 & \gamma & 0 \\ 0 & \alpha-\beta & 0 & \gamma \\ \gamma & 0 & \beta & 0 \\ 0 & \gamma & 0 & \beta \end{pmatrix}}_{\text{strain}} + \quad (13)$$

$$q\gamma_L B_z \underbrace{\begin{pmatrix} 0 & 0 & i & 0 \\ 0 & 0 & 0 & i \\ -i & 0 & 0 & 0 \\ 0 & -i & 0 & 0 \end{pmatrix}}_{\text{orbital Zeeman}} + \frac{\gamma_S B_z}{2} \underbrace{\begin{pmatrix} 1 & 0 & 0 & 0 \\ 0 & -1 & 0 & 0 \\ 0 & 0 & 1 & 0 \\ 0 & 0 & 0 & -1 \end{pmatrix}}_{\text{spin Zeeman}}$$

where $\lambda$ is a spin-orbit coupling constant, $\gamma_L = \mu_B$ and $\gamma S = 2\mu_B$ are Landé g-factors of the orbital and spin degrees of freedom ($\mu_B$ the Bohr magneton), q=0.1 is a Ham reduction factor of the orbital momentum, and $\alpha$, $\beta$, $\gamma$ are local strain parameters which can be different for the ground and excited sates.

Without wish to be bound by theory, as measuring the exact strain parameters is challenging one can assume one non-zero component in this tensor ($\epsilon_{zx}$) in order to simplify the calculations. In this case, strain parameters are:

$$\beta = f_{g(e)} \epsilon_{zx}, \quad (14)$$

$$\alpha = \gamma = 0 \quad (15)$$

where $f_{g(e)} = 1.7 \times 10^6$ (3.4 106) GHz/strain for the ground (excited) state and the GS splitting is:

$$\Delta_{GS} = 2\sqrt{\lambda_g^2 + \beta^2}, \quad (16)$$

where $\lambda g$ 25 GHz is the SO-constant for the ground state. Next, one can solve this Hamiltonian and determine how the qubit frequency changes as a function of relative strain fluctuations ($\xi$):

$$\Delta f_{MW} = \frac{2(f_g \epsilon_{zx})^2 \lambda_g B_z q\gamma_L}{\left((f_g \epsilon_{zx})^2 + \lambda_g^2\right)^{3/2}} \xi. \quad (17)$$

The corresponding change in the optical frequency is:

$$\Delta f_{optical} = \left( \frac{(f_g \epsilon_{zx})^2}{\sqrt{(f_g \epsilon_{zx})^2 + \lambda_g^2}} - \frac{(f_g \epsilon_{zx})^2}{\sqrt{(f_g \epsilon_{zx})^2 + \lambda_e^2}} \right) \xi, \quad (18)$$

where $\lambda e \approx 125$ GHz is the SO-constant for the excited state.

In some embodiments, for SiV 2 one can get $\Delta_{GS} = 140$ GHz and find $\epsilon_{zx} = 3.8 \times 10^{-5}$. With $\xi = 1\%$ strain fluctuations (corresponding to $10^{-7}$ strain), frequencies change by $\Delta f_{MW} \approx 4$ MHz and $\Delta f_{optical} \approx -300$ MHz. This quantitatively agrees with the data presented in [FIG. 8 panel (f)].

1.12. Mitigating Spectral Diffusion

In some embodiments, in order to couple SiV centers to a quantum network, electronic transitions can be stabilized with respect to a probe laser. Such spectral diffusion can be a challenge for solid-state quantum systems. In the case of the SiV center, spectral diffusion can be seen explicitly in FIG. 16 panel (a), where the optical transition frequency can either drift slowly (central region) or undergo large spectral jumps. As this diffusion can be larger than the SiV linewidth, any given instance of an example use could have the probe laser completely detuned from the atomic transition, resulting in failed operation.

There are several possible solutions to mitigate this spectrum diffusion. First, exploiting a high-cooperativity interface, one can Purcell-broaden the optical linewidth to exceed the spectral diffusion. Second, a high collection efficiency can be used to read out the optical position faster than the spectral diffusion. The frequency can then be probabilistically stabilized by applying a short laser pulse at 520 nm which dramatically speeds up the timescale of spectral diffusion [FIG. 16 panel (b)]. Alternatively, this signal could be used to actively stabilize the line using strain-tuning. From the observations in FIG. 6 panel (f), this technique should mitigate spectral diffusion of both the optical and spin transitions. Strain tuning also offers the capability to control the DC strain value, which has effects on qubit properties as discussed previously, and enables tuning multiple SiV centers to a common network operation frequency. As such, this tunability is desirable for quantum networking technologies based on SiV centers.

The severity of spectral diffusion is different for different emitters however, and this control is not always required. For SiV 1, the main SiV used in the following sections, one can find almost no spectral diffusion, with optical transitions stable over many minutes [FIG. 16 panel (c)]. This is an example configuration, as some applications can be implemented without any need to verify the optical line position.

FIG. 16 panel (a) is a plot of spectral diffusion of SiV 2, according to some embodiments of the present disclosure. In some embodiments, one can observe slow spectral wandering as well as spectral jumps. FIG. 16 panel (b) shows applying a short green repumping pulse before every measurement significantly speeds up the timescale for spectral diffusion, according to some embodiments of the present disclosure. FIG. 16 panel (c) is a plot of spectral diffusion of SiV 1 in nanostructures, according to some embodiments of the present disclosure. Line is stable to below 100 MHz over many minutes. Scale bar indicates normalized SiV reflection signal.

1.13. Model for SiV Decoherence

The scaling of $T_2$ (N) $N^{2/3}$ is identical to that found for nitrogen-vacancy centers, where it is assumed that $T_2$ is limited by a fluctuating electron spin bath Motivated by DEER measurements with SiV 2, one can estimate the noise bath observed by SiV 1.

Without wish to be bound by theory, the measured coherence decay is modeled by:

$$\langle S_z \rangle = \mathrm{Exp}(-\int dw\, S(\omega)\, \mathcal{F}_N(t,\omega)), \quad (19)$$

where $S(\omega)$ is the noise power-spectrum of the bath, and $F_N(t, \omega) = 2\sin(\omega t/2)(1\,\sec(\omega t/2N))^2/\omega^2$ is filter function for a dynamical-decoupling sequence with an even number of pulses. One can fit successive $T_2$ echo curves to the functional form $A + Be^{-(t/T2)\beta}$, with A, B being free parameters associated with photon count rates, and $\beta = 3$ providing the best fit to the data. This value of $\beta$ implies a decoherence bath with a Lorentzian noise power-spectrum, $S(\omega, b, \tau) = b2\tau/\pi\, 1/(1+\omega^2\tau^2)$, where b is a parameter corresponding to the strength of the noise bath, and T is a parameter corresponding to the correlation time of the noise.

Empirically, no one set of noise parameters faithfully reproduces the data for all measured echo sequences. Adding a second source of dephasing $\tilde{S} = S(\omega, b_1, \tau_1) + S(\omega, b_2, \tau_2)$, gives reasonable agreement with the data using parameters $b_1 = 5$ kHz, $\tau_1 = 1$ μs, $b_2 = 180$ kHz, $\tau_2 = 1$ ms [FIG. 11 panel (d)]. The two drastically different set of noise parameters for each of the sources can help illuminate the source of noise in the devices.

As explained in the previous section, one candidate for this decoherence can be a bath of free electrons arising from improper surface termination or local damage caused during nanofabrication, which are known to have correlation times in the µs range. The SiV studied in this analysis is approximately equidistant from three surfaces: the two nearest holes which define the nanophotonic cavity, and the top surface of the nanobeam, all of which are approximately 50 nm away. One can estimate a density of $\sigma_{surf}$=0.067 spins/nm2 using:

$$b_1 = \gamma_{SiV} \langle B_{surf} \rangle = \frac{g^2 \mu^2 B^{\mu_0}}{\hbar} \frac{1}{4\pi \sum d_i^2} \sqrt{\frac{\pi}{4\sigma_{surf}}} \quad (20)$$

where $b_1$ is the measured strength of the noise bath, g is the electron gyromagnetic ratio, and $d_i$ are the distances to the nearest surfaces. This observation is consistent with surface spin densities measured using NVs.

The longer correlation time for the second noise term suggests a different bath, possibly arising from free electron spins inside the bulk diamond. Vacancy clusters, which can persist under annealing even at 1200 C, are known to possess g=2 electron spins, and are one possible candidate for this noise bath. Integrating over d in Eqn. 20, one can estimate the density of spins that can be used to achieve the measured $b_2$. One can estimate $\rho_{bulk}$~0.53 spins per nm³, which corresponds to a doping of 3 ppm. Interestingly, this is nearly identical to the local concentration of silicon incorporated during implantation (most of which is not successfully converted into negatively charged SiV) and could imply implantation-related damage as a possible source of these impurities.

Another possible explanation for this slower bath could be coupling to nuclear spins in the environment. The diamond used in this example has a natural abundance of ¹³C, a spin-½ isotope, in concentrations of approximately 1.1%. Replacing $\mu_B \to \mu_N$ in the term for (B) gives an estimated nuclear spin density of $\rho$(bulk,N)=0.6%, a factor of two different than the expected nuclear spin density.

1.14. Concurrence and Fidelity Calculations 1.14.1. Spin-Photon Concurrence and Fidelity Calculations From correlations in the Z- and X-bases, one can estimate a lower bound for the entanglement in the system. Without wish to be bound by theory, the density matrix of the system conditioned on the detection of one photon can be described as:

$$\rho zz = 1/2 \begin{pmatrix} p_{e\uparrow} & 0 & 0 & 0 \\ 0 & p_{e\downarrow} & c_{e\downarrow,l\uparrow} & 0 \\ 0 & c_{e\downarrow,l\uparrow}^\dagger & p_{l\uparrow} & 0 \\ 0 & 0 & 0 & p_{l\downarrow} \end{pmatrix} \quad (21)$$

where $p_{ij}$ are the probabilities of measuring a photon in state i, and the spin in state j. $c_e\downarrow,l\uparrow$ represents entanglement between $p_{e\downarrow}$ and $p_{l\uparrow}$. One can set all other coherence terms to zero, as they represent negligibly small errors in the system (for example, $c_{e\uparrow,e\downarrow}$>0 can imply that the SiV was not initialized properly at the start of the measurement). Without wish to be bound by theory, one can quantify the degree of entanglement in the system by its concurrence $\mathcal{C}$, which is 0 for separable states, and 1 for a maximally entangled state:

$$C = Max\left(0, \lambda_0^{1/2} - \sum_{i=1}^{N} \lambda_i^{1/2}\right) \quad (22)$$

where $\lambda_i$ are the eigenvalues of the matrix pzz·($\sigma_y$·pzz·$\sigma_y^\dagger$), and $\sigma_y$ is the standard Pauli matrix acting on each qubit basis separately ($\sigma_y = \sigma_{y,ph} \otimes \sigma_{y,el}$). While this can be solved exactly, the resulting equation is complicated. Without wish to be bound by theory, taking the first-order terms, this can be simplified to put a lower bound on the concurrence:

$$C \geq 2(|c_{e\downarrow,l\uparrow}| - \sqrt{p_{e\uparrow}p_{l\downarrow}}) \quad (23)$$

One can measure p directly in the Z basis, and estimate $|c_{e\downarrow,l\uparrow}|$ by performing measurements in the X basis. A $\pi/2$-rotation on both the photon and spin qubits rotates:

$|e\rangle \to 1/\sqrt{2}(|e\rangle + |l\rangle), |l\rangle \to 1/\sqrt{2}(|e\rangle - |l\rangle)$ $|\downarrow\rangle \to 1/\sqrt{2}(|\downarrow\rangle + |\uparrow\rangle), |\uparrow\rangle \to 1/\sqrt{2}(|\downarrow\rangle - |\uparrow\rangle)$ After this transformation, the signal contrast directly measures $c_{e\downarrow,l\uparrow}$:

$$2c_{e\downarrow,l\uparrow} = p_{-,\leftarrow} + p_{+,\to} - p_{-,\to} - p_{+,\leftarrow} \Rightarrow C \geq 0.42(6) \quad (24)$$

Similarly, the fidelity of the entangled state (post-selected on the detection of a photon) can be computed by the overlap with the target Bell state:

$$F = \langle \Psi^+ | p_{zz} | \Psi^+ \rangle = (p_{e\uparrow} + p_{l\downarrow} + 2c_{e\downarrow,l\uparrow})/2 \geq 0.70(3) \quad (25)$$

1.14.2. Correcting for Readout Infidelity

Errors arising from single-shot readout incorrectly assign the spin state, results in lower-contrast histograms for spin-photon correlations. One can correct for readout errors using a transfer matrix formalism. The measured spin-photon correlations $p_{ij}$ are related to the 'true' populations $P_{ij}$ via:

$$\begin{pmatrix} p_{e\downarrow} \\ p_{e\uparrow} \\ p_{l\downarrow} \\ p_{l\uparrow} \end{pmatrix} = \begin{pmatrix} F_\uparrow & 1-F_\uparrow & 0 & 0 \\ 1-F_\downarrow & F_\uparrow & 0 & 0 \\ 0 & 0 & F_\downarrow & 1-F_\uparrow \\ 0 & 0 & 1-F_\downarrow & F_\uparrow \end{pmatrix} \begin{pmatrix} p_{e\downarrow} \\ p_{e\uparrow} \\ p_{l\downarrow} \\ p_{l\uparrow} \end{pmatrix} \quad (26)$$

with $F_\downarrow$, $F_\uparrow$ defined above. After this correction, an identical analysis is performed to calculate the error-corrected histograms [FIG. 12 panels (b)-(d) dark-shading]. One can find an error-corrected concurrence $C \geq 0.79(7)$ and fidelity $F \geq 0.89(3)$.

Where $F\downarrow_{,e} \approx F\uparrow_{,e} = 0.85$ and $F\downarrow_{,N} \approx F\uparrow_{,N} = 0.72$. Following this analysis, one can obtain an error-corrected concurrence of $C \geq 0.22(9)$.

1.14.3. Electron-Nuclear Concurrence and Fidelity Calculations

For spin-spin Bell states, in contrast to the spin-photon analysis, one can no longer set any of the off-diagonal terms of the density matrix [Eqn. 21] to zero due to the limited (~90%) nuclear initialization fidelity. It is noted that neglecting these off-diagonal terms can decrease the estimated entanglement in the system, thus the concurrence can still be written as:

$$C \geq 2(|c_{\uparrow\uparrow}| - \sqrt{p_{\uparrow\downarrow}p_{\downarrow\uparrow}}) \quad (27)$$

where the first subscript is the electron spin state, and the second is the nuclear state. One can estimate $c\uparrow\uparrow$ again by using the measured populations in an orthogonal basis. In this case, off-diagonal terms add a correction:

$$2c_{\uparrow\uparrow} + 2c_{\downarrow\downarrow} = p_{\leftarrow\leftarrow} + p_{\to\to} - p_{\leftarrow\to} - p_{\to\leftarrow} \quad (28)$$

In order for the density matrix to be properly normalized, $C_{11} \leq \sqrt{p_{11}p_{11}}$, giving us the final concurrence:

$$C \geq p_{\leftarrow\leftarrow} + p_{\rightarrow\rightarrow} - p_{\leftarrow\rightarrow} - p_{\rightarrow\leftarrow} - 4\sqrt{p_{11}p_{11}} \quad (29)$$

Additionally, both electron readout error as well as $^{13}$C mapping infidelity can misreport the true spin state. As such, the new transfer matrix to correct for this error is:

$$\begin{pmatrix} F_{\downarrow,e}F_{\downarrow,N} & F_{\downarrow,e}(1-F_{\uparrow,N}) & (1-F_{\uparrow,e})F_{\downarrow,N} & (1-F_{\uparrow,e})(1-F_{\uparrow,N}) \\ F_{\downarrow,e}(1-F_{\downarrow,N}) & F_{\downarrow,e}F_{\uparrow,N} & (1-F_{\uparrow,e})(1-F_{\downarrow,N}) & (1-F_{\uparrow,e})F_{\uparrow,N} \\ (1-F_{\downarrow,e})F_{\downarrow,N} & (1-F_{\downarrow,e})(1-F_{\uparrow,N}) & F_{\uparrow,e}F_{\downarrow,N} & F_{\uparrow,e}(1-F_{\uparrow,N}) \\ (1-F_{\downarrow,e})(1-F_{\downarrow,N}) & (1-F_{\downarrow,e})F_{\uparrow,N} & F_{\uparrow,e}(1-F_{\downarrow,N}) & F_{\uparrow,e}F_{\uparrow,N} \end{pmatrix} \quad (30)$$

1.14.4. Electron-Nuclear CNOT Gate

One can further characterize the CNOT gate itself as a universal quantum gate. Due to the relatively poor read-out fidelity (see above), one may not do this by performing quantum state tomography. Instead, one can estimate entries in the CNOT matrix using measurements in the Z-basis. As a control measurement, one can first initialize the two qubits in all possible configurations and read out, averaged over many trials. Next, one can initialize the qubits, perform a CNOT gate, and read out, again averaged over many trials, normalized by the control data. Any reduction in contrast after normalization is attributed to the opposite spin state, establishing a system of equations for determining the CNOT matrix. One can solve this system of equations, marginalizing over free parameters to determine an MLE estimate for the CNOT transfer matrix, as seen in reference.

1.14.5. Nuclear Initialization and Readout

Figure 17:
FIG. 17 shows schematics of original initialization sequence, simplified initialization sequence, simulated performance of the initialization gate, and simulated performance, according to some embodiments of the present disclosure.
Figure 17:
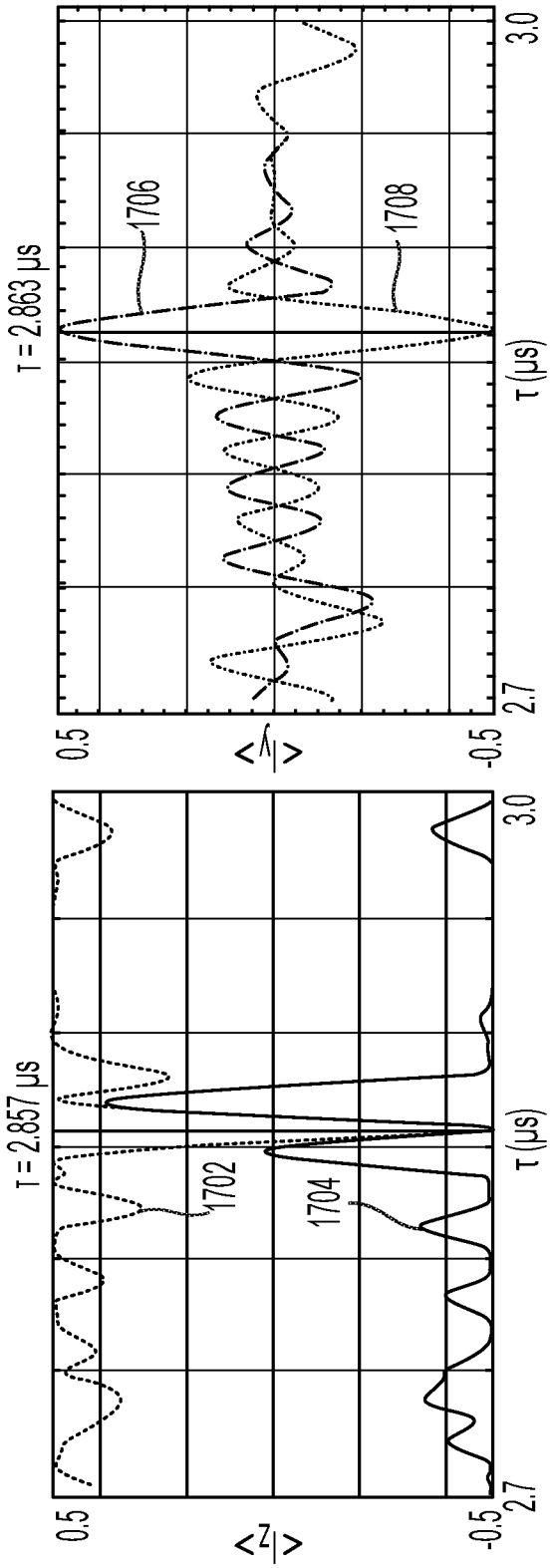

FIG. 17 panel (a) is a schematic showing original initialization sequence $\mathcal{R}_{z,C}^{\pi/2}$ rotation, according to some embodiments of the present disclosure. FIG. 17 panel (b) is a schematic showing simplified initialization sequence used in this work, according to some embodiments of the present disclosure. FIG. 17 panel (c) is a plot showing simulated performance of the initialization gate from panel (b) using 8 π-pulses per each nuclear gate, the initial state being |↑↑⟩ (1702) and |↑↓⟩(1704), according to some embodiments of the present disclosure. The resonances are narrow compared to panel (d) due to applying effectively twice more π-pulses. FIG. 17 panel (d) is a plot showing simulated performance of $\mathcal{R}_{\pm SiV-C}^{\pi/2}$ gate for 8 π-pulses for SiV-$^{13}$C register initialized in |↑↑⟩(1706) and |↑↓⟩(1708), according to some embodiments of the present disclosure.

Initialization (and readout) of the $^{13}$C spin can be done by mapping population between the SiV spin and the $^{13}$C. It is noted that Z and X gates are possible with dynamical-decoupling based nuclear gates, thus a natural choice for initialization are gates comprised of both $\mathcal{R}_{\pm x,SiV-C}^{\pi/2}$ and $\mathcal{R}_{z,SiV-C}^{\pi/2}$, as shown in FIG. 17 panel (a). It is noted here that it should be possible to combine the effects of $\mathcal{R}_x$ and $\mathcal{R}_z$ rotations in a single gate, which can shorten and simplify the total initialization gate, in some embodiments. Without wish to be bound by theory, one proposed sequence uses the following entangling gate:

$$\mathcal{R}_{n\uparrow,n\downarrow}^{\phi} = \begin{pmatrix} (1-i)/2 & i/\sqrt{2} & 0 & 0 \\ i/\sqrt{2} & (1-i)/2 & 0 & 0 \\ 0 & 0 & (1-i)/2 & -i/\sqrt{2} \\ 0 & 0 & -i/\sqrt{2} & (1-i)/2 \end{pmatrix} = \quad (31)$$

$$\begin{pmatrix} \mathcal{R}_{\Theta=\pi/4}^{\pi/2}\mathcal{R}_z^{\pi/2} & 0 \\ 0 & \mathcal{R}_{\Theta=\pi/4}^{-\pi/2}\mathcal{R}_z^{\pi/2} \end{pmatrix}$$

which corresponds to a rotation on the angle $\varphi = 2\chi/3$ around the axes $n_{\uparrow,\downarrow} = \{\pm\sqrt{2}, 0, 1\}/\sqrt{3}$. Without wish to be bound by theory, the matrix of entire initialization gate [FIG. 17 panel (b)] built from this gate can then be:

$$Init = \begin{pmatrix} 0 & 0 & -(1+i)/2 & -1/\sqrt{2} \\ i/\sqrt{2} & -(1+i)/2 & 0 & 0 \\ 0 & 0 & -(1-i)/2 & -i/\sqrt{2} \\ 1/\sqrt{2} & (1-i)/2 & 0 & 0 \end{pmatrix} \quad (32)$$

Which results in an initiated $^{13}$C spin.

To demonstrate this, one can numerically simulate a MW pulse sequence using the exact coupling parameters of the $^{13}$C and 8 π-pulses for each $\mathcal{R}_{n\uparrow,n\downarrow}^{\phi}$ gate. FIG. 17 panel (c) shows that regardless of the initial state, the $^{13}$C ends up in state |↓⟩ (given that the SiV was initialized in |↑⟩). As expected, the timing of this gate ($\tau_{init}=2.857$ μs) is noticeably different from the timing of the $\mathcal{R}_{\pm x,SiV-C}^{\pi/2}$ gate ($\tau_{\pi/2}=2.851$ μs), which occurs at spin-echo resonances [FIG. 17 panel (d)].

The rotation matrix for this sequence at $\tau = \tau_{init}$ (with the SiV initialized in |↑⟩) is:

$$\mathcal{R}_{n\uparrow}^{\phi} \begin{pmatrix} 0.55+0.51i & 0+0.65i \\ 0.65i & 0.55-0.52i \end{pmatrix} \quad (33)$$

corresponding to a rotation angle $\phi=0.637\pi$ around the axis $n_\uparrow = \{0.78, 0, 0.62\}$, very close to theoretical result. Since the example fidelities for both initialization gates [FIG. 17 panels (a) and (b)] are similar, one can use sequence (b) to make errors.

2. Memory-Enhanced Quantum Communication

The ability to communicate quantum information over long distances is of central importance in quantum science and engineering. For example, it enables secure quantum key distribution (QKD) relying on fundamental physical principles that prohibit the "cloning" of unknown quantum states. The range of QKD can be limited by photon losses and cannot be extended using straightforward measure-and-repeat strategies without compromising its unconditional security. Alternatively, quantum repeaters, which utilize intermediate quantum memory nodes and error correction techniques, can extend the range of quantum channels.

Efficient, long-lived quantum memory nodes are expected to play a role in extending the range of quantum communication, as they enable asynchronous quantum logic operations, such as Bell-state measurements (BSM), between optical photons. For example, the BSM is crucial to MDI- QKD, which is a specific implementation of quantum cryptography illustrated in FIG. 18 panel (a). Two remote communicating parties, Alice and Bob, try to agree on a key that is secure against potential eavesdroppers. They each send a randomly chosen photonic qubit {|±x⟩, |±y⟩} encoded in one of two conjugate bases (X or Y) across a lossy channel to an untrusted central node (Charlie), who is asked to perform a BSM and report the result over an authenticated public channel. After a number of iterations, Alice and Bob publicly reveal their choice of bases to obtain a sifted key from the cases when they used a compatible basis. A provably secure key can subsequently be extracted provided the BSM error rate is low enough. While MDI-QKD can be implemented with just linear optics and single photon detectors, the BSM in this "direct-transmission" approach can be successful when photons from Alice and Bob arrive simultaneously. Thus, when Alice and Bob are separated by a lossy fiber with a total transmission probability $p_{A \to B} \ll 1$, Charlie measures photon coincidences with probability also limited by $p_{A \to B}$, leading to a fundamental bound on the maximum possible secret key rate of $R_{max} = p_{A \to B}/2$ bits per channel use for an unbiased basis choice. While linear optical techniques to circumvent this bound are now being actively explored, they offer limited improvement and cannot be scaled beyond a single intermediate node. Alternatively, this bound can be broken using a quantum memory node at Charlie's location. In this approach, illustrated in FIG. 18 panel (b), the state of Alice's photon is efficiently stored in the heralded memory while awaiting receipt of Bob's photon over the lossy channel. Once the second photon arrives, a BSM between Alice's and Bob's qubits yields a secret key rate that for an ideal memory scales as $R_s \propto \sqrt{p_{A \to B}}$, which can lead to substantial improvement over direct transmission in some embodiments. Beyond this specific protocol, memory-based asynchronous Bell-state measurements are central for the realization of scalable quantum repeaters with multiple intermediate nodes.

2.1. Demonstration of Memory-Enhanced Quantum Communication

Embodiments of the present disclosure describe an example realization of memory-enhanced quantum communication. In some embodiments, one can use a single solid-state spin memory integrated in a nanophotonic diamond resonator to implement asynchronous photonic Bell-state measurements. This enables a four-fold increase in the secret key rate of measurement device independent (MDI)-QKD over the loss-equivalent direct-transmission method while operating at megahertz clock rates. The results represent a significant step towards practical quantum repeaters and large-scale quantum networks.

Embodiments of the present disclosure describe the operation of such a quantum memory node, enabling MDI-QKD at rates that exceed those of an ideal system based on linear optics. In some embodiments, the realization is based on a single silicon-vacancy (SiV) color-center integrated inside a diamond nanophotonic cavity [FIG. 19 panel (a)]. Its key figure-of-merit, the cooperativity C, describes the ratio of the interaction rate with individual cavity photons compared to all dissipation rates. A low mode volume $(0.5(\lambda/n)^3)$, high quality factor $(2 \times 10^4)$, and nanoscale positioning of SiV centers enable an exceptional C=105±11. Cavity photons are critically coupled to a waveguide and adiabatically transferred into a single-mode optical fiber that is routed to superconducting nanowire single-photon detectors, yielding a full system detection efficiency of about 85%. The device is placed inside a dilution refrigerator, resulting in electronic spin quantum memory time $T_2 > 0.2$ ms.

Figure 19:
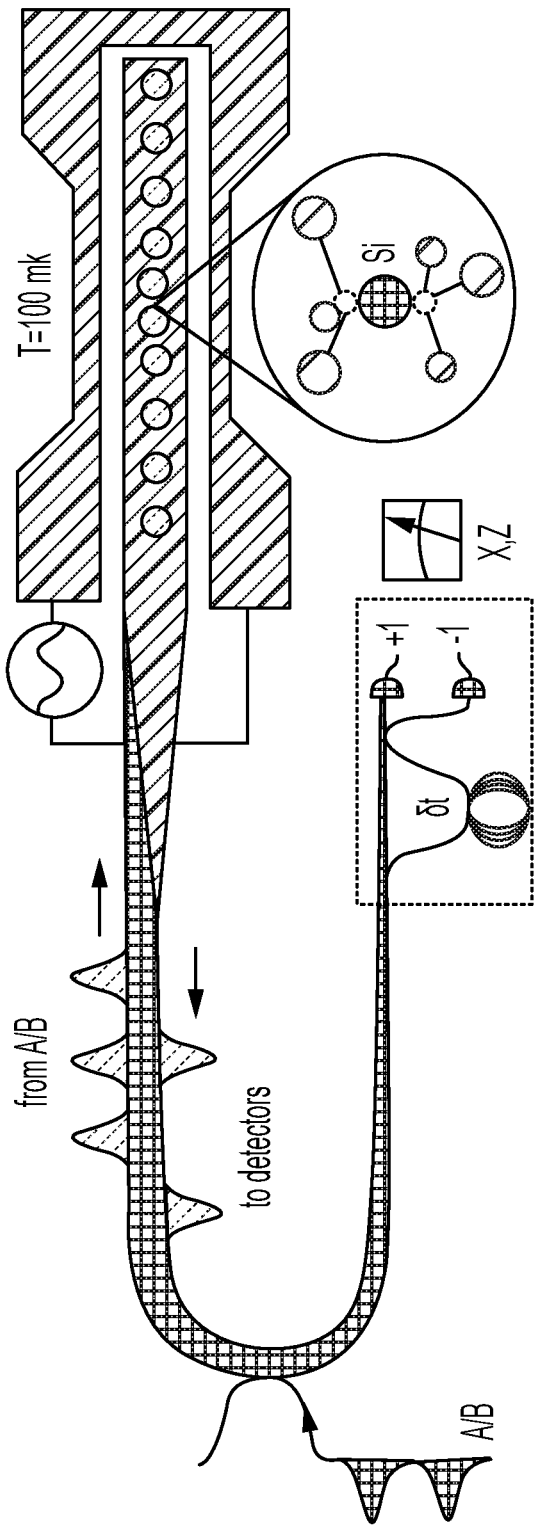
FIG. 19 shows schematics of memory-assisted implementations of Charlie's measurement device, reflection spectrum of memory node, histogram of detected photon numbers, a schematic of spin-photon quantum logic operation, and characterization of resulting spin-photon correlations in the ZZ and XX bases, according to some embodiments of the present disclosure.
Figure 19:
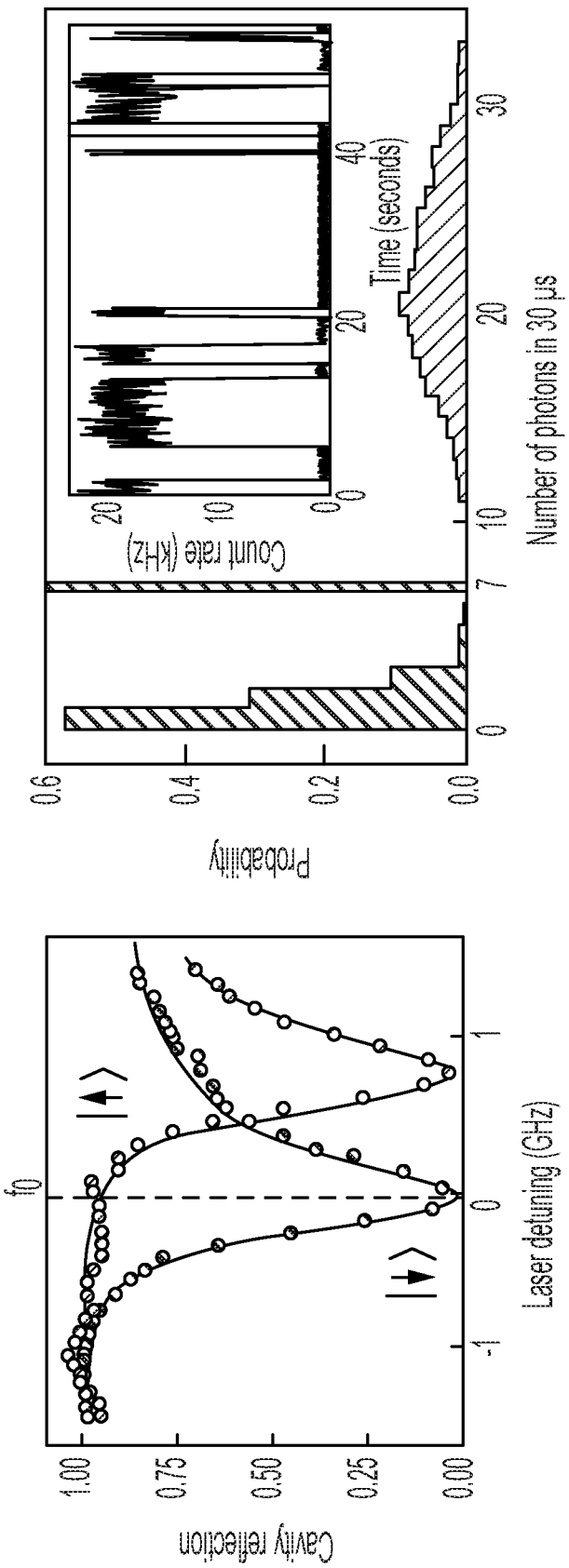
Figure 19:
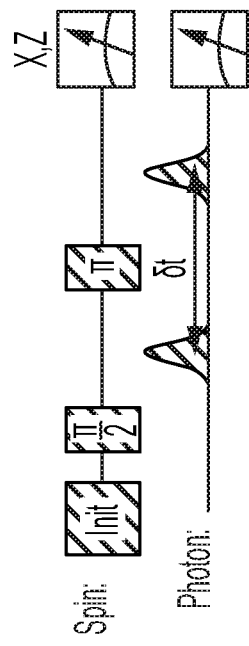
Figure 19:
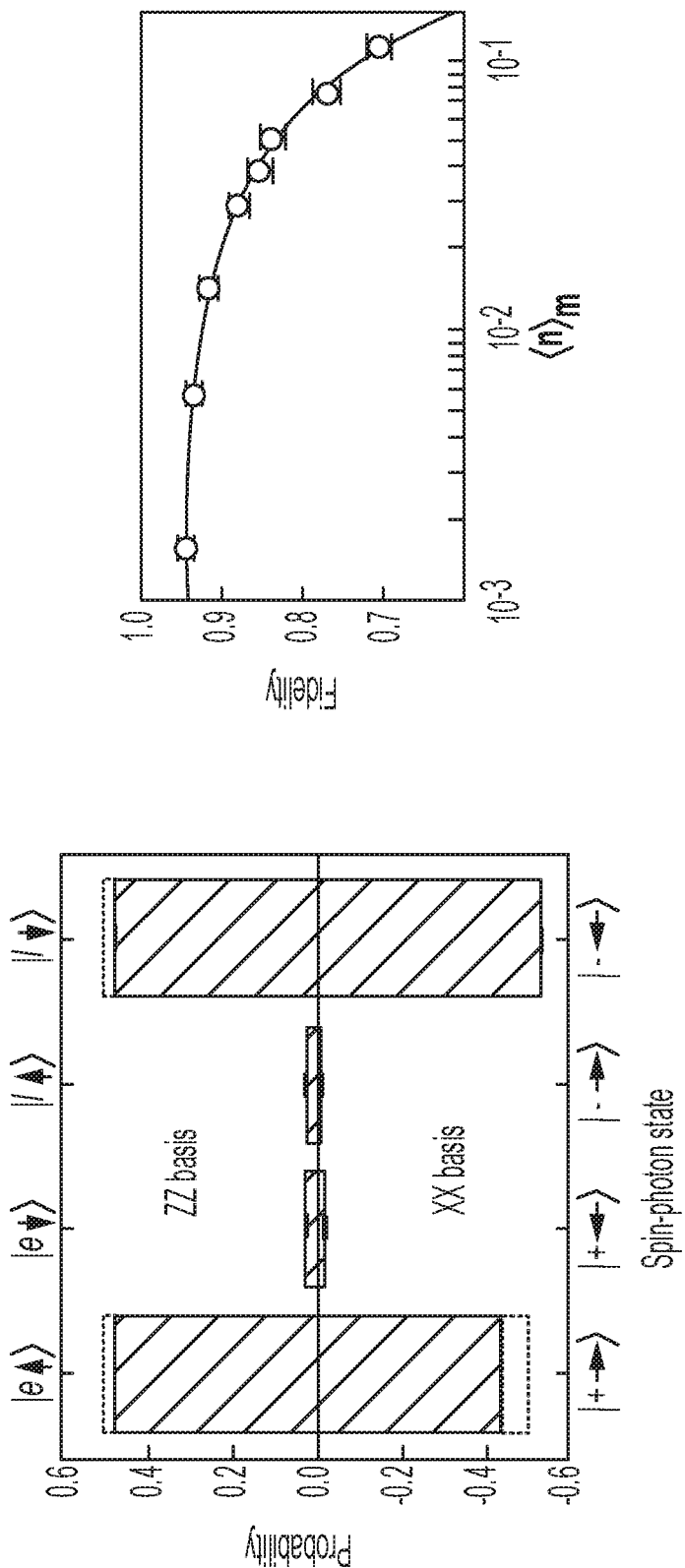

The operating principle of the SiV-cavity based spin-photon interface is illustrated in FIG. 19 which shows heralded spin-photon gate, according to some embodiments of the present disclosure. Panel (a) is a schematic of memory-assisted implementation of Charlie's measurement device. Weak pulses derived from a single laser simulate incoming photons from Alice and Bob. Reflected photons are detected in a heralding setup (dashed box). Panel (b) is a reflection spectrum of memory node, showing spin-dependent device reflectivity. Panel (c) is a histogram of detected photon numbers during a 30 µs laser pulse, enabling single-shot readout based on a threshold of 7 photons. The inset shows electron spin quantum jumps under weak illumination. Panel (d) is a schematic of spin-photon quantum logic operation used to generate and verify spin-photon entangled state. Panel (e) is a plot showing characterization of resulting spin-photon correlations in the ZZ and XX bases. Dashed bars show ideal values. Panel (f) is a plot showing measured spin-photon entanglement fidelity as a function of $\langle n \rangle_m$, the average incident photon number during each initialization of the memory.

Spin dependent modulation of the cavity reflection at incident probe frequency $f_0$ [FIG. 19 panel (b)] results in the direct observation of electron spin quantum jumps [FIG. 19 panel (c), inset], enabling nondestructive single-shot readout of the spin state [FIG. 19 panel (c)] in 30 µs with fidelity $F = 0.9998_{-0.003}^{+0.002}$. Coherent control of the SiV spin qubit $(f_Q \approx 12 \text{ GHz})$ is accomplished using microwave fields delivered via an on-chip gold coplanar waveguide. In some embodiments, one can utilize both optical readout and microwave control to perform projective feedback-based initialization of the SiV spin into the |↓⟩ state with a fidelity of F=0.998±0.001. Spin-dependent cavity reflection also enables quantum logic operations between an incoming photonic time-bin qubit and the spin memory. In some embodiments, one can characterize this by using the protocol illustrated in FIG. 19 panel (d) to generate the spin-photon entangled state $(|e\uparrow\rangle + |l\downarrow\rangle)/\sqrt{2}$ conditioned on successful reflection of an incoming single photon with overall heralding efficiency η=0.0423±0.004. Here, |e⟩ and |l⟩ |l⟩ denote the presence of a photon in an early or late time-bin separated by δt=142 ns respectively. One can characterize the entangled state by performing measurements in the joint spin-photon ZZ and XX bases [FIG. 19 panel (e)], implementing local operations on the reflected photonic qubit with a time-delay interferometer [FIG. 19 panel (a), dashed box]. By lowering the average number of photons $\langle n \rangle_m$ incident on the device during the SiV memory time, one can reduce the possibility that an additional photon reaches the cavity without being subsequently detected, enabling high spin-photon gate fidelities for small $\langle n \rangle_m$ [FIG. 19 panel (f)]. For $\langle n \rangle_m = 0.002$ one can measure a lower bound on the fidelity of the spin-photon entangled state of F≥0.994±0.008, primarily limited by residual reflections from the |↓⟩ state.

Figure 20:
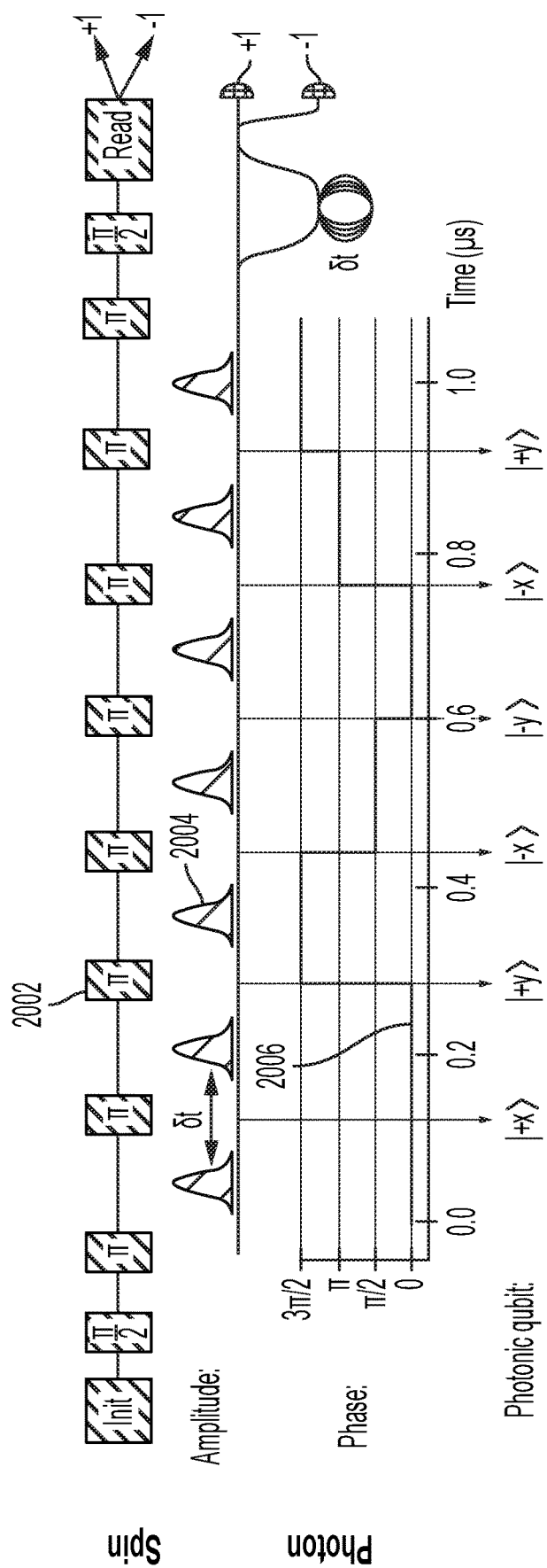
FIG. 20 shows schematics of asynchronous Bell-state measurements using quantum memory, according to some embodiments of the present disclosure.
Figure 20:
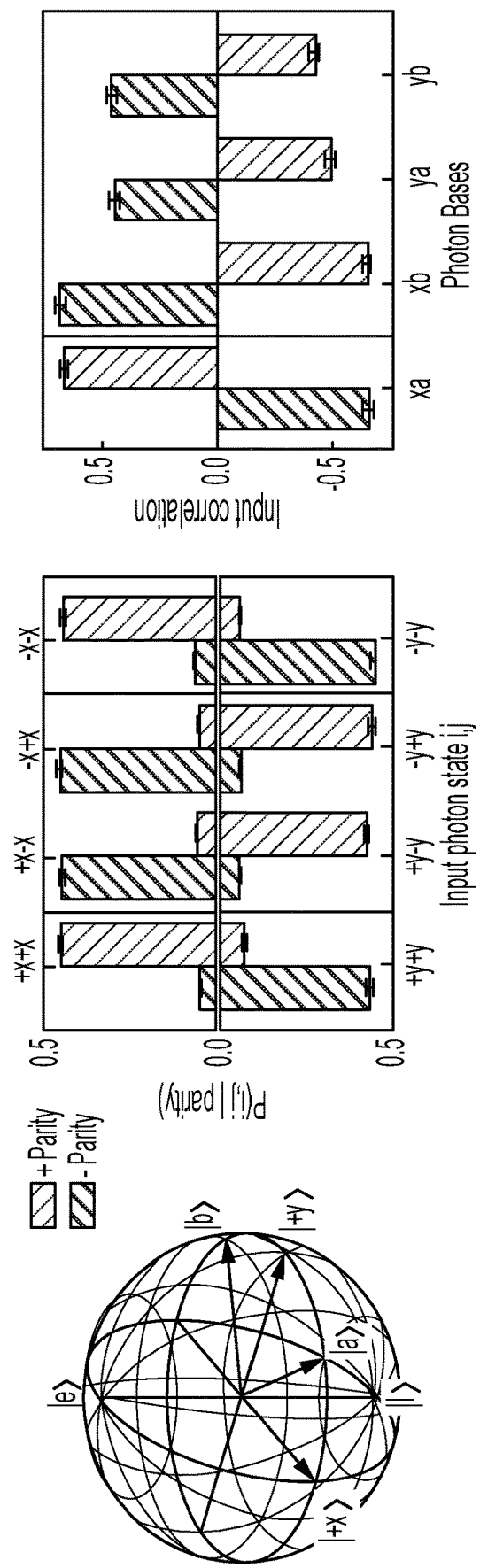

FIG. 20 is a schematic showing asynchronous Bell-state measurements using quantum memory, according to some embodiments of the present disclosure. Panel (a) shows an example sequence with N=6 photonic qubits sent in a single memory time. Microwave 7c pulses (2002) are interleaved with incoming optical pulses. Photons have fixed amplitude (2004) and qubits are defined by the relative phases between subsequent pulses (2006). Panel (b) shows a schematic of Bloch sphere representation of input photonic time-bin qubits used for characterization. Panel (c) shows characterization of asynchronous BSM. Conditional probabilities for Alice and Bob to have sent input states (i,j) given a particular parity outcome for input states in the X(top) and Y (bottom) bases. Panel (d) shows Bell test using the CHSH inequality. Conditioned on the BSM outcome, the average correlation between input photons is plotted for each pair of bases used. Shaded backgrounds denote the expected parity.

This spin-photon logic gate can be directly used to herald the storage of an incoming photonic qubit by interferometrically measuring the reflected photon in the X basis. To implement memory-assisted MDI-QKD, one can extend this protocol to accommodate a total of N photonic qubit time-bins within a single initialization of the memory [FIG. 20 panel (a)]. Each individual time-bin qubit is encoded in the relative amplitudes and phases of a pair of neighboring pulses separated by $\delta t$. Detection of a reflected photon heralds the arrival of the photonic qubit formed by the two interfering pulses without revealing its state. Two such heralding events, combined with subsequent spin-state readout in the X basis, constitute a successful BSM on the incident photons. This can be understood without loss of generality by restricting input photonic states to be encoded in the relative phase $\phi$ between neighboring pulses with equal amplitude: $(|e\rangle + e^{i\phi}|1\rangle)/\sqrt{2}$ [FIG. 20 panel (b)]. Detection of the first reflected photon in the X basis teleports its quantum state onto the spin, resulting in the state $(|\uparrow\rangle + m_1 e^{i\phi_1}|\downarrow\rangle)/\sqrt{2}$, where $m_1 = \pm 1$ depending on which detector registers the photon. Detection of a second photon at a later time within the electron spin $T_2$ results in the spin state $(|\uparrow\rangle + m_1 m_2 e^{i(\phi_1+\phi_2)}|\downarrow\rangle)/\sqrt{2}$. The phase of this spin state can depend on the sum of the incoming phases and the product of their detection outcomes, but not the individual phases themselves. As a result, if the photons were sent with phases that meet the condition $\phi_1+\phi_2 \in \{0, \pi\}$, a final measurement of the spin in the X basis ($m_3 = \pm 1$) completes an asynchronous photon-photon BSM, distinguishing two of the four Bell-states based on the total parity $m_1 m_2 m_3 = \pm 1$.

Figure 18:
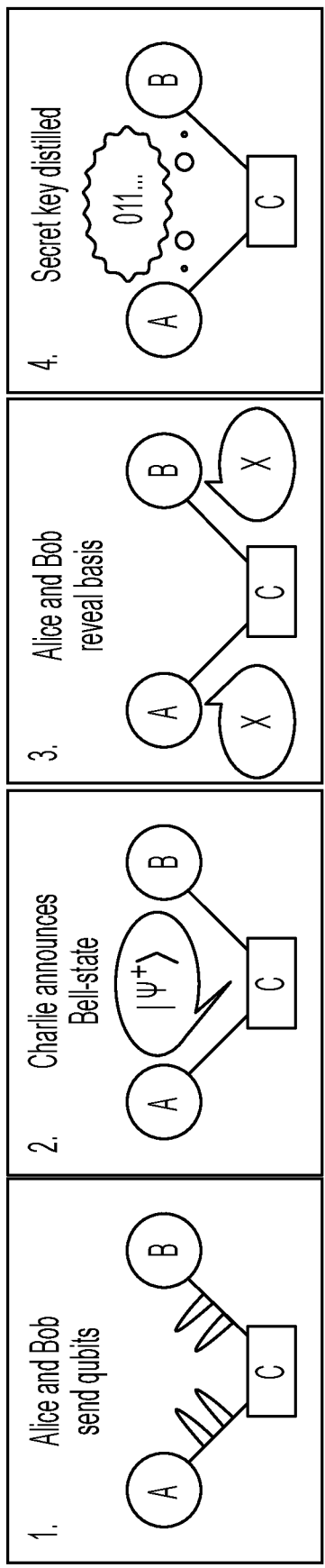
FIG. 18 shows schematics of memory-enhanced quantum communication, according to some embodiments of the present disclosure.
Figure 18:
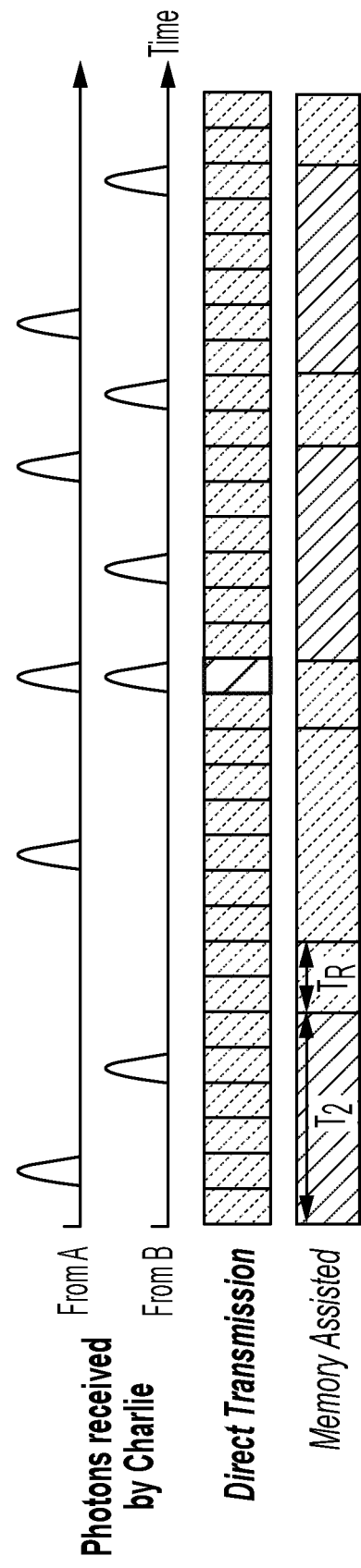

This approach can be directly applied to generate a secure key within the MDI-QKD protocol illustrated in FIG. 18 panel (a). One can analyze the system performance by characterizing the overall quantum-bit error rate (QBER) for N=124 photonic qubits per memory initialization. One can use several random bit strings of incoming photons from $\{|\pm x\rangle, |\pm y\rangle\}$ and observe strong correlations between the resulting BSM outcome and the initial combination of input qubits for both bases [FIG. 20 panel (c)]. Using this method, one can estimate the average QBER to be E=0.116±0.002 for all combinations of random bit strings measured, significantly below the limit of $E_i$=0.146 providing security against individual attacks. This value is affected by technical imperfections in the preparation of random strings of photonic qubits. One can find specific periodic patterns of photonic qubits to be less prone to these effects, resulting in a QBER as low as E=0.097±0.006, which falls within the threshold for unconditional security of $E_u$=0.110 with a confidence level of 0.986. One can further verify security by testing the Bell-CHSH inequality using input states from four different bases, each separated by an angle of 45°. One can find that the correlations between input photons [FIG. 20 panel (d)] violate the Bell-CHSH inequality $S_\pm \leq 2$, observing $S_+$=2.21±0.04 and $S_-$=2.19±0.04 for positive and negative BSM parity results respectively. This result demonstrates that this device can be used for fundamentally secure quantum communication.

Figure 21:
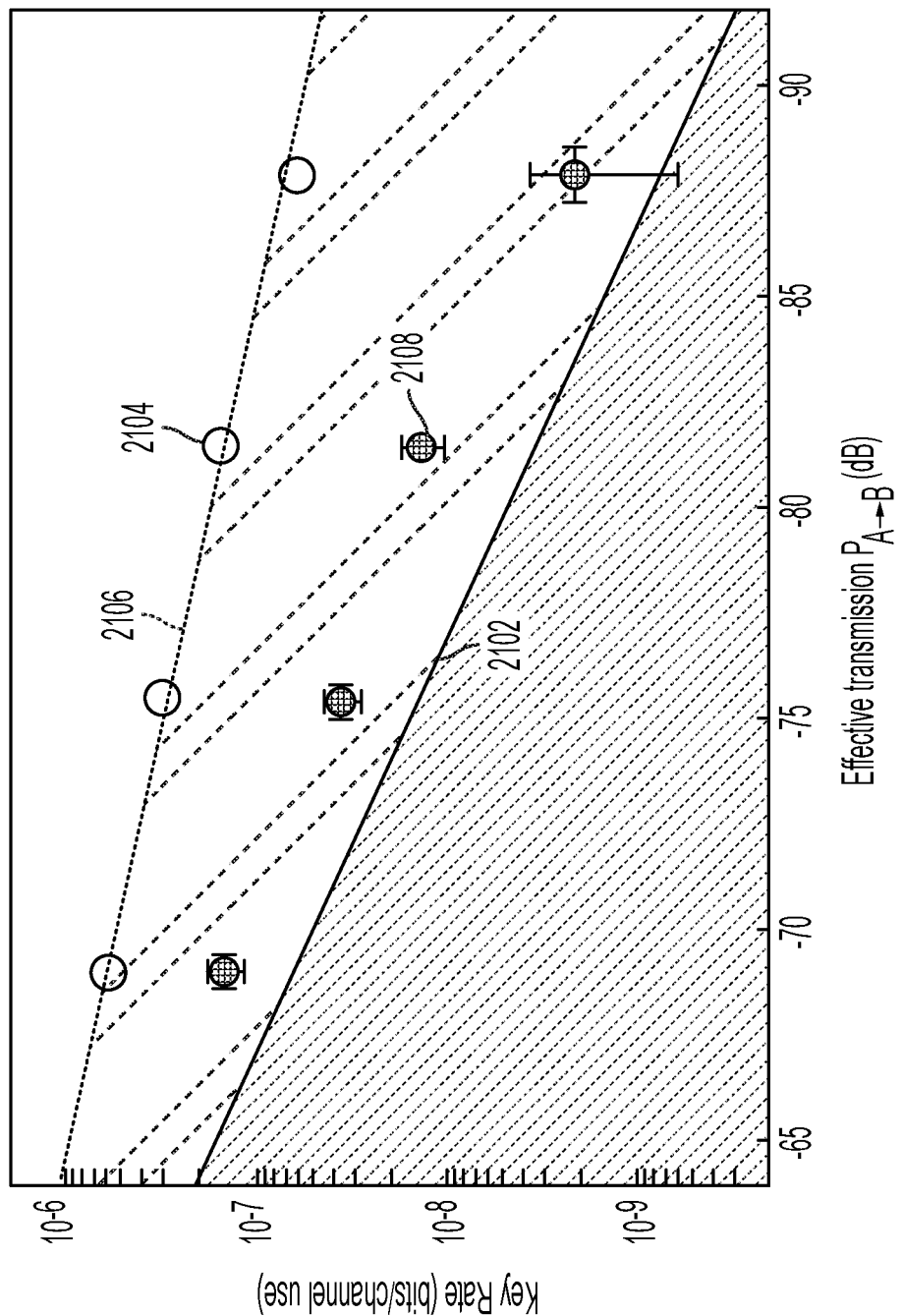
FIG. 21 shows a plot of performance of memory-assisted quantum communication, according to some embodiments of the present disclosure.

FIG. 21 shows the performance of memory-assisted quantum communication with a log-log plot of key rate in bits per channel use versus effective channel transmission ($p_{A \rightarrow B}$= $\langle n \rangle_p^2$, where $\langle n \rangle_p$ is the average number of photons incident on the measurement device per photonic qubit). Without being bound by theory, line 2102 shows theoretical maximum for equivalent direct transmission MDI-QKD applications. Open circles 2104 show example measured sifted key rate (line 2106 is the expected rate). In some embodiments, to facilitate operation of the memory, $\langle n \rangle_m = \langle n \rangle_p N \approx 0.02$ is kept constant. From left to right, points correspond to N={60, 124, 248, 504}. Filled circles 2108 show secure key rates $R_s$ using memory device. Vertical error bars are given by the 68% confidence interval and horizontal error bars represent the standard deviation of the systematic power fluctuations.

Finally, one can benchmark the performance of memory-assisted QKD. For each example, one can model an effective channel loss by considering the mean photon number $\langle n \rangle_p$ incident on the device per photonic qubit. Assuming that Alice and Bob emit roughly one photon per qubit, this yields an effective channel transmission probability $p_{A \rightarrow B} = \langle n \rangle_p^2$, resulting in the maximal secret key rate $R_{max}$ per channel use for direct transmission MDI-QKD, given by the red line in FIG. 21. Without wish to be bound by theory, this may be a theoretical upper bound on linear optics based MDI-QKD, assuming ideal sources and detectors and balanced basis choices. The measured sifted key rates of the memory-based device are plotted as open circles 2104 in FIG. 21. Due to the high overall heralding efficiency and the large number of photonic qubits per memory time (up to N=504), the memory-assisted sifted key rate exceeds the capability of direct-transmission MDI-QKD by a factor of 78.4±0.7 at an effective channel loss of about 88 dB.

In practice, errors introduced by the quantum memory node could leak information to the environment, reducing the security of the sifted key. The fraction of secure bits $r_s$ that can be extracted from a sifted key with finite QBER using conventional error correction and privacy amplification techniques rapidly diminishes as the QBER approaches $E_i$=0.147. For each value of the effective channel loss, one can estimate the QBER and use it to compute $r_s$, enabling extraction of distilled secure key rates $R_S$, plotted in black in FIG. 21. Even after error-correction, one can find that the memory-assisted secret key rate outperforms the ideal limit for the corresponding direct-transmission implementation of MDI-QKD by a factor of up to $R_S/R_{max}$=4.1±0.5(±0.1 systematic uncertainty, for N=124). In some embodiments, one can further find that this rate also exceeds the fundamental bound on repeaterless communication $R_S \leq 1.44 p_{A \rightarrow B}$ with a statistical confidence level of 99.2% ($_{-0.3\%}^{+0.2\%}$ sysematic uncertainty). Despite overhead time associated with operating the quantum memory node ($T_R$ in FIG. 17 panel (b)), the performance of the memory assisted BSM (for N=248) enables MDI-QKD that is competitive with an ideal unassisted system running at a 4 MHz average clock rate.

Embodiments of the present disclosure demonstrate the viability of memory-enhanced quantum communication and represent a crucial step towards realizing functional quantum repeaters. Several other technical aspects can be combined with embodiments of the present disclosure for quantum communication. In an example, this protocol can be implemented using truly independent, distant communicating parties. In another example, frequency conversion from telecommunications wavelengths, as well as low-loss optical elements used for routing photons to and from the memory node, can be incorporated. In another example, rapid generation of provably secure keys can be realized using an implementation of decoy-state protocols, biased bases, and finite-key analyses, all compatible with the present approach. The present approach is well-suited for such deployments. Embodiments of the present disclosure do not require phase stabilization of long-distance links and operates efficiently in the relevant regime of $p_{A \to B} \approx 70$ dB, corresponding to about 350 km of telecommunications fiber. Additionally, a single device can be used at the center of a star (e.g., multi-spoked) network topology, enabling quantum communication between several parties beyond the metropolitan scale. Furthermore, the present approach can be extended along several directions. The use of long-lived $^{13}C$ nuclear spin qubits can eliminate the need to operate at low total $\langle n \rangle_m$ and can provide longer storage times, which can enable hundred-fold enhancement of BSM success rates, in some embodiments. Recently implemented strain-tuning capabilities should allow for operation of many quantum nodes at a common network frequency. Unlike linear optics-based alternatives, the approach presented here can be extended to implement the full repeater protocol, enabling a polynomial scaling of the communication rate with distance. Finally, the demonstrated multi-photon gate operations can also be adapted to engineer large cluster-states of entangled photons, which can be utilized for rapid quantum communication. Implementation of these techniques could enable the realization and applications of scalable quantum networks beyond QKD, ranging from non-local quantum metrology to modular quantum computing architectures.

2.2. Example Setup

In some embodiments, measurements can be performed in a dilution refrigerator (DR, BlueFors® BF-LD250) with a base temperature of 20 mK. The DR is equipped with a superconducting vector magnet (American Magnets Inc. 6-1-1 T), a home-built free-space wide-field microscope with a cryogenic objective (Attocube® LT-APO-VISIR), piezo positioners (Attocube® ANPx101 and ANPx311 series), and fiber and MW feedthroughs. Tuning of the nanocavity resonance is performed using a gas condensation technique. The SiV-cavity system is optically interrogated through the fiber network without any free-space optics. The operating temperature of the memory node during the BSM measurements was 100-300 mK.

2.2.1. Example Implementation of Asynchronous BSM

Figure 22:
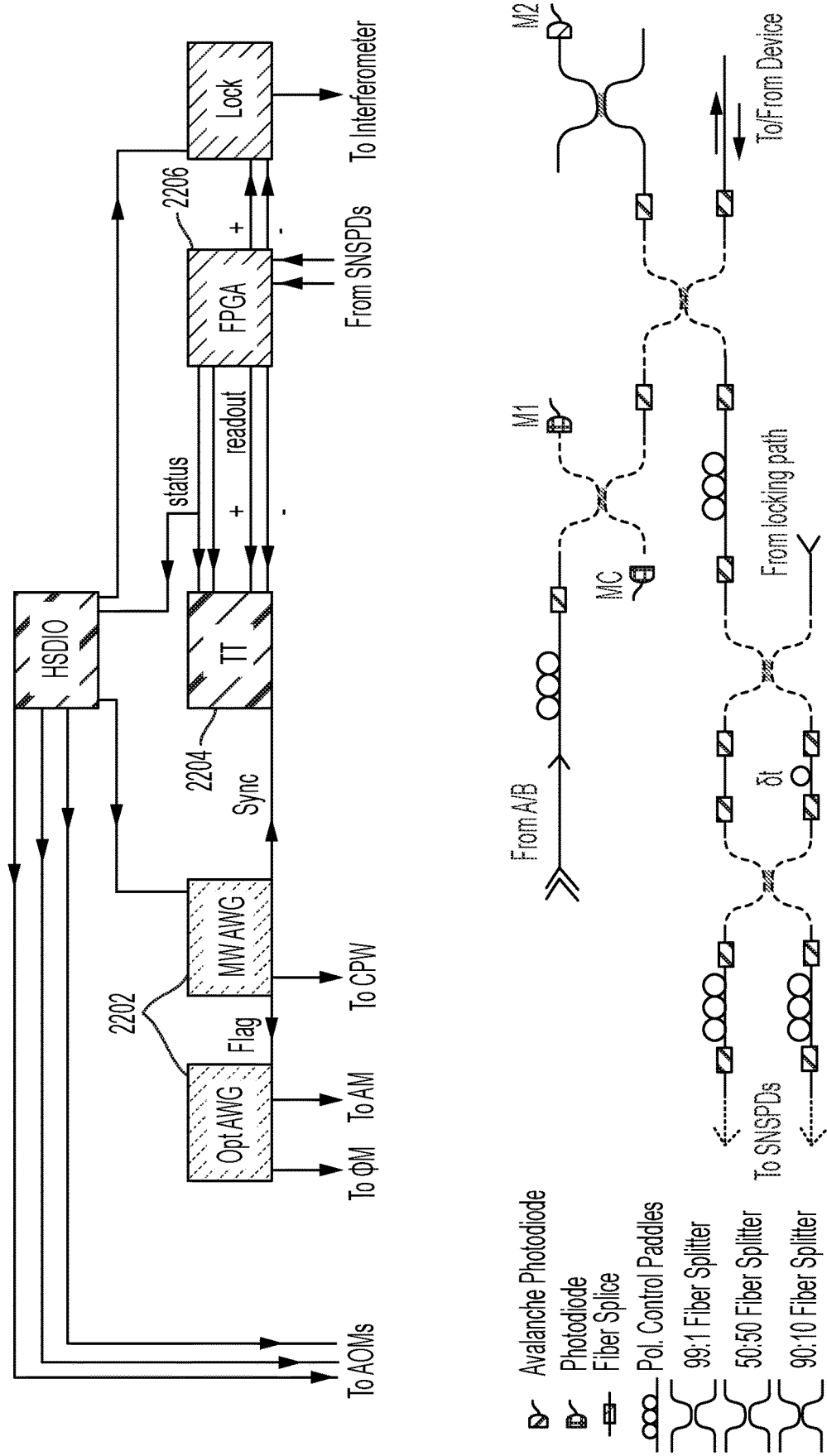
FIG. 22 shows schematics of an example system set-up, according to some embodiments of the present disclosure.
Figure 22:
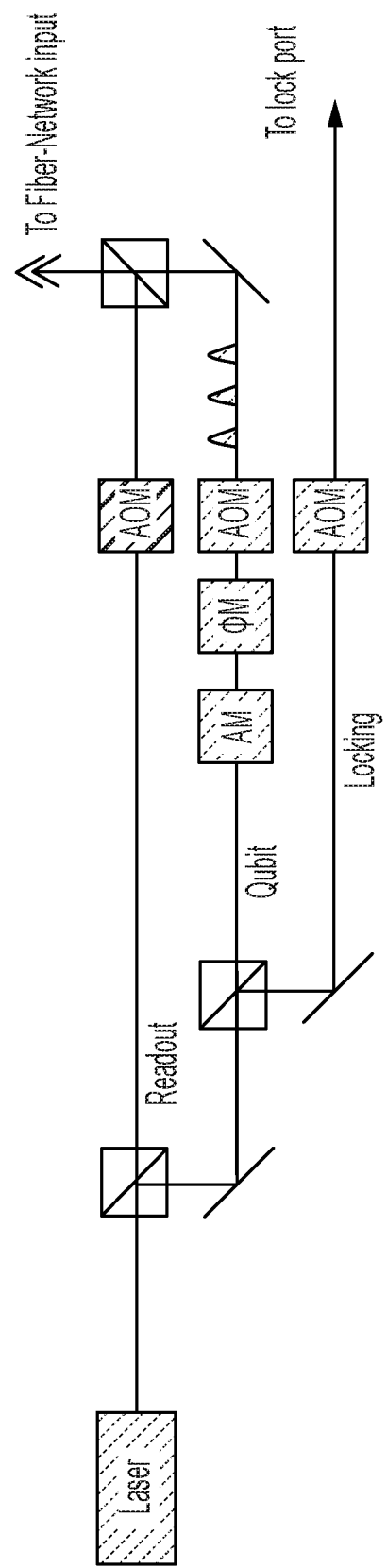

FIG. 22 is an example setup schematic, according to some embodiments of the present disclosure. Panel (a) shows control flow of experiment. Opt (MW) AWG 2202 is a Tektronix® AWG7122B 5 GS/s (Tektronix® AWG70001a 50 GS/s) arbitrary waveform generator used to generate photonic qubits (microwave control signals). All signals are recorded on a time-tagger 2204 (TT, PicoQuant® Hydra-Harp 400). Panel (b) shows a schematic of a fiber network used to deliver photons to and collect photons from the memory device, including elements for polarization control and diagnostic measurements of coupling efficiencies. Panel (c) shows a schematic of preparation of optical fields. The desired phase relation between lock and qubit paths is facilitated by modulating AOMs using phase-locked RF sources with a precise 1.8 MHz frequency shift between them.

An asynchronous BSM [FIG. 20 panel (a)] relies on (1) precise timing of the arrival of optical pulses (corresponding to photonic qubits from Alice and Bob) with microwave control pulses on the quantum memory and (2) interferometrically stable rotations on reflected time-bin qubits for successful heralding. In order to accomplish (1), all equipment used for generation of microwave and optical fields is synchronized by a single device (National Instruments® HSDIO, FIG. 22 panel (a)) with programming described in TABLES 1 and 2.

In order to accomplish (2), one can use a single, narrow linewidth (<50 kHz) Ti:Sapphire laser (M Squared® SolsTiS-2000-PSX-XF, FIG. 22 panel (b)) both for generating photonic qubits and locking the time-delay interferometer (TDI) used to herald their arrival. In the example, photonic qubits are reflected from the device, sent into the TDI, and detected on superconducting nanowire single photon detectors (SNSPD, Photon Spot™) All detected photons are processed digitally on a field-programmable gate array 2206 (FPGA, FIG. 22 panel (a)), and the arrival times of these heralding signals are recorded on a time-tagger 2204 (TT, FIG. 22 panel (a)), and constitute one bit of information of the BSM ($m_1$ or $m_2$). At the end of the example application, a 30 µs pulse from the readout path is reflected off the device, and photons are counted in order to determine the spin state ($m_3$) depending on the threshold shown in FIG. 19 panel (c).

To minimize thermal drift of the TDI, it is mounted to a thermally weighted aluminum breadboard, placed in a polyurethane foam-lined and sand filled briefcase, and secured with glue to provide passive stability on the minute timescale. One can halt the process and actively lock the interferometer to the sensitive Y-quadrature every ~200 ms by changing the length of the roughly 28 m long (142 ns) delay line with a cylindrical piezo. In order to use the TDI for X-measurements of the reflected qubits, one can apply a frequency shift of 1.8 MHz using the qubit AOM, which is ¼ of the free-spectral range of the TDI. Since the nanophotonic cavity, the TDI, and the SNSPDs are all polarization sensitive, one can use various fiber-based polarization controllers [FIG. 22 panel (b)]. All fibers in the network are covered with aluminum foil to prevent thermal polarization drifts. This results in an interference visibility of the TDI of >99% that is stable for several days without any intervention with lab temperature and humidity variations of 1° C. and ±5% respectively.

In some embodiments, in order to achieve high-fidelity operations one can ensure that the laser frequency (which is not locked) is resonant with the SiV frequency $f_0$ (which is subject to the spectral diffusion). To do that one can implement a so-called preselection procedure, described in TABLES 1 and 2 and FIG. 22 panel (a). First, the SiV spin state is initialized by performing a projective measurement and applying microwave feedback. During each projective readout, the reflected counts are compared with two thresholds: a "readout" threshold of 7 photons (used to record $m_3$), and a "status" threshold of 3 photons. The status trigger is used to prevent the process from running in cases when the laser is no longer on resonance with $f_0$, or if the SiV has ionized to an optically inactive charge state. The duty cycle of the status trigger is externally monitored and is used to temporarily abort the process and run an automated re-lock procedure that locates and sets the laser to the new frequency $f_0$, reinitailizing the SiV charge state with a 520 nm laser pulse. This protocol enables fully automated operation at high fidelities (low QBER) for several days without human intervention.

2.2.2. Calibration of Fiber Network

The schematic of the fiber-network used to deliver optical pulses to and collect reflected photons from the nanophotonic memory device is shown in FIG. 22 panel (b). Photons are routed through the lossy (1%) port of a 99:1 fiber beam-splitter (FBS) to the nanophotonic device. In some embodiments, it is noted that for practical implementation of memory-assisted quantum communication, an efficient optical switch or circulator should be used instead. In this example, since one focuses on benchmarking the performance of the memory device itself, the loss introduced by this beam-splitter is incorporated into the estimated channel loss. Reflected photons are collected and routed back through the efficient (99%) port of the FBS and are sent to the TDI in the heralding setup.

TABLE 1

High-level example sequence.

| Step | Process | Duration | Proceed to |
|---|---|---|---|
| 1 | Lock time-delay interferometer | 200 ms | 2 |
| 2 | Readout SiV | 30 μs | If status LOW: 4, else: 3 |
| 3 | Apply microwave π pulse | 32 ns | 2 |
| 4 | Run main example script | ~200 ms | 1 |

As shown in TABLE 1, this sequence is programmed into the HSDIO and uses feedback from the status trigger sent from the FPGA [see FIG. 22 panel (a)]. Main example sequence is described in TABLE 2. External software is also used to monitor the status trigger. If it is HI for ≥2 s, the software activates an automatic re-lock procedure which compensates for spectral diffusion and ionization of the SiV center.

TABLE 2

Main example sequence for memory-enhanced quantum communication

| Step | Process | Duration | Proceed to |
|---|---|---|---|
| 1 | Run sequence in FIG. 3a for a given N | 10-20 μs | 2 |
| 2 | Readout SiV + report readout to TT | 30 μs | If status LOW: 1, else: 3 |
| 3 | Apply microwave π pulse | 32 ns | 4 |
| 4 | Readout SiV | 30 μs | If status LOW: 3, else: 1 |

As shown in TABLE 2, this script is followed until step 1 is run a total of 4000 times, and then terminates and returns to step 1 of TABLE 1. The longest step is the readout step, which is limited by the fact that one can operate at a photon detection rate of ~1 MHz to avoid saturation of the SNSPDs.

The outputs of the TDI are sent back into the dilution refrigerator and directly coupled to superconducting nanowire single-photon detectors (SNSPDs, PhotonSpot®), which are mounted at the 1K stage and are coated with dielectrics to optimize detection efficiency exactly at 737 nm. To estimate the quantum efficiency (QE) of the detectors one can compare the performance of the SNSPDs to the specifications of calibrated conventional avalanche photodiodes single-photon counters (Laser Components™ COUNT-10C-FC). The estimated QEs of the SNSPDs with this method are as close to unity as one can verify. Additionally, one can measure<1% reflection from the fiber-SNSPD interface, which typically is the dominant contribution to the reduction of QE in these devices. Thus, one can assume the lower bound of the QE of the SNSPDs to be $\eta_{QE}=0.99$ for the rest of this section. Of course, this estimation is subject to additional systematic errors. However, the actual QE of these detectors can be a common factor (and thus drop out) in a comparison between any two physical quantum communication systems.

The total heralding efficiency η of the memory node is an useful parameter since it directly affects the performance of the BSM for quantum communication applications. In some embodiments, one can use 2 different approaches to estimate the overall heralding efficiency η. One can first measure the most dominant loss, which arises from the average reflectivity of the critically coupled nanophotonic cavity [FIG. 19 panel (b)]. While the $|\uparrow\rangle$ state is highly reflecting (94.4%), the $|\downarrow\rangle$ state reflects 4.1% of incident photons, leading to an average device reflectivity of $\eta_{sp}=0.493$.

In method (1), one can compare the input power photodiode M1 with that of photodiode MC. This estimates a lower-bound on the tapered-fiber diamond waveguide coupling efficiency of $\eta_c=0.930\pm0.017$. This error bar arises from uncertainty due to photodiode noise and does not include systematic photodiode calibration uncertainty. However, in some embodiments, it is noted that if the tapered fiber is replaced by a silver-coated fiber-based retroreflector, this calibration technique extracts a coupling efficiency of $\eta_c^{cal}\approx 0.98$, which is consistent with the expected reflectivity from such a retroreflector. In some embodiments, one can independently calibrate the efficiency through the 99:1 fiber beam-splitter and the TDI to be $\eta_f=0.934$. In some embodiments, one can obtain a first estimate on the overall heralding efficiency $\eta=\eta_{sp}\eta_c\Theta_f\eta_{QE}=0.425\pm0.008$.

In method (2), during the example, one can compare the reflected counts from the highly-reflecting ($|\uparrow\rangle$) spin-state measured on the SNSPDs with the counts on an avalanche photodiode single photon counting module [M2 in FIG. 22 panel (b)] which has a calibrated efficiency of ≈0.7 relative to the SNSPDs. From this measurement, one can estimate an overall efficiency of fiber-diamond coupling, as well as transmission through all relevant splices and beam-splitters of $\eta_c\eta_f=0.864\pm0.010$. This error bar arises from shot noise on the single photon detectors. Overall, this gives us a consistent estimate of $\eta=\eta_{sp}\eta_x\eta_f\eta_{QE}=0.422\pm0.005$.

In some embodiments, one can use an average value of the heralding efficiency inferred from the two calibration techniques: $\eta=0.423\pm0.004$. Methods (1) and (2), which each have independent systematic uncertainties associated with imperfect photodetector calibrations, are consistent to within a small residual systematic uncertainty, which is noted in the text where appropriate. It may be noted that this heralding efficiency is consistent with the scaling of spin decoherence with the number of photons at the cavity $\langle n \rangle_m$. An example of this effect is shown in the red point in FIG. 24 panel (e).

2.3. Characterization of the Nanophotonic Quantum Memory.

Figure 23:
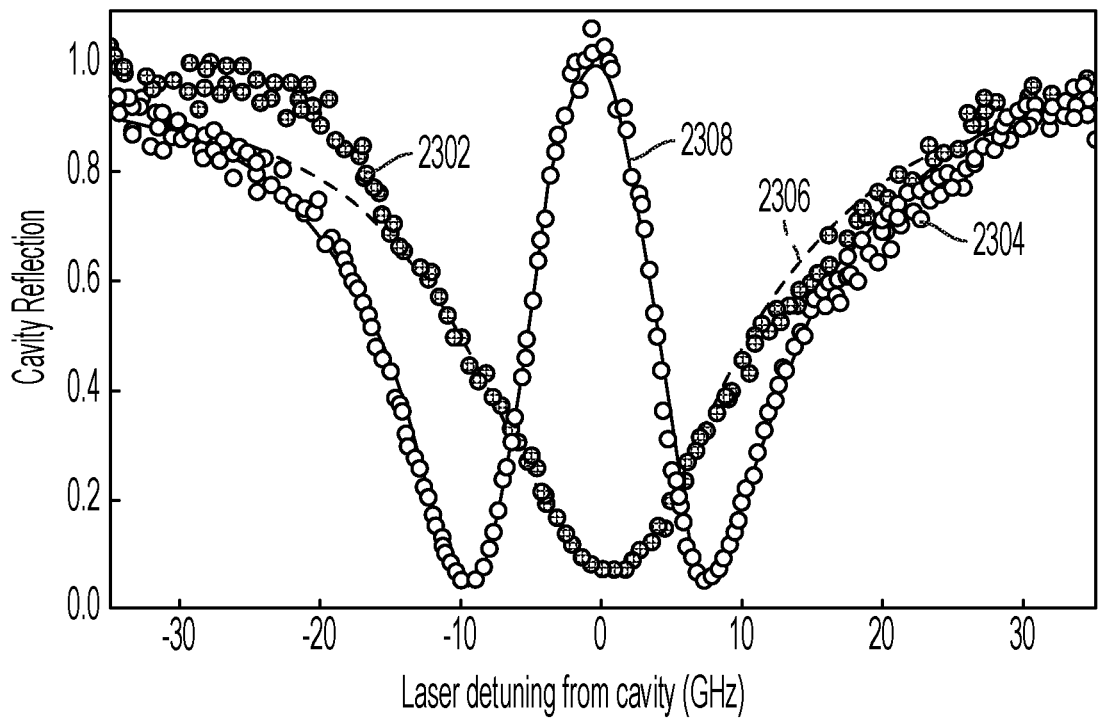
FIG. 23 shows plots of characterization of device cooperativity, according to some embodiments of the present disclosure.
Figure 23:
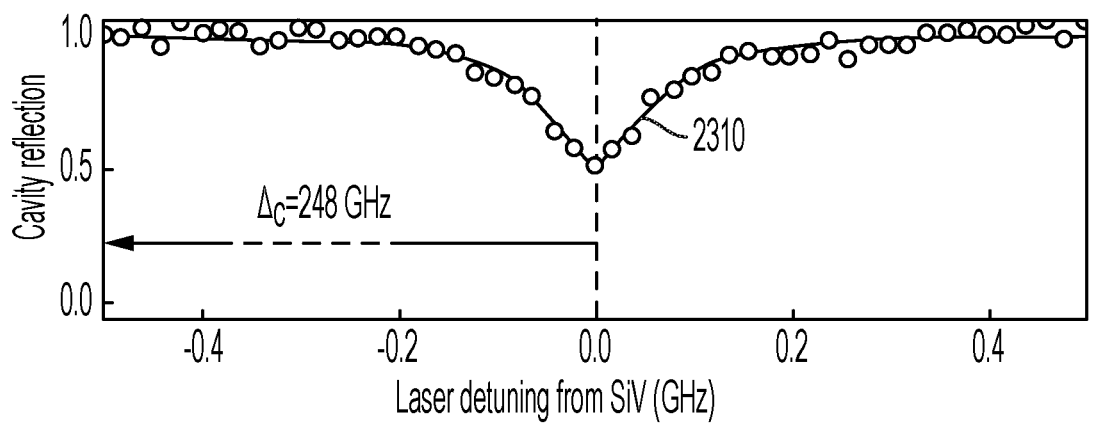

FIG. 23 shows characterization of device cooperativity, according to some embodiments of the present disclosure. Panel (a) shows cavity reflection spectrum far-detuned (2302) and on resonance (2304) with SiV center. Solid line 2306 is a fit to a Lorentzian, enabling extraction of linewidth κ=21.8 GHz. Solid line 2308 is a fit to a model used to determine the single-photon Rabi frequency g=8.38±0.05 GHz and shows the onset of a normal mode splitting. Panel (b) shows measurement of SiV linewidth far detuned ($\Delta_c$=248 GHz) from cavity resonance. Solid line 2310 is a fit to a Lorentzian, enabling extraction of natural linewidth γ=0.123 GHz.

Figure 24:
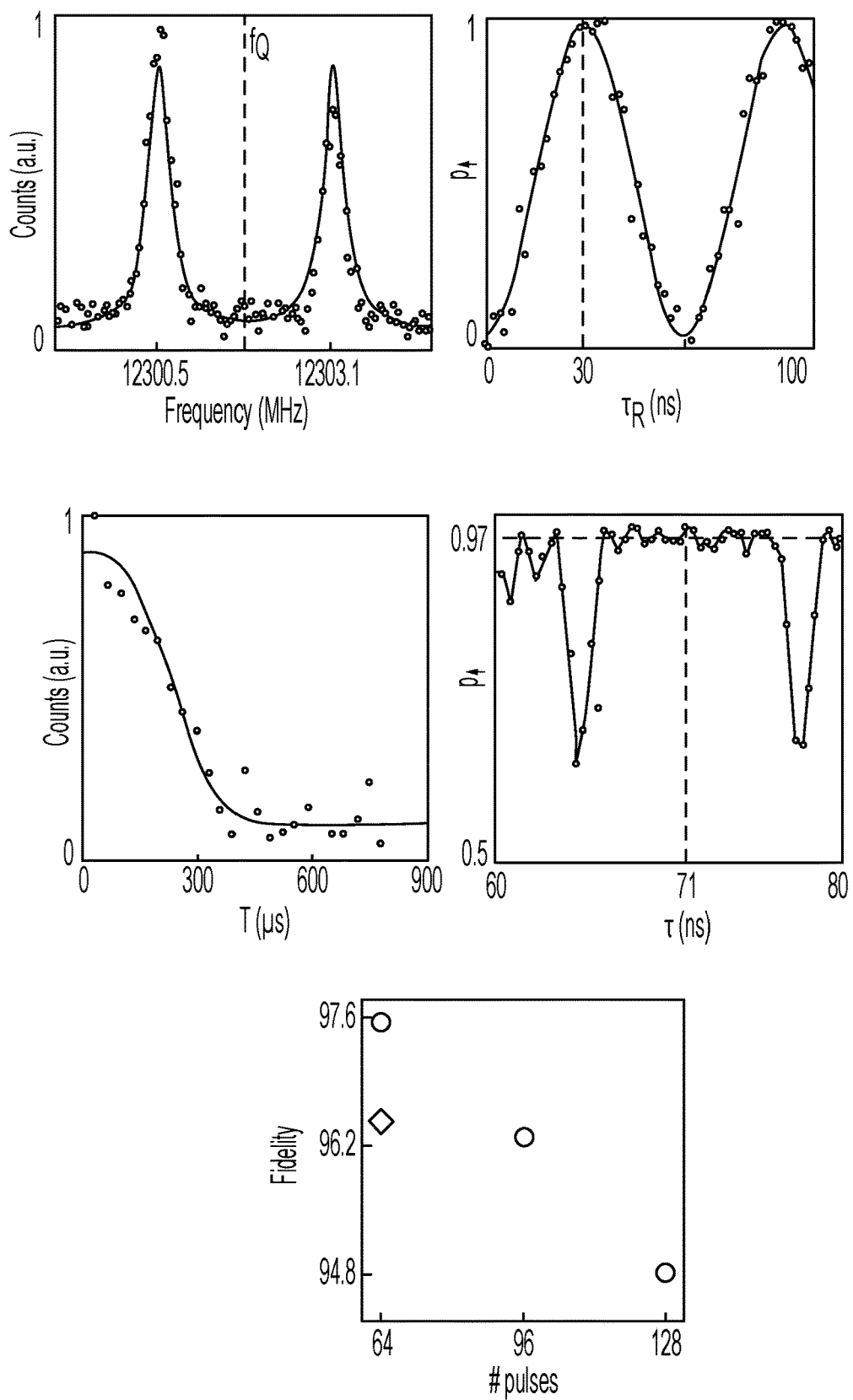
FIG. 24 shows plots of microwave characterization of spin-coherence properties, according to some embodiments of the present disclosure.

FIG. 24 shows microwave characterization of spin-coherence properties, according to some embodiments of the present disclosure. Panel (a) shows ODMR spectrum of the qubit transition at ~12 GHz split by coupling to a nearby $^{13}C$. Panel (b) shows Rabi oscillations showing π time of 30 ns. A π time of 32 ns is used for some embodiments in the present disclosure. Panel (c) shows XY8-1 dynamical decoupling signal (unnormalized) as a function of total time T, showing coherence lasting on the several hundred µs timescale. Panel (d) shows XY8-8 dynamical decoupling signal (normalized) revealing region of high fidelity at relevant value of 2τ=142 ns. Panel (e) shows fidelity of spin state after dynamical decoupling sequence with varying number of π pulses ($N_\pi$), blue points. Red point (diamond) is under illumination with $\langle n \rangle_m$=0.02.

A spectrum of the SiV-cavity system at large detuning (248 GHz) allows one to measure the cavity linewidth κ=21.6±1.3 GHz, (FIG. 23 panel (a), blue curve) and natural SiV linewidth γ=0.123±0.010 GHz (FIG. 23 panel (a), red curve). One can find spectral diffusion of the SiV optical frequency to be much smaller than y on minute timescales with an excitation photon flux of less than 1 MHz. Next, one can estimate the single-photon Rabi frequency, g, using the cavity reflection spectrum for zero atom-cavity detuning, shown as 2304 in FIG. 23 panel (a). For a resonant atom-cavity system probed in reflection from a single port with cavity-waveguide coupling $\kappa_{wg}$, the cavity reflection coefficient as a function of probe detuning Δc is given by $$r(\Delta_c) = \frac{i\Delta_c + \frac{g^2}{i\Delta_c + \frac{\gamma}{2}} - \kappa_{wg} + \frac{\kappa}{2}}{i\Delta_c + \frac{g^2}{i\Delta_c + \frac{\gamma}{2}} + \frac{\kappa}{2}}. \tag{34}$$

By fitting $|r\Delta_c|^2$ using known values of κ and γ, one can obtain the solid curve 2308 in FIG. 23 panel (a) which corresponds to a single-photon Rabi frequency g=8.38±0.05 GHz, yielding the estimated cooperativity $$C = \frac{4g^2}{\kappa\gamma} = 105 \pm 11.$$

In some embodiments. one can use resonant MW pulses delivered via an on-chip coplanar waveguide (CWG) to coherently control the quantum memory. First, one can measure the spectrum of the spin-qubit transition by applying a weak, 10 µs-long microwave pulse of variable frequency, observing the optically detected magnetic resonance (ODMR) spectrum presented in FIG. 24 panel (a). It is noted that the spin-qubit transition is split by the presence of a nearby $^{13}$C. While coherent control techniques can be employed to utilize the $^{13}$C as an additional qubit, one does not control or initialize it in this example. Instead, one can drive the electron spin with strong microwave pulses at a frequency $f_Q$ such that both $^{13}$C-state-specific transitions are addressed equally. This also mitigates slow spectral diffusion of the microwave transition of ~100 kHz.

After fixing the MW frequency at $f_Q$ one can vary the length of this drive pulse [$\tau_R$ in FIG. 24 panel (b)] and observe full-contrast Rabi oscillations. One can choose a R time of 32 ns in some embodiments in present disclosure, which is an example compromise of two factors: (1) it is sufficiently fast such that one can temporally multiplex between 2 and 4 time-bin qubits around each microwave π pulse and (2) it is sufficiently weak to minimize heating related effects from high microwave currents in resistive gold CWG.

In some embodiments, with known π time one can measure the coherence time of the SiV spin qubit under an XY8-1 dynamical decoupling sequence to exceed 200 µs [FIG. 24 panel (c)]. In some embodiments, one can use decoupling sequences with more n pulses. As an example, FIG. 24 panel (d) shows the population in the $|\uparrow\rangle$ state after XY8-8 decoupling sequence (total $N_\pi$=64 π pulses) as a function of τ, half of the inter-pulse spacing. For some BSM applications, this inter-pulse spacing, 2τ, is fixed and is matched to the time-bin interval δt. While at some times (e.g. τ=64.5 ns) there is a loss of coherence due to entanglement with the nearby $^{13}$C, at 2τ=142 ns it is decoupled from this $^{13}$C and can maintain a high degree of spin coherence. Thus, one can choose the time-bin spacing to be 142 ns. The spin coherence at 2τ=142 ns is plotted as a function $N_\pi$ in FIG. 24 panel (d), and decreases for large $N_\pi$, primarily due to heating related effects.

2.4. Description of Asynchronous Bell State Measurement

Due to the critical coupling of the nanocavity, the memory node reflects photons when the SiV spin is in the state $|\uparrow\rangle$. The resulting correlations between the spin and the reflected photons can still be used to realize a BSM between two asynchronously arriving photonic time-bin qubits using an adaptation of the well-known proposal of Duan and Kimble for entangling a pair of photons incident on an atom-cavity system. As a result of the critical coupling, one may have access to two of the four Bell states at any time, with the inaccessible Bell states corresponding to photons being transmitted through the cavity (and thus lost from the detection path). Depending on whether there was an even or odd number of 7-pulses on the spin between the arrival of the two heralded photons, one can distinguish either the $\{|\Phi_\pm\rangle\}$ or $\{|\Psi_\pm\rangle\}$ states (defined below). For the sake of simplicity, one can first describe the BSM for the case when the early time bin of Alice's and Bob's qubits both arrive after an even number of microwave it pulses after its initialization. Thereafter one can generalize this result and describe the practical consequences for the MDI-QKD protocol.

The sequence begins with a π/2 microwave pulse, preparing the spin in the state $|\psi_i\rangle = (|\uparrow\rangle + |\downarrow\rangle)/\sqrt{2}$. In the absence of a photon at the device, the subsequent microwave π-pulses, which follow an XY8-N type pattern, decouple the spin from the environment and at the end of the sequence should preserve the spin state $|\psi_i\rangle$. However, reflection of Alice's photonic qubit $|A\rangle = (|e\rangle + e^{i\phi_1}|1\rangle)/\sqrt{2}$ from the device results in the entangled spin-photon state $|\psi_A\rangle = (|\uparrow e\rangle + e^{i\phi_1}|\downarrow 1\rangle)/\sqrt{2}$. Without wish to be bound by theory, the full system is in the state $$|\psi_A\rangle \frac{|+x\rangle(|\uparrow\rangle + e^{i\phi_1}|\downarrow\rangle) + |-x\rangle(|\uparrow\rangle - e^{i\phi_1}|\downarrow\rangle)}{2}. \tag{35}$$

Regardless of the input photon state, there is equal probability to measure the reflected photon to be $|\pm x\rangle$. Thus, measuring the photon in X basis (through the TDI) does not reveal the initial photon state. After this measurement, the initial state of the photon $|A\rangle$ is teleported onto the spin: $|\psi_{m_1}\rangle = (|\uparrow\rangle + m_1 e^{i\phi_1}|\downarrow\rangle)/\sqrt{2}$, where $m_1=\pm 1$ denotes the detection outcome of the TDI. The quantum state of Alice's photon is now stored in the spin state, which is preserved by the dynamical decoupling sequence.

Reflection of the second photon $|B\rangle = (|e\rangle + e^{i\phi_2}|1\rangle)/\sqrt{2}$ from Bob results in the spin-photon state $|\psi_{m_1,B}\rangle = (|\uparrow e\rangle + m_1 e^{i(\phi_1+\phi_2)}|\downarrow 1\rangle)/\sqrt{2}$. This state now has a phase that depends on the initial states of both photons, enabling the photon-photon BSM measurements described below. Without wish to be bound by theory, rewriting Bob's reflected photon in the X basis, the full system is in the state $$|\psi_{m_1,B}\rangle = \{|+x\rangle (|\uparrow\rangle + m_1 e^{i(\phi_1+\phi_2)}|\downarrow\rangle) + |-x\rangle (|\uparrow\rangle - m_1 e^{i(\phi_1+\phi_2)}|\downarrow\rangle)\}/2. \quad (36)$$

The second measurement result $m_2$ once again contains no information about the initial state $|B\rangle$, yet heralds the final spin state $|\psi_{m_1,m_2}\rangle = (|\uparrow\rangle + m_1 m_2 e^{i(\phi_1+\phi_2)}|\downarrow\rangle)$ as described throughout the present disclosure. When this state lies along the X axis of the Bloch sphere ($\phi_1+\phi_2=\{0, \pi\}$), the final result of the X basis measurement on the spin state $m_3$ has a deterministic outcome, dictated by all values of the parameters $\{\phi_1, \phi_2\}$ (known to Alice and Bob) and $\{m_1, m_2\}$ (which are known to Charlie, but are completely random). Conversely, all information available to Charlie $\{m_1, m_2, m_3\}$ contains information on the correlation between the photonic qubits, not on their individual states. The resulting truth table for different input states is given in TABLE 3. For all input states, there is equal probability of measuring $\pm 1$ for each individual measurement $m_i$. However, the overall parity of the three measurements $\{m_1 m_2 m_3\}$ depends on whether or not the input photons were the same, or opposite, for inputs $|A\rangle, |B\rangle \in |\pm x\rangle$ or $|\pm y\rangle$.

One can now address the fact that the BSM distinguishes either between $\{|\Phi_\pm\rangle\}$ or $\{|\Psi_\pm\rangle\}$ if there was an even or odd number of microwave $\pi$ pulses between incoming photons respectively. This effect arises because each $\pi$ pulse in the dynamical decoupling sequence toggles an effective frame change: $Y \leftrightarrow -Y$. Without wish to be bound by theory, the impact on this frame change on the BSM can be seen by writing the pairs of Bell states $(|\Phi_\pm\rangle = (|ee\rangle \pm |11\rangle)/\sqrt{2}$, and $|\Psi_\pm\rangle = (|e1\rangle \pm |1e\rangle)/\sqrt{2})$ in the X and Y bases, where one can have $$|\Phi_\pm\rangle^{(X)} = (|+x\rangle|\pm x\rangle + |\mp x\rangle|-x\rangle)/\sqrt{2} \quad (37)$$

$$|\Phi_\pm\rangle^{(Y)} = (|+y\mp\rangle|y\rangle + |\pm y\rangle|-y\rangle)/\sqrt{2} \quad (38)$$

$$|\Psi_\pm\rangle^{(X)} = (|+x\rangle|\pm x\rangle + |\mp x\rangle|-x\rangle)/\sqrt{2} \quad (39)$$

$$|\Psi_\pm\rangle^{(Y)} = i(|+y\rangle|\pm y\rangle - |\mp y\rangle|-y\rangle)/\sqrt{2} \quad (40)$$

For X basis inputs, as seen by Eqns. 37 and 39, switching between $\{|\Phi_\pm\rangle\}$ and $\{|\Psi_\pm\rangle\}$ measurements does not affect the inferred correlation between input photons. For Y basis inputs however, this does result in an effective bit flip in the correlation outcome (see Eqn. 38 and 40). In practice, Alice and Bob can keep track of each Y photon sent and apply a bit flip accordingly, as long as they have the appropriate timing information about MW pulses applied by Charlie. If Charlie does not give them the appropriate information, this will result in an increased QBER which can be detected.

As a final remark, this scheme also works for pairs of photons that are not both in the X or Y basis but still satisfy the condition $\phi_1+\phi_2=0$. For example, $|a\rangle$ and $|b\rangle$ from FIG. 20 panel (b) satisfy this condition. In this case, adequate correlations can still be inferred about the input photons, although they were sent in different bases.

2.4.1. Test of Bell-CHSH Inequality

In order to perform a test of the Bell-CHSH inequality, one can send input photons equally distributed from all states $\{|\pm x\rangle, |\pm y\rangle, |\pm a\rangle, |\pm b\rangle\}$ [FIG. 20 panel (b)]. One can select for cases where two heralding events arise from input photons $\{A, B\} = \pm 1$ that are either 45° or 135° apart from one another. Conditioned on the parity outcome of the BSM ($\pm 1$), the Bell-CHSH inequality bounds the correlations between input photons as $$S_\pm = |\langle A \cdot B\rangle_{xa} - \langle A \cdot B\rangle_{xb} - \langle A \cdot B\rangle_{ya} - \langle A \cdot B\rangle_{yb}| \leq 2, \quad (41)$$

where the subscripts denote the bases the photons were sent in. The values of each individual term in Eqn. 41, denoted as "input correlations," are plotted in FIG. 3d for positive and negative parity outcomes.

Figure 25:
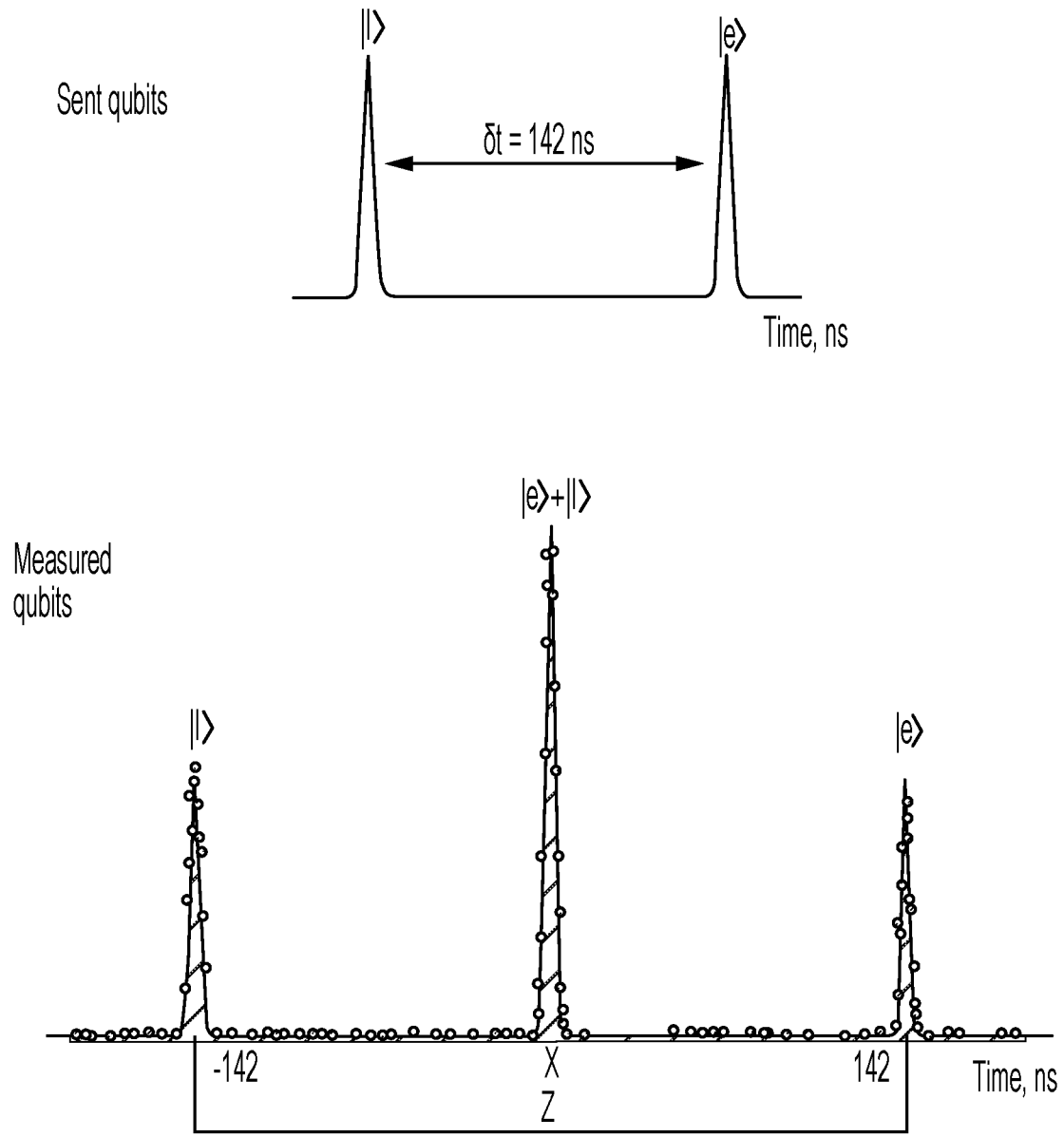
FIG. 25 shows schematics of measurement on a single time-bin qubit in Z and X bases, according to some embodiments of the present disclosure.

FIG. 25 shows measurements on a single time-bin qubit in Z and X bases, according to some embodiments of the present disclosure. Panel (a) shows an example of optical pulses sent for example in the example described in FIG. 19 panel (d). Panel (b) shows a time trace of detected photons on +detector when pulses shown in panel (a) are sent directly into the TDI. The first and last peaks correspond to late and early photons taking the long and short paths of the TDI, which enable measurements in the Z basis $\{|e\rangle, |1\rangle\}$. The central bin corresponds to the late and early components overlapping and interfering constructively to come out of the + port, equivalent to a measurement of the time bin qubit in the $|+x\rangle$ state. A detection event in this same timing window on the − detector (not shown) can constitute a $|-x\rangle$ measurement.

TABLE 3

Truth table of asynchronous BSM protocol

| Alice | Bob | Parity | Bell state |
|---|---|---|---|
| $|+x\rangle$ | $|+x\rangle$ | +1 | $|\Phi_+\rangle$ |
| $|+x\rangle$ | $|-x\rangle$ | −1 | $|\Phi_-\rangle$ |
| $|-x\rangle$ | $|+x\rangle$ | −1 | $|\Phi_-\rangle$ |
| $|-x\rangle$ | $|-x\rangle$ | +1 | $|\Phi_+\rangle$ |
| $|+y\rangle$ | $|+y\rangle$ | −1 | $|\Phi_-\rangle$ |
| $|+y\rangle$ | $|-y\rangle$ | +1 | $|\Phi_+\rangle$ |
| $|-y\rangle$ | $|+y\rangle$ | +1 | $|\Phi_+\rangle$ |
| $|-x\rangle$ | $|-y\rangle$ | −1 | $|\Phi_-\rangle$ |

TABLE 3 shows the parity (and BSM outcome) for each set of valid input states from Alice and Bob. In the case of Y basis inputs, Alice and Bob adjust the sign of their input state depending on whether it was commensurate with an even or odd numbered free-precession interval, based on timing information provided by Charlie.

2.5. Analysis of Quantum Communication Applications
2.5.1. Estimation of QBER

In order to achieve the lowest QBER, one can routinely monitor the status trigger of the pre-selection routine and adjust the TDI. Additionally, one can keep track of the timing when the TDI piezo voltage rails. In some embodiments, this guarantees that the SiV is resonant with the photonic qubits and that the TDI performs high-fidelity measurements in X basis. This is implemented in software with a response time of 100 ms.

For each example, one can estimate the QBER averaged over all relevant basis combinations. This is equivalent to the QBER when the random bit string has all bases occurring with the same probability, (an unbiased and independent basis choice by Alice and Bob). One may first note that the QBER for positive and negative parity announcements are not independent. One can illustrate this for the example, that Alice and Bob send photons in the X basis. One can denote the probability P that Alice sent qubit $|\psi\rangle$, Bob sent qubit $|\xi\rangle$ and the outcome of Charlie's parity measurement is $m_c$, conditioned on the detection of a coincidence, as $P(\psi_A \cap \xi_B \cap m_C)$. Without wish to be bound by theory, one can find for balanced inputs $P(+X_A \cap -X_B)$ $P(-X_A \cap +X_B)$ that $P(E_{XX}|+_C)=P(E_{XX}|-_C)$ with $E_{XX}$ denoting the occurrence of a bit error in the sifted key of Alice and Bob. One thus find for the posterior probability L for the average QBER for XX coincidences $$L(P(E_{XX}))=L(P(-_C|+X_A \cap +X_B))$$

$$L(P(+_C|+X_A \cap -X_B))*L(P(+_C|-X_A \cap +X_B))$$

$$L(P(-_C|-X_A \cap +X_B)). \quad (42)$$

Note that this expression is independent of the actual distribution of $P(\psi_A \cap \xi_B)$. Here, the posterior probability $L(P(+_C|+X_A \cap -X_B))$ is based on the a binomial likelihood function $$P(N_{m_C \cap \psi_A \cap \xi_B} | N_{\psi_A \cap \xi_B}, L),$$

where $N_C$ denotes the number of occurrences with condition C. Finally the posterior probability of the unbiased QBER is $L(P(E))=L(P(E_{XX}))*(P(E_{YY}))$. All values presented in the text and figures are maximum likelihood values with bounds given by the confidence interval of ±34.1% integrated posterior probability. Confidence levels towards a specific bound (for example, unconditional security) are given by the integrated posterior probability up to the bound.

Figure 26:
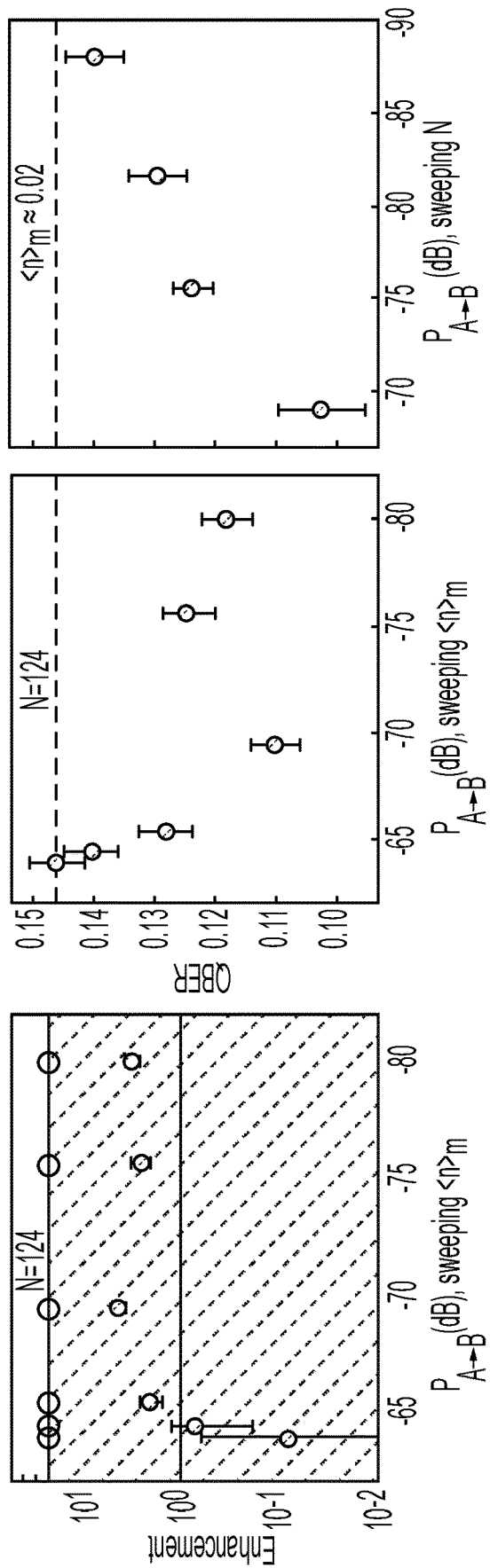
FIG. 26 shows plots of performance of memory-device versus of channel loss, according to some embodiments of the present disclosure.

FIG. 26 shows performance of memory-device versus of channel loss, according to some embodiments of the present disclosure. Panel (a) shows enhancement of memory-based approach compared to direct transmission approach, keeping N=124 fixed and varying $\langle n \rangle_m$ in order to vary the effective channel transmission probability $p_{A \to B}$. At high $p_{A \to B}$ (larger $\langle n \rangle_m$), $r_s$ approaches 0 due to increased QBER arising from undetected scattering of a third photon. Panel (b) shows: (left) a plot of QBER for same sweep of $\langle n \rangle_m$ shown in panel (a); and (right) a plot of QBER while sweeping N in order to vary loss. These points correspond to the same data shown in FIG. 21. At lower $p_{A \to B}$ (larger N), microwave-induced heating-related dephasing leads to increased QBER.

To get the ratio of the distilled secret key rate with respect to the sifted key rate by (ideal) error correction and privacy amplification, one can use the bounds given by difference in information by Alice and Bob with respect to a potential eavesdropper who performs individual attacks [6]: $r_s$=I(A, B)−I(A/B, E)$^{max}$. One can use the full posterior probability distribution of QBER (which accounts for statistical and systematic uncertainty in the estimate) to compute the error bar on $r_s$, and correspondingly, the error bars on the extracted secret key rates plotted in FIG. 21.

2.5.2. Example Parameters for Asynchronous Bell State Measurements

One can minimize the extracted QBER for the asynchronous BSM to optimize the performance of the memory node. The first major factor contributing to QBER is the scattering of a third photon that is not detected, due to the finite heralding efficiency η=0.423±0.04. This is shown in FIG. 19 panel (f), where the fidelity of the spin-photon entangled state diminishes for $\langle n \rangle_m \geq 0.02$. At the same time, one can work at the maximum possible $\langle n \rangle_m$ in order to maximize the data rate to get enough statistics to extract QBER (and in the quantum communication setting, efficiently generate a key).

To increase the key generation rate per channel use, one can also fit many photonic qubits within each initialization of the memory. In practice, there are 2 physical constraints: (1) the bandwidth of the SiV-photon interface and (2) the coherence time of the memory. One can find that one can satisfy (1) at a bandwidth of roughly 50 MHz with no measurable infidelity. For shorter optical pulses (<10 ns), the spin-photon gate fidelity is reduced. In principle, the SiV-photon bandwidth can be increased by reducing the atom-cavity detuning (here ~60 GHz) at the expense of having to operate at higher magnetic fields where microwave qubit manipulation is not as convenient.

Even with just an XY8-1 decoupling sequence (number of π pulses $N_\pi$=8, the coherence time of the SiV is longer than 200 μs [FIG. 24 panel (c)] and can be prolonged to the millisecond range with longer pulse sequences. Unfortunately, to satisfy the bandwidth criteria (1) and to drive both hyperfine transitions [FIG. 24 panel (a)], one can use short (32 ns long π pulses), which cause additional decoherence from ohmic heating already at $N_\pi$=64 [FIG. 24 panel (e)]. Due to this one can limit the pulse sequences to a maximum $N_\pi$=128, and use up to ≈20 μs of the memory time. One solution is to switch to superconducting microwave delivery. Alternatively, one can use a larger value of r to allow the device to cool down in between subsequent pulses at the expense of having to stabilize a TDI of larger δt. Working at larger δt also enables temporal multiplexing by fitting multiple time-bin qubits per free-precession interval. In fact, with 2τ=142 ns, even given constraint (1) and the finite π time, one can already fit up to 4 optical pulses per free-precession window, enabling a total number of photonic qubits of up to N=504 for $N_\pi$=128.

In benchmarking the asynchronous BSM for quantum communication, one can optimize the parameters $\langle n \rangle_m$ and N to maximize the enhancement over the direct transmission approach, which is a combination of both increasing N and reducing the QBER, since a large QBER results in a small secret key fraction $r_s$. As described throughout embodiments of the present disclosure, the effective loss can be associated with $\langle n \rangle_p$, which is the average number of photons per photonic qubit arriving at the device, and is given straightforwardly by $\langle n \rangle_p = \langle n \rangle_m / N$. The most straightforward way to sweep the loss is to keep the example sequence the same (fixed N) and vary the overall power, which changes $\langle n \rangle_m$. The results of such a sweep are shown in FIG. 26 panels (a) and (b). For larger $\langle n \rangle_m$ (corresponding to lower effective channel losses), the errors associated with scattering an additional photon reduce the performance of the memory device.

TABLE 4

Quantum-memory-based advantage

| | per channel occupancy | per channel occupancy | per channel use | per channel use |
|---|---|---|---|---|
| X:Y basis bias | 50:50 | 99:1 | 50:50 | 99:1 |
| Secure key rate R[10$^{-7}$] | $1.19_{-0.14}^{+0.14}$ | $2.33_{-0.28}^{+0.28}$ | $2.37_{-0.28}^{+0.28}$ | $4.66_{-0.55}^{+0.56}$ |
| R/R$_{max}$(X:Y) | $2.06_{-0.25}^{+0.25}$ | $2.06_{-0.25}^{+0.25}$ | $4.13_{-0.49}^{+0.50}$ | $4.13_{-0.49}^{+0.50}$ |
| R/(1.44p$_{A \to B}$) | $0.71_{-0.08}^{+0.09}$ | $1.40_{-0.17}^{+0.17}$ | $1.43_{-0.17}^{+0.17}$ | $2.80_{-0.33}^{+0.34}$ |
| 1—confidence level | | $1.1_{-0.3}^{+0.4} \times 10^{-2}$ | $8_{-2}^{+3} \times 10^{-3}$ | $1.3_{-0.3}^{+0.5} \times 10^{-7}$ |

TABLE 4 shows secret key rates with the asynchronous BSM device and comparison to ideal direct communication implementations, based on the performance of the network node for N=124 and $\langle n \rangle_m$~0.02. Distillable key rates for E=0.110±0.004 for unbiased and biased basis choice are expressed in a per-channel-occupancy and per-channel-use normalization. Enhancement is calculated versus the linear optics MDI-QKD limit ($R_{max}(50:50)=p_{A \to B}/2$ for unbiased bases, $R_{max}(99:1)=0.98\, p_{A \to B}$ with biased bases) and versus the fundamental repeaterless channel capacity ($1.44 p_{A \to B}$). Confidence levels for surpassing the latter bound are given in the final row.

Due to these considerations, one can work at roughly $(n)_m \leq 0.02$ for some examples shown in FIGS. 20 and 21, below which the performance does not improve significantly. At this value, one can obtain BSM successes at a rate of roughly 0.1 Hz. By fixing $\langle n \rangle_m$ and increasing N, one can maintain a tolerable BSM success rate while increasing the effective channel loss. Eventually, as demonstrated in FIG. 26 panel (c) and in the high-loss data point in FIG. 21, effects associated with microwave heating result in errors that again diminish the performance of the memory node for large N. In some embodiments, one can conclude that the performance of the node occurs for $\langle n \rangle_m \sim 0.02$ and N≈124, corresponding to an effective channel loss of 69 dB between Alice and Bob, which is equivalent to roughly 350 km of telecommunications fiber.

In some embodiments, one can also find that the QBER and thus the performance of the communication link is limited by imperfect preparation of photonic qubits. Photonic qubits are defined by sending arbitrary phase patterns generated by the optical AWG to a phase modulator. For an example of such a pattern, see the blue curve in FIG. 20 panel (a). One can use an imperfect pulse amplifier with finite bandwidth (0.025-700 MHz), and find that the DC component of these waveforms can result in error in photonic qubit preparation on the few % level. By using a tailored waveform of phases with smaller (or vanishing) DC component, one can reduce these errors. One can perform such an example application during the test of the Bell-CHSH inequality. One can find that by evaluating BSM correlations from |±a⟩ and |±b⟩ inputs during this measurement, one can estimate a QBER of 0.097±0.006.

Finally, one can obtain the effective clock-rate of the communication link by measuring the total number of photonic qubits sent over the course of an entire run time. In practice, one can record the number of channel uses, determined by the number of sync triggers recorded [see FIG. 22 panel (a)] as well as the number of qubits per sync trigger (N). One can then divide this number by the total run time from start to finish (~1-2 days for example runs), including all experimental downtime used to stabilize the interferometer, readout and initialize the SiV, and compensate for spectral diffusion and ionization. For N=248, one can extract a clock rate of 1.2 MHz. As the secret key rate in this configuration exceeds the conventional limit of p/2 by a factor of 3.8±1.1, it is competitive with a standard MDI-QKD system operating at $4.5_{-1.2}^{+1.3}$ MHz clock rate.

2.5.3. Performance of Memory-Assisted MDI-QKD

A single optical link can provide many channels, for example, by making use of different frequency, polarization, or temporal modes. To account for this, when comparing different systems, data rates can be defined on a per-channel-use basis. In an MDI-QKD setting, full usage of the communication channel between Alice and Bob means that both links from Alice and Bob to Charlie are in use simultaneously. For an example asynchronous sequential measurement, typically half of the channel is used at a time, for example from Alice to Charlie or Bob to Charlie. The other half can in principle be used for a different task when not in use. For example, the unused part of the channel could be routed to a secondary asynchronous BSM device. In the example, one can additionally define as a second normalization the rate per channel "occupancy", which accounts for the fact that half the channel is used at any given time. The rate per channel occupancy is therefore half the rate per full channel use. For comparison, one can typically operate at 1.2% channel use and 2.4% channel occupancy.

To characterize the performance of the asynchronous Bell state measurement device, one can operate it in the regime determined above (N=124, $\langle n \rangle_m \leq 0.02$. Without wish to be bound by theory, it is noted that the enhancement in the sifted key rate over direct transmission MDI-QKD is given by $$\frac{R}{R_{max}} = \eta^2 \frac{(N_\pi - 1)(N_\pi - 2)N_{sub}}{2N_\pi} \quad (43)$$

and is independent of $\langle n \rangle_m$ for a fixed number of microwave pulses $N_\pi$ and optical pulses per microwave pulse $N_{sub}$, and thus fixed $N = N_{90}\, N_{sub}$. For low $\langle n \rangle_m$, three photon events become negligible and therefore QBER saturates, such that the enhancement in the secret key rate saturates as well [FIG. 26 panel (a)]. One can therefore combine all data sets with fixed N=124 below $\langle n \rangle_m \leq 0.02$ to characterize the average QBER of 0.116±0.002 [FIG. 20 panel (c)]. The key rates cited in in some examples in the present disclosure relate to a data set in this series ($\langle n \rangle_m \approx 0.02$), with a QBER of 0.110±0.004. A summary of key rates calculated on a per-channel use and per-channel occupancy basis, as well as comparisons of performance to ideal MDI-QKD and repeaterless bounds are given in TABLE 4.

Furthermore, one can extrapolate the performance of the memory node to include biased input bases from Alice and Bob. This technique enables a reduction of channel uses where Alice and Bob send photons in different bases, but is still compatible with secure key distribution, allowing for enhanced secret key rates by at most a factor of 2. The extrapolated performance of the node for a bias of 99:1 is also displayed in TABLE 4, as well as comparisons to the relevant bounds. It is noted that basis biasing does not affect the performance when comparing to the equivalent MDI-QKD example, which is limited by $P_{A \to B}/2$ in the unbiased case and $P_{A \to B}$ in the biased case. However, using biased input bases does make the performance of the memory-assisted approach more competitive with the fixed repeaterless bound of $1.44 p_{A \to B}$.

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. A method of making a quantum network node comprising:

calculating a plurality of scoring function F values for an array of at least two photonic crystal cavity unit cells, each photonic crystal cavity unit cell having a lattice constant $\alpha$ and a hole having a length $H_x$ and a width $H_y$, wherein the scoring function comprises:

$$F = \min(Q, Q_{cutoff})/(Q_{cutoff} \times V_{mode})$$

wherein Q is a cavity quality factor, $Q_{cutoff}$ is an estimated maximum realizable Q, and $V_{mode}$ is a cavity mode volume;

selecting a value of α, a value of $H_x$, and a value of $H_y$ for which the scoring function value meets a scoring function value criteria;

forming, on a substrate, a waveguide region and the array of at least two photonic crystal cavity unit cells based on the selected value a, the selected value $H_z$, and the selected value $H_y$;

implanting at least one ion between a hole of a first photonic crystal cavity unit cell and a second photonic crystal cavity unit cell;

annealing the at least one implanted ion into at least one quantum defect; and forming a coplanar microwave waveguide on the substrate configured to be electromagnetically coupled to the array of at least two photonic crystal cavity unit cells.

2. The method of claim 1, wherein the scoring function value criteria comprises one or more of a maximum scoring function value of the plurality of scoring function F values, a threshold value exceeded by at least one of the plurality of scoring function F values, and a maximum scoring function value of the plurality of scoring function F values after a predetermined number of iterations calculating scoring function F values.

3. The method of claim 1, further comprising:
tapering an input end of the waveguide region;
connecting the tapered input end of the waveguide region to a tapered optical fiber to optically couple the optical fiber to the array of at least two photonic crystal cavity unit cells.

4. The method of claim 3, further comprising coupling the tapered optical fiber to at least one probing light source and to at least one single photon detector.

5. The method of claim 1, wherein the substrate comprises a diamond substrate.

6. The method of claim 5, wherein the implanted ion is a silicon ion and wherein the at least one quantum defect is a silicon-vacancy color center.

7. The method of claim 1, wherein $Q_{cutoff}$ is not greater than $5 \times 10^5$.

8. The method of claim 1, further comprising:
forming a mask, after the forming the array of at least two photonic crystal cavity unit cells, on the array of at least two photonic crystal cavity unit cells;
etching, with an ion beam, the substrate, at two or more angles, to form a tapered column between the hole of a first photonic crystal cavity unit cell and the second photonic crystal cavity unit cell.

9. The method of claim 1, wherein the implanting the at least one ion further comprises:
forming a mask on the array of at least two photonic crystal cavity unit cells;
forming at least one aperture in the mask at a location between the hole of a first photonic crystal cavity unit cell and the second photonic crystal cavity unit cell; and
implanting the at least one ion through the at least one aperture in the mask, wherein ions are not implanted through the mask.

10. The method of claim 1, further comprising mounting the substrate in a refrigeration unit, wherein the refrigeration unit is configured to cool the substrate to less than 100 mK such that the spin coherence time $T_2$ of the at least one quantum defect is extended.

11. A quantum network device comprising:
a substrate;
an array of at least two photonic crystal cavity unit cells on the substrate, wherein each photonic crystal cavity unit cell has a lattice constant α and a hole having a length $H_x$ and a width $H_y$, wherein a value of α, a value of $H_x$, and a value of $H_y$ are selected so that a scoring function F value meets a scoring function value criteria, and wherein the scoring function comprises:

$F=\min(Q, Q_{cutoff})/(Q_{cutoff} \times V_{mode})$ wherein Q is a cavity quality factor, $Q_{cutoff}$ is an estimated maximum realizable Q, and $V_{mode}$ is a cavity mode volume;
at least one quantum defect in the substrate between a first photonic crystal cavity unit cell in the array of at least two photonic crystal cavity unit cells and a second photonic crystal cavity unit cell in the array of at least two photonic crystal cavity unit cells; and
a coplanar microwave waveguide disposed on the substrate configured to be electromagnetically coupled to the array of at least two photonic crystal cavity unit cell.

12. The device of claim 11, wherein the scoring function value criteria comprises one or more of a maximum scoring function value of the plurality of scoring function F values, a threshold value exceeded by at least one of the plurality of scoring function F values, and a maximum scoring function value of the plurality of scoring function F values after a predetermined number of iterations calculating scoring function F values.

13. The device of claim 11, wherein the coplanar microwave waveguide comprises a tapered input end, and wherein the tapered input end is connected to a tapered optical fiber to optically couple the optical fiber to the array of at least two photonic crystal cavity unit cells.

14. The device of claim 11, further comprising at least one probing light source and at least one single photon detector.

15. The device of claim 11, wherein the substrate comprises a diamond substrate.

16. The device of claim 11, wherein the quantum defect is a silicon-vacancy color center.

17. The device of claim 11, further comprising a refrigeration unit, wherein the refrigeration unit is configured to cool the substrate to less than 100 mK such that a spin coherence time $T_2$ of the at least one quantum defect is extended.

18. A method of operating the quantum network device of claim 14, the method comprising:
receiving, with the at least one single photon detector, at least two photons; and
in response to the receipt of two photons, measuring the state of the quantum defect using the probing light source.

19. The method of claim 18, wherein the receiving, with the at least one single photon detector, at least two photons and the measuring the state of the quantum defect with the laser comprises a Bell-state measurement.

20. A method of encoding of quantum information using the quantum network device of claim 11, comprising:
for n time-bin qubits comprising n+1 optical pulses, applying phase control with a phase modulator to each optical pulse, wherein each time-bin qubit stores quantum information in a relative amplitude and phase between a pair of neighboring optical pulses among the n+1 optical pulses;
guiding the n+1 optical pulses to the at least one quantum defect;
alternating, with each pulse, coherent microwave control of the quantum defect; and interfering, with a time-delay interferometer, each pulse with a previous optical pulse, wherein the time-delay interferometer delays the previous optical pulse by the time between the pulse and the previous optical pulse.

* * * * *